US010357881B2

(12) United States Patent
Faridi et al.

(10) Patent No.: US 10,357,881 B2
(45) Date of Patent: Jul. 23, 2019

(54) MULTI-SEGMENT SOCIAL ROBOT

(71) Applicant: SQN VENTURE INCOME FUND, L.P., New York, NY (US)

(72) Inventors: Fardad Faridi, Marlborough, MA (US); Cynthia Breazeal, Cambridge, MA (US)

(73) Assignee: SQN VENTURE INCOME FUND, L.P., New York, NY (US)

( * ) Notice: Subject to any disclaimer, the term of this patent is extended or adjusted under 35 U.S.C. 154(b) by 493 days.

(21) Appl. No.: 15/014,963

(22) Filed: Feb. 3, 2016

(65) Prior Publication Data

US 2016/0151917 A1 Jun. 2, 2016

Related U.S. Application Data

(63) Continuation of application No. 14/799,704, filed on Jul. 15, 2015, which is a continuation-in-part of application No. 14/210,037, filed on Mar. 13, 2014.
(Continued)

(51) Int. Cl.
*G06F 15/18* (2006.01)
*B25J 11/00* (2006.01)
(Continued)

(52) U.S. Cl.
CPC ......... *B25J 11/0005* (2013.01); *B25J 9/0003* (2013.01); *B25J 9/1694* (2013.01);
(Continued)

(58) Field of Classification Search
CPC .. Y10S 901/01; Y10S 700/90; F05B 2250/40; B25J 19/0029; B25J 11/0005;
(Continued)

(56) References Cited

U.S. PATENT DOCUMENTS 4,668,155 A 5/1987 Kaufmann et al.
6,038,493 A 3/2000 Tow
(Continued)

FOREIGN PATENT DOCUMENTS

CN 1835828 A 9/2006
CN 101362334 A 2/2009
(Continued)

OTHER PUBLICATIONS

"NEC Personal Robot PaPeRo", http://www.geekzone.co.nz/content.asp?contentid=1825, Nov. 17, 2003 (accessed Jun. 15, 2015), 4 pages.
(Continued)

*Primary Examiner* — Hsien Ming Lee
(74) *Attorney, Agent, or Firm* — Aslan Law, P.C.

(57) ABSTRACT

A multi-segment robot for emotive expression includes a first segment having a generally planar surface, a second segment having a first axis of rotation, the second segment in rotational contact with the first segment about the first axis of rotation; and a third segment in rotational contact with the second segment about a second axis of rotation not parallel to the first axis of rotation, the third segment having a display screen adapted to facilitate social interaction with a user.

17 Claims, 25 Drawing Sheets

Related U.S. Application Data

(60) Provisional application No. 62/024,738, filed on Jul. 15, 2014, provisional application No. 61/788,732, filed on Mar. 15, 2013.

(51) Int. Cl.

| | | |
|---|---|---|
| *B25J 9/00* | (2006.01) | |
| *H04N 5/232* | (2006.01) | |
| *G10L 15/197* | (2013.01) | |
| *G10L 15/22* | (2006.01) | |
| *G10L 15/32* | (2013.01) | |
| *B25J 9/16* | (2006.01) | |

(52) U.S. Cl.
CPC .......... *B25J 11/001* (2013.01); *B25J 11/0015* (2013.01); *G10L 15/197* (2013.01); *G10L 15/22* (2013.01); *G10L 15/32* (2013.01); *H04N 5/23219* (2013.01); *G10L 2015/223* (2013.01)

(58) Field of Classification Search
CPC ........ B25J 13/08; B25J 9/1694; B25J 11/001; B25J 11/0015; B25J 9/0003; B25J 11/0001; G10L 15/22; G10L 15/25
USPC .................. 700/245, 246, 258, 259, 264
See application file for complete search history.

(56) References Cited

U.S. PATENT DOCUMENTS

| | | | |
|---|---|---|---|
| D639,353 S | 6/2011 | Stibolt | |
| 8,265,793 B2 | 9/2012 | Campbell et al. | |
| D685,438 S | 7/2013 | Fan et al. | |
| D695,345 S | 12/2013 | Park et al. | |
| 8,608,398 B2 | 12/2013 | Mekid et al. | |
| 8,698,965 B2* | 4/2014 | Choi ........................ | B25J 5/007 348/839 |
| D705,678 S | 5/2014 | Steffey et al. | |
| 8,978,509 B2 | 3/2015 | Pan et al. | |
| D733,203 S | 6/2015 | Menor et al. | |
| D734,821 S | 7/2015 | Greaves et al. | |
| D736,117 S | 8/2015 | Stone et al. | |
| D746,886 S | 1/2016 | Breazeal et al. | |
| 9,400,503 B2* | 7/2016 | Kearns ................... | B25J 11/009 |
| 2005/0125099 A1* | 6/2005 | Mikami ................. | G06N 3/008 700/245 |
| 2006/0293787 A1 | 12/2006 | Kanda et al. | |
| 2007/0192910 A1 | 8/2007 | Vu et al. | |
| 2009/0055019 A1 | 2/2009 | Stiehl et al. | |
| 2010/0106295 A1* | 4/2010 | Cho ................... | H04N 5/23248 700/245 |
| 2010/0178101 A1 | 7/2010 | Day et al. | |
| 2010/0329479 A1* | 12/2010 | Nakadai ...................... | B25J 9/00 381/92 |
| 2011/0093119 A1* | 4/2011 | Park ........................ | B25J 9/1607 700/254 |
| 2011/0290059 A1 | 12/2011 | Pan et al. | |
| 2012/0277914 A1 | 11/2012 | Crow et al. | |
| 2012/0314123 A1 | 12/2012 | Lee et al. | |
| 2012/0316676 A1 | 12/2012 | Fouillade et al. | |
| 2013/0066467 A1 | 3/2013 | Song et al. | |
| 2013/0116821 A1* | 5/2013 | Joly ......................... | B25J 9/161 700/254 |
| 2014/0136302 A1 | 5/2014 | Song et al. | |
| 2014/0277735 A1 | 9/2014 | Breazeal | |
| 2015/0138333 A1 | 5/2015 | Devaul | |
| 2015/0217445 A1 | 8/2015 | Hietmann et al. | |
| 2015/0314454 A1 | 11/2015 | Breazeal et al. | |
| 2015/0335220 A1 | 11/2015 | Kim et al. | |
| 2015/0336276 A1 | 11/2015 | Song et al. | |
| 2015/0343630 A1 | 12/2015 | Tashiro | |
| 2015/0352720 A1 | 12/2015 | Iizuka | |
| 2015/0360369 A1 | 12/2015 | Ishikawa et al. | |
| 2016/0025150 A1 | 1/2016 | Bachmaier et al. | |
| 2016/0031078 A1 | 2/2016 | Kapoor et al. | |
| 2016/0058261 A1 | 3/2016 | Dyson et al. | |
| 2016/0059408 A1 | 3/2016 | Isobe | |
| 2016/0059770 A1 | 3/2016 | Ji et al. | |

FOREIGN PATENT DOCUMENTS

| | | |
|---|---|---|
| JP | H07281242 A | 10/1995 |
| JP | 2002000574 A | 1/2002 |
| JP | 2003225228 A | 8/2003 |
| JP | 2007-069302 | 3/2007 |
| JP | 2009072910 A | 4/2009 |
| JP | 2012192518 A | 10/2012 |
| KR | 1020080037287 A | 4/2008 |
| KR | 1020090001725 A | 1/2009 |
| KR | 1020110129042 A | 12/2011 |
| KR | 101190660 B1 | 10/2012 |
| WO | 2014152015 A1 | 9/2014 |
| WO | 2016011159 A1 | 1/2016 |

OTHER PUBLICATIONS

Fujita, "Personal Robot PaPeRo", Journal of Robotics and Mechanics, vol. 14, No. 1, 2002, pp. 60-61.
Kee, "NEC PaPeRo might end up in homes next year", Ubergizmo, http://www.ubergizmo.com/2011/10/nec-papero-might-end-up-in-homes-next-year/, Oct. 21, 2011 (accessed Jun. 15, 2015), 4 pages.
PCT/US2014/026815, "International Application Serial No. PCT/US2014/026815, International Preliminary Report on Patentability and Written Opinion dated Sep. 24, 2015", JIBO, Inc., 8 Pages.
PCT/US2014/026815, "International Application Serial No. PCT/US2014/026815, International Search Report and Written Opinion dated Jun. 27, 2014", JIBO,Inc., 11 pages.
PCT/US2015/040581, "International Application Serial No. PCT/US2015/040581, International Search Report and Written Opinion dated Sep. 25, 2015", JIBO, Inc., 25 Pages.
SA, et al., "Intelligent Robot Systems based on PDA for Home Automation Systems in Ubiquitous", Chapter 18 in Cutting Edge Robotics 2010, Vedran Kordic (Ed.). InTech, http://www.intechopen.com/books/cutting-edge-robotics-2010/intelligent-robot-systems-based-on-pds-for-home-automation-systems-in-ubiquitous, 2010, pp. 279-301.
Saenz, "PaPeRo Is the TeleRobot Cute Enough to Kill Your Landline and Take Its Place", Singularity Hub, http://singularityhub.com/2011/03/28/papero-is-the-telerobot-cute-enough-to-kill-your-landline-and-take-its-place/, Mar. 28, 2011, 3 pages.
Wolf, "Much more than a friendly face! NEC's Research Robot PaPeRo", NEC Deutschland GmbH, Ismaning Germany, www.vol.at/2006/03/cebit_NEC_PaPeRo_English.pdf, Feb. 2006, 3 pages.
Valin et al., "Robust Localization and Tracking of Simultaneous Moving Sound Sources Using Beamforming and Particle Filtering," 37 pages (2006).

* cited by examiner

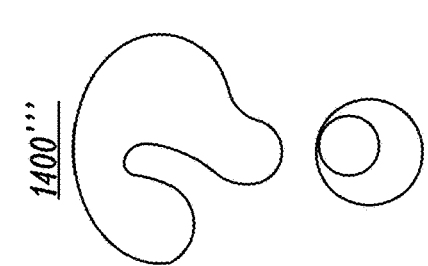
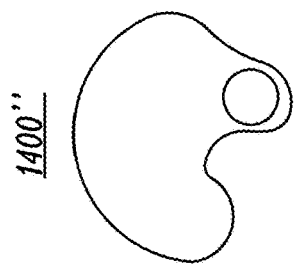
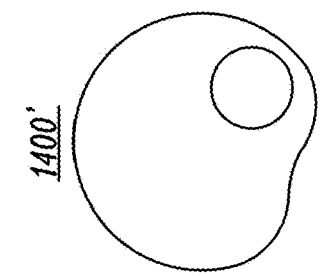
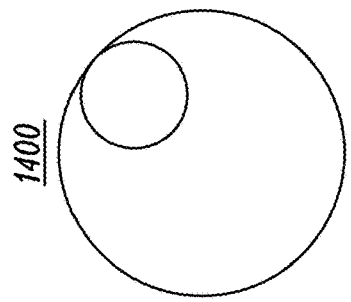
*FIG. 14*
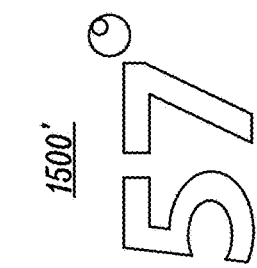
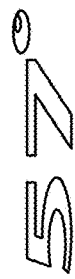
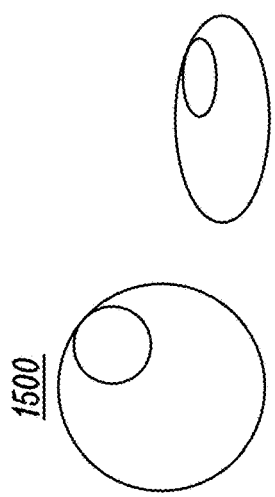
*FIG. 15*

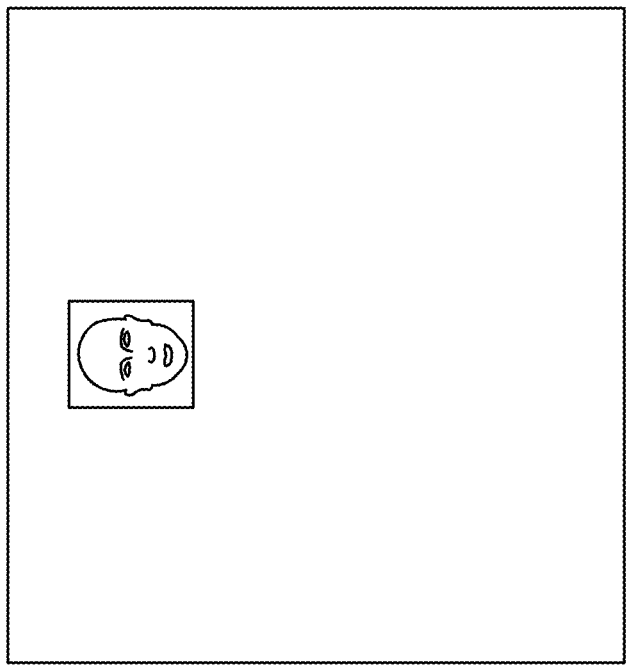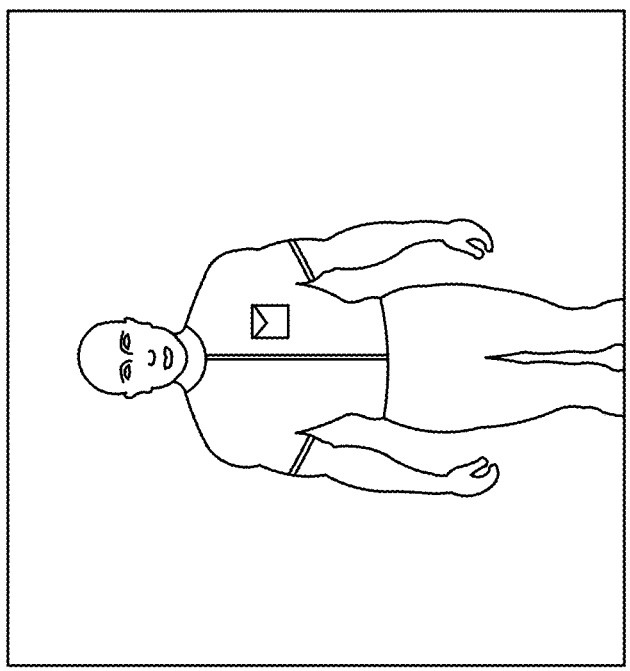
FIG. 20

FIG. 21

/USERS/JONATHAN/WORKSPACES/CONTENT/BOSNAP/BEHAVIORS/WF_IDLEGENERAL.JAON

RETURN TO PARENT

BEHAVIOR TREE

| BEHAVIOR TYPE | DESCRIPTION |
|---|---|
| SEQUENCE | ROOT |
| EXECUTESCRIPT | |
| TREEBEHAVIOR | RESETEYE |
| PARALLEL | |
|   LOADANIMATION | STILLHERE |
|   LOADANIMATION | SNEEZE |
|   LOADANIMATION | THANK YOU |
|   LOADANIMATION | WINK 1 |
|   LOADANIMATION | DEFAULT |
| SEQUENCE *(WHILE CONDITION) | |
|   TREE BEHAVIOR *(TIMEOUTSUCCEED) | AWARENESS |
| SELECT | |
|   PLAYANIMATIONMP3 *(FAILONCONDITION) | SIGH |
|   SEQUENCE *(FAILONCONDITION) | SNEEZE SEQUENCE |
|     PLAYANIMATIONMP3 | SNEEZE |
| PARALLEL *(TIMEOUTSUCCEED, SUCCEEDONLISTEN) | |
|   SEQUENCE *(WHILECONDITION) | |
|     BLINK | |
|     TIMEOUT/S | |
|   SELECT | |
|     PLAYANIMATIONMP3 *(FAILONCONDITION) | |
| EXECUTESCRIPT | |

SWAP
ADD DECORATOR
ADD SIBLING ABOVE
ADD SIBLING BELOW
ADD CHILD
REMOVE

EASY TO USE CONTEXT MENUS

PARALLEL: *(TIMEOUTSUCCEED.SUCCEEDONLISTEN

OPEN TREE

SUPPORTS DRAG AND DROP TO EASILY AUTHOR BEHAVIORS.

VISUAL REPRESENTATION OF BEHAVIORS

ITEM NAME

| ARGUMENTS | DESCRIPTION OF BEHAVIOR PARAMETERS |
|---|---|
| KEY STRING - THE KEY OF TH... | |
| GRAMMAR/FILE.FILE- THE GR... | |
| JIBO::BLESSYOU_SEARCH.RAW | |
| MODE/FILE.FILE-THE MODEL EG. JIBO::COMMAN... | |
| JIBO::BLESSYOU_NET.RAW | |
| LISTENFORLD.BOOKEN-DO WE EXPECT THIS TO... | |
| FALSE | |
| ONRESULT:FUNCTION-RETURNS THE RESULT O... | |
| VAR F = FUNCTION (RESULT) { | |
|   NOTEPAD.BLESSYOU = FALSE | | |
| IF [RESULT.ULTERANCE 11 RESULT... | BUILT IN JAVASCRIPT EDITOR. |
| RESULT.ULTERANCE [0]. TAGS [0]... | |
| NOTEPAD.BLESSYOU = TRUE | | |
| } | |

DECORATORS

| DECORATORS TYPE | NAME |
|---|---|
| ○ TIMEOUTSUCCEED | |
| □ SUCCEEDONLISTEN | |

| BEHAVIOUR | INFO | DESCRIPTION |
|---|---|---|
| SELECT | | |
| ☒ ANYBEHAVIOUR1 *(SUCCEEDELSEFAIL) | | PCD TAKES A PICTURE |
| ☒ ANYBEHAVIOUR2 *(SUCCEEDELSEFAIL) | | PCD PLAYS MUSIC |
| ☒ ANYBEHAVIOUR3 *(SUCCEEDELSEFAIL) | | SEND THAT EMAIL |
| ☒ ANYBEHAVIOUR4 *(SUCCEEDELSEFAIL) | | GO TO HOME SCREEN |
| ▷ | | |

DECORATOR ARGUMENTS 1
```
FUNCTION (){
  RETURN NOTEPAD.TAG === "RANDOMPICTURE";
}
```
— 2200

DECORATOR ARGUMENTS 2
```
FUNCTION (){
  RETURN NOTEPAD.TAG === "MUSIC";
}
```
— 2202

*FIG. 22*

| BEHAVIOUR | INFO | DESCRIPTION |
|---|---|---|
| ▷ ☒ GRAMMERSELECT | GRAMMER:UBER_GRAMMER | |
| ☒ ANYBEHAVIOUR1 | TAG: RANDOMPICTURE | PCD TAKES A PICTURE |
| ☒ ANYBEHAVIOUR2 | TAG: PLAYMUSIC | PCD PLAYS MUSIC |
| ☒ ANYBEHAVIOUR3 | TAG: EMAIL | SEND THAT EMAIL |
| ☒ ANYBEHAVIOUR4 | TAG: HOME | GO TO HOME SCREEN |

*FIG. 23*

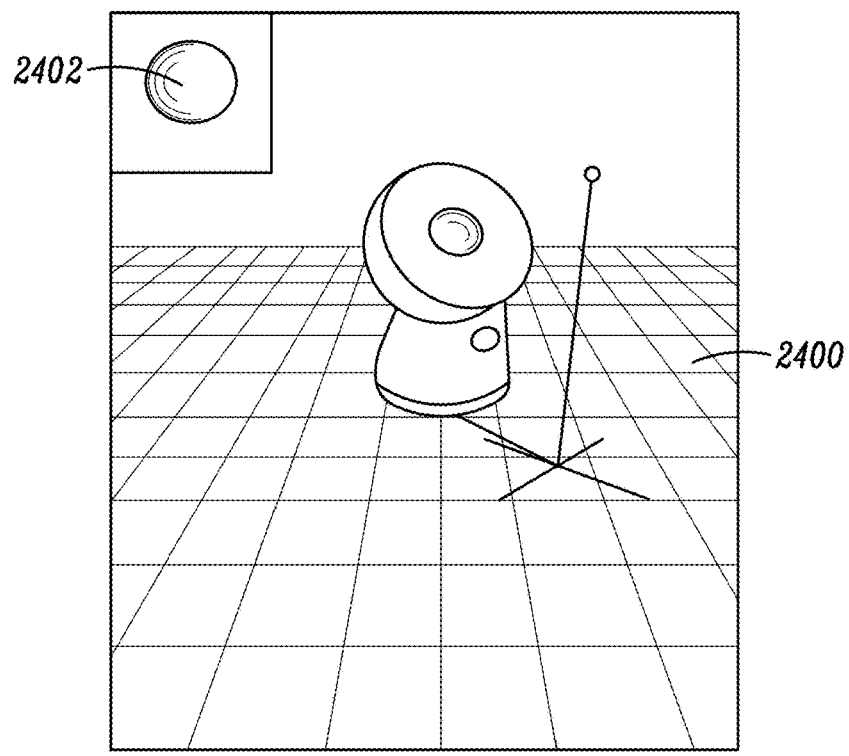
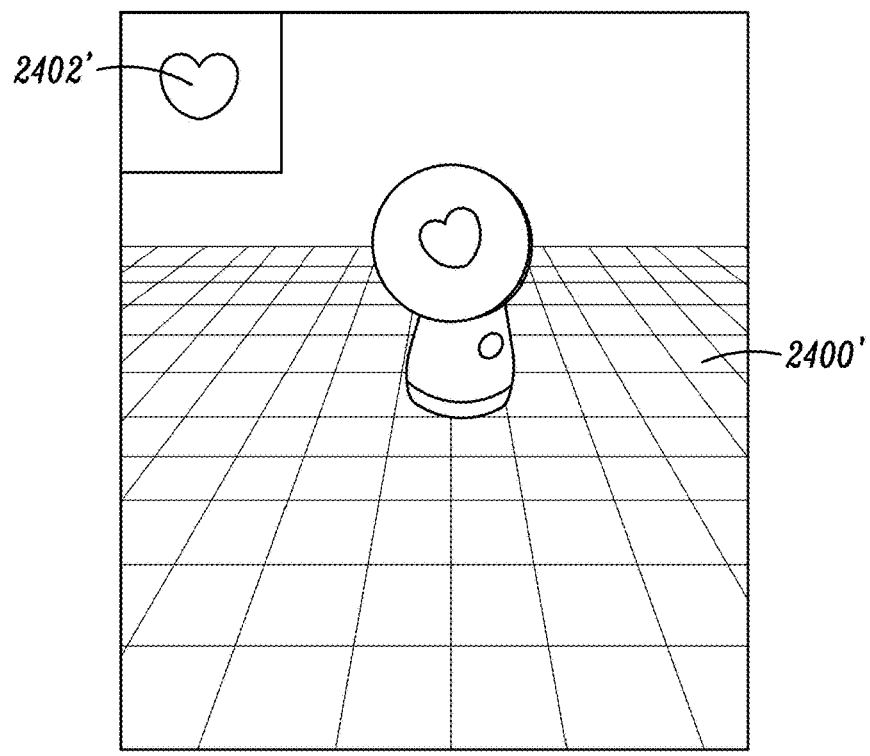
FIG. 24

MULTI-SEGMENT SOCIAL ROBOT

CROSS-REFERENCE TO RELATED APPLICATIONS

This application is a continuation of U.S. application Ser. No. 14/799,704, filed Jul. 15, 2015. U.S. application Ser. No. 14/799,704 claims the benefit of U.S. provisional patent application 62/024,738 filed Jul. 15, 2014 and also is a continuation-in-part of U.S. application Ser. No. 14/210,037, filed Mar. 13, 2014. U.S. patent application Ser. No. 14/210,037 claims the benefit of U.S. provisional patent application Ser. No. 61/788,732 filed Mar. 15, 2013.

All of the above applications are incorporated herein by reference in their entirety.

BACKGROUND

Field of the Invention

The present application generally relates to a persistent companion device. In particular, the present application relates to an apparatus and methods for providing a companion device adapted to reside continually in the environment of a person and to interact with a user of the companion device to provide emotional engagement with the device and/or associated with applications, content, services or longitudinal data collection about the interactions of the user of the companion device with the companion device.

Description of the Related Art

While devices such as smart phones and tablet computers have increasing capabilities, such as networking features, high definition video, touch interfaces, and applications, such devices are limited in their ability to engage human users, such as to provide benefits of companionship or enhanced emotional experience from interacting with the device. A need exists for improved devices and related methods and systems for providing companionship.

SUMMARY OF THE INVENTION

The present disclosure relates to methods and systems for providing a companion device adapted to reside continually in the environment of a person and to interact with a user of the companion device to provide emotional engagement with the device and/or associated with applications, content, services or longitudinal data collection about the interactions of the user of the companion device with the companion device. The device may be part of a system that interacts with related hardware, software and other components to provide rich interaction for a wide range of applications as further described herein.

In accordance with an exemplary and non-limiting embodiment, a development platform for developing a skill for a persistent companion device (PCD) comprises an asset development library having an application programming interface (API) configured to enable a developer to at least one of find, create, edit and access one or more content assets utilizable for creating a skill that is executable by the PCD, an expression tool suite having one or more APIs via which receive one or more expressions associated with the skill as specified by the developer wherein the skill is executable by the PCD in response to at least one defined input, a behavior editor for specifying one or more behavioral sequences of the PCD for the skill and a skill deployment facility having an API for deploying the skill to an execution engine for executing the skill.

In accordance with an exemplary and non-limiting embodiment, a platform for enabling development of a skill using a software development kit (SDK) comprises a logic level module configured to map received inputs to coded responses and a perceptual level module comprising a vision function module configured to detect one or more vision function events and to inform the logic level module of the one or more detected vision function events, a speech/sound recognizer configured to detect defined sounds and to inform the logic level module of the detected speech/sounds and an expression engine configured to generate one or more animations expressive of defined emotional/persona states and to transmit the one or more animations to the logic level module.

BRIEF DESCRIPTION OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 14 illustrates an example of displaying a recurring, persistent, or semi-persistent, visual element, according to an exemplary and non-limiting embodiment.

FIG. 15 illustrates an example of displaying a recurring, persistent, or semi-persistent, visual element, according to an exemplary and non-limiting embodiment.

FIG. 20 is an illustration of exemplary and non-limiting screen shots of a local perception space (LPS) visualization tool that may allow a developer to see the local perception space of the PCD.

FIG. 21 is an illustration of a screenshot of a behavior editor according to an exemplary and non-limiting embodiment.

FIG. 22 is an illustration of a formal way of creating branching logic according to an exemplary and non-limiting embodiment.

FIG. 23 is an illustration of an exemplary and non-limiting embodiment whereby select logic may be added as an argument to a behavior.

FIG. 24 is an illustration of an exemplary and non-limiting embodiment of a simulation window.

DETAILED DESCRIPTION

Figure 1:
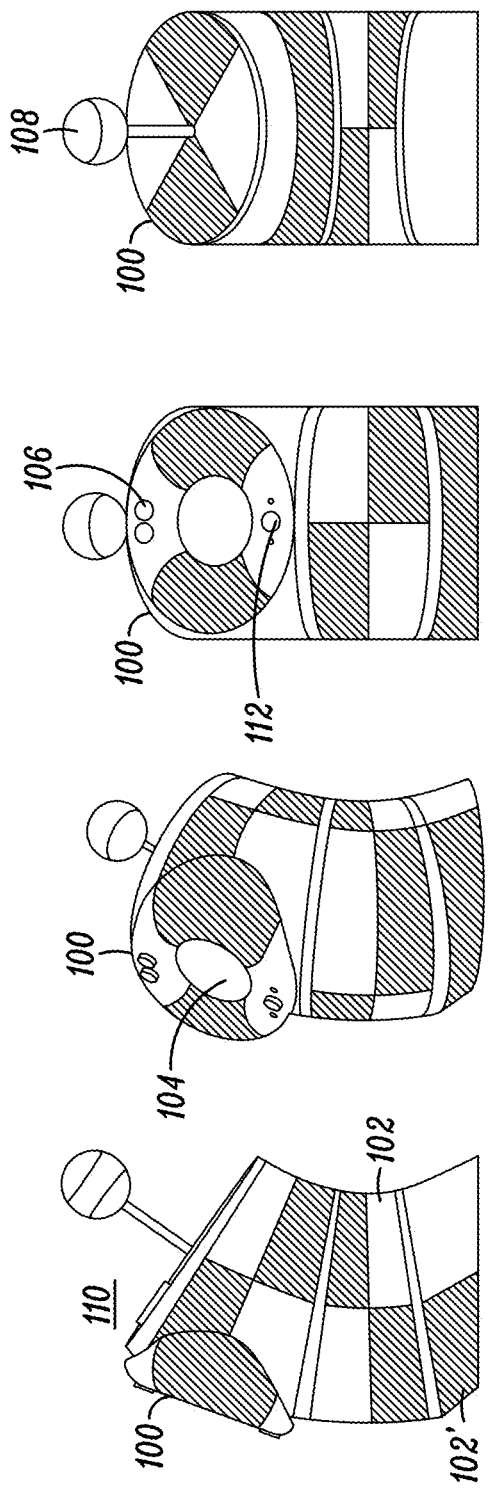
FIG. 1 illustrates numerous views of PCD according to exemplary and non-limiting embodiments.

In accordance with exemplary and non-limiting embodiments, there is provided and described a Persistent Companion Device (PCD) for continually residing in the environment of a person/user and to interact with a user of the companion device. As used herein, "PCD" and "social robot" may be used interchangeably except where context indicates otherwise. As described more fully below, PCD provides a persistent, social presence with a distinct persona that is expressive through movement, graphics, sounds, lights, and scent. There is further introduced below the concept of a "digital soul" attendant to each embodiment of PCD. As used herein, "digital soul" refers to a plurality of attributes capable of being stored in a digital format that serve as inputs for determining and executing actions by a PCD. As used herein, "environment" refers to the physical environment of a user within a proximity to the user sufficient to allow for observation of the user by the sensors of a PCD.

This digital soul operates to engage users in social interaction and rapport-building activities via a social-emotional/interpersonal feel attendant to the PCD's interaction/interface. As described more fully below, PCD 100 may perform a wide variety of functions for its user. In accordance with exemplary and non-limiting embodiments described in detail below, PCD may (1) facilitate and supporting more meaningful, participatory, physically embedded, socially situated interactions between people/users and (2) may engage in the performance of utilitarian tasks wherein PCD acts as an assistant or something that provides a personal service including, but not limited to, providing the user with useful information, assisting in scheduling, reminding, providing particular services such as acting as a photographer, to help the family create/preserve/share the family stories and knowledge (e.g., special recipes), etc., and (3) entertaining users (e.g., stories, games, music, and other media or content) and providing company and companionship.

In accordance with exemplary and non-limiting embodiments, various functions of PCD may be accomplished via a plurality of modes of operation including, but not limited to:

i. Via a personified interface, optionally expressing a range of different personality traits, including traits that may adapt over time to provide improved companionship.

ii. Through an expressive, warm humanized interface that may convey information as well as affect. As described below, such an interface may express emotion, affect and personality through a number of cues including facial expression (either by animation or movement), body movement, graphics, sound, speech, color, light, scent, and the like.

iii. Via acquiring contextualized, longitudinal information across multiple sources (sensors, data, information from other devices, the Internet, GPS, etc.) to render PCD increasingly tailored, adapted and tuned to its user(s).

iv. Via adaptive self-configuring/self healing to better match the needs/wants of the user.

v. Via considering the social and emotional particulars of a particular situation and its user.

With reference to FIG. 1, there is illustrated numerous views of PCD 100 according to exemplary and non-limiting embodiments. As illustrated, PCD 100 incorporates a plurality of exemplary input/sensor devices including, for example, capacitive sensors 102, 102. One or more Capacitive sensors 102 may operate to sense physical social interaction including, but not limited to, stroking, hugging, touching and the like as well as potentially serving as a user interface. PCD 100 may further incorporates touch screen 104 as a device configured to receive input from a user as well as to function as a graphic display for the outputting of data by PCD 100 to a user. PCD 100 may further incorporate one or more cameras 106 for receiving input of a visual nature including, but not limited to, still images and video. PCD 100 may further incorporate one or more joysticks 108 to receive input from a user. PCD 100 may further incorporate one or more speakers 110 for emitting or otherwise outputting audio data. PCD 100 may further incorporate one or more microphones 112.

PCD Software Architecture

Figure 2:
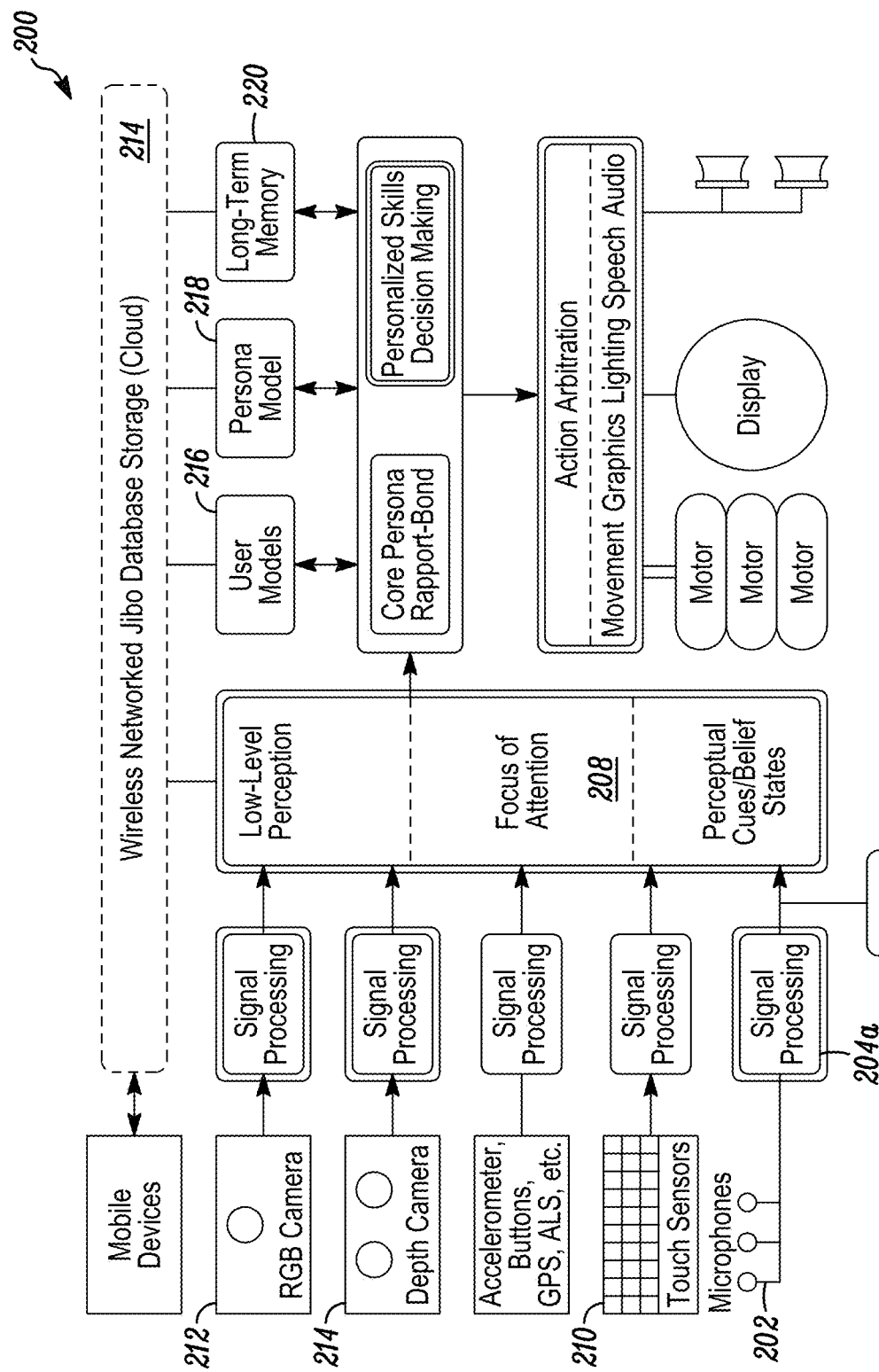
FIG. 2 illustrates software architecture of the PCD according to exemplary and non-limiting embodiments.

With reference to FIG. 2, there is illustrated a block diagram depicting software architecture 200 according to exemplary and non-limiting embodiments. The software architecture 200 may be adapted to technologies such as artificial intelligence, machine learning, and associated software and hardware systems that may enable the PCD 100 to provide experience to life as an emotionally resonant persona that may engage people through a robotic embodiment as well as through connected devices across wide range of applications.

In accordance with exemplary and non-limiting embodiments, the intelligence associated with the PCD 100 may be divided into one or more categories that may encode the human social code into machines. In some embodiments, these one or more categories may be a foundation of a PCD's cognitive-emotive architecture. The one or more categories may include but not limited to psycho-social perception, psycho-social learning, psycho-social interaction, psycho-social expression and the like. The psycho-social perception category of intelligence may include an integrated machine perception of human social cues (e.g., vision, audition, touch) to support natural social interface and far-field interaction of the PCD 100. The psycho-social learning category may include algorithms through which the PCD 100 may learn about people's identity, activity patterns, preferences, and interests through direct interaction and via data analytics from the multi-modal data captured by the PCD 100 and device ecosystem. The PCD may record voice samples of people entering its near or far field communication range and make use of voice identification systems to obtain identity and personal data of the people detected. Further, the PCD may detect the UUID broadcasted in the Discovery Channel of BLE enabled devices and decode personal data associated with the device user. The PCD may use the obtained identity and personal data to gather additional personal information from social networking sites like Facebook, Twitter, LinkedIn, or similar. The PCD may announce the presence and identity of the people detected in its near or far field communication range along with a display of the constructed personal profile of the people.

The psycho-social interaction category may enable the PCD 100 to perform pro-active decision making processes so as to support tasks and activities, as well as rapport building skills that build trust and emotional bond with people—all through language and multi-modal behavior. The psycho-social expression category of the intelligence may enable the PCD 100 to orchestrate its multi-modal outputs to "come to life", to enliven content, and to engage people as an emotionally attuned persona through an orchestra of speech, movement, graphics, sounds and lighting. The architecture 200 may include modules corresponding to multi-modal machine perception technologies, speech recognition, expressive speech synthesis, as well as hardware modules that leverage cost effectiveness (i.e., components common to mobile devices). As illustrated in FIG. 1, there is provided one or more software subsystems within the PCD 100 and these one or more subsystems will be described in more detail below.

Psycho-Social Perception

The psycho-social perception of the PCD 100 may include an aural perception that may be used to handle voice input, and a visual-spatial perception that may be used to assess the location of, capture the emotion of, recognize the identity and gestures of, and maintain interaction with users. The aural perception of the PCD 100 may be realized using an array of microphones 202, one or more signal processing techniques such as 204 and an automatic speech recognition module 206. Further, the aural perception may be realized by leveraging components and technologies created for the mobile computing ecosystem with unique sensory and processing requirements of an interactive social robot. The PCD 100 may include hardware and software to support multi-modal far-field interaction via speech using the microphone array 202 and noise cancelling technology using the signal processing module 204a, as well as third-party solutions to assist with automatic speech recognition module 206 and auditory scene analysis.

The PCD 100 may be configured to adapt to hear and understand what people are saying in a noisy environment. In order to do this, a sound signal may be passed through the signal processing module 204a before it is passed into the automatic speech recognizer (ASR) module 206. The sound signal is processed to isolate speech from static and dynamic background noises, echoes, motors, and even other people talking so as to improve the ASR's success rate.

In accordance with exemplary and non-limiting embodiments, the PCD 100 may be configured to use an array of at least 4 MEMS microphones in a spatial configuration. Further, a sound time-of-arrival based algorithm (referred herein to as a beam-forming algorithm) may be employed to isolate sound in a particular direction. Using all six microphone signals, a direction vector, and the placement of the microphones, the beam-forming algorithm may isolate sound coming from a particular spatial source. The beam-forming algorithm may be able to provide information about multiple sources of sound by allowing multiple beams simultaneously. In addition, a speech-non speech detection algorithm may be able to identify the speech source, and provide spatial localization of the speaker. In some embodiments, the beam-forming information may be integrated with a vision and awareness systems of the PCD 100 so as to choose the direction, as well as motor capability to turn and orient. For example, a 3D sensor may be used to detect location of a person's head in 3D space and accordingly, the direction may be communicated to the beam-forming algorithm which may isolate sounds coming from the sensed location before passing that along to the ASR module 206.

During operation, the PCD 100 may generate sound either by speaking or making noises. The signal processing module 204a may be configured to prevent these sounds from being fed back through the microphone array 202 and into the ASR module 206. In order to remove speaker noise, signal processing module 204a may employ algorithms that may subtract out the signal being fed to the speaker from the signal being received by the microphone. In order to reduce harmonically-rich motor noise, the PCD 100 may be configured to implement mechanical approach and signal processing techniques.

In some embodiments, the PCD 100 may monitor different ports of a motor so as to address the noise generated from these parts of the motor. In an example, the PCD 100 may be configured to mount the motor in an elastomeric material, which may absorb high frequencies that may be produced by armature bearings in the form of a whirring sound. The motor may include brushes that may produce a hissing sound, which is only noticeable when the motor is rotating at high speeds. Accordingly, the PCD 100 may exhibits animations and movements at a relatively low speed so as to avoid the hissing sound. Additionally, the PCD 100 may be configured to implement a lower gear ratio and further, by reducing the speed of the motor so as to the hissing sound. Typically, a lower quality PWM drives, like those found in hobbyist servos, may produce a high-pitched whine. The PCD 100 may be configured with good quality PWM drives so as to eliminate this part of the motor noise. Generally, gears of the motor may cause a lower pitched grinding sound, which accounts for the majority of the motor noise. The final gear drive may bear the most torque in a drive train, and is thus source of the most noise. The PCD 100 may be configured to replace the final gear drive with a friction drive so as to minimize this source of noise. In addition, the PCD 100 may be configured to employ signal processing techniques so as to reduce noise generated by the motor. In an embodiment, the microphone may be placed next to each motor so that noise signal may be subtracted from the signals in the main microphone array 202.

An output of the audio pipeline of the PCD 100 may feed the cleaned-up audio source into the ASR module 206 that may convert speech into text and possibly into alternative competing word hypotheses enriched with meaningful confidence levels, for instance using ASR's n-best output or word-lattices. The textual representation of speech (words)

may then be parsed to "understand" the user's intent and user's provided information and eventually transformed into a symbolic representation (semantics). The ASR module 206 may recognize speech from users at a normal volume and at a distance that corresponds to the typical inter-personal communication distance. In an example, the distance may be near to 5-6 feet or greater dependent on a multitude of environmental attributes comprising ambient noise and speech quality. In an example, the speech recognition range should cover an area of a typical 12 ft. by 15 ft. room. The signal fed to the ASR module 206 will be the result of the microphone-array beam-forming algorithm and may come from an acoustic angle of about +/−30 degrees around the speaker. The relatively narrow acoustic angle may allow to actively reducing part of the background ambient noise and reverberation, which are the main causes of poor speech recognition accuracy. In a scenario where the speech signal is too low, for instance due to the speaker being too far from the microphones, or the speaker speaking too softly, the PCD 100 may proactively request the speaker to get closer (e.g., if the distance of the speaker is available as determined by the 3D sensor) or to speak louder, or both. In some embodiments, the PCD 100 may be configured to employ a real-time embedded ASR solution which may support large vocabulary recognition with grammars and statistical language models (SLMs). Further, the acoustic ASR models may be trained/tuned using data from an acoustic rig so as to improve speech recognition rates.

In accordance with exemplary and non-limiting embodiments, the PCD 100 may be configured to include a natural language processing layer that may be sandwiched between the ASR module 206 and an interaction system of the PCD 100. The natural language processing layer may include natural language understanding (NLU) module that may take the text generated by the ASR and assign meaning to that text. In some embodiments, the NLU module may configured to adapt to formats such as augmented backus-naur form (BNF) notation, java speech grammar format (JSGF), or speech recognition grammar format (SRGF), which may be supported by the above mentioned embedded speech recognizers. As more and more user utterances are collected, the PCD 100 may gradually transform traditional grammars into statistical grammars that may provide higher speech recognition and understanding performance, and allow for automatic data-driven adaptation.

In accordance with exemplary and non-limiting embodiments, the PCD 100 may be configured to design a structured interaction flow (based on the task network representation adopted for brain of the PCD 100) using multimodal dialog system user interface design principles for each interaction task. The interaction flow may be designed to receive multimodal inputs (e.g. voice and touch) sequentially (e.g. one input at a time) or simultaneously (e.g. inputs may be processed independently in the order they are received) and to generate multimodal outputs (e.g. voice prompts, PCD's movements, display icons and text). An as example and not as a limitation, the PCD 100 may ask a yes/no question, an eye of the PCD 100 may morph into a question mark shape with yes/no icons that may be selected by one or more touch sensors. In an embodiment, the PCD 100 may be adapted to process natural language interactions that may be expressing the intent (e.g. Hey! Let's take a picture!). In an embodiment, interactions may be followed in a "directed dialog" manner. For instance, after the intent of taking a picture has been identified, the PCD 100 may ask directed questions, either for confirming what was just heard or asking for additional information (e.g. Do you want me to take a picture of you?).

Visual-Spatial Perception

In accordance with exemplary and non-limiting embodiments, the PCD 100 may be configured to employ one or more visual-spatial perception sensors such as a RGB camera 212, a depth camera 214 and other sensors so as to receive 2D vision, 3D Vision, or sense motion or color. The PCD 100 may be configured to attain emotion perception of the user in the surrounding environment. For example, the PCD 100 may detect an expressed emotional state of each person. The PCD 100 may include a visual-spatial perception subsystem to keep track of the moment-to-moment physical state of users and the environment. This subsystem may present the current state estimate of users to the other internal software modules as a dynamically updated, shared data structure called the Local Perceptual Space (LPS) 208. The LPS may be built by combining multiple sensory input streams in a single 3D coordinate system centered on a current location of the PCD 100, while sensors may be registered in 3D using kinematic transformations that may account for his movements. In an embodiment, the LPS 208 may be designed to maintain multiple 'levels' of information, each progressing to higher levels of detail and may require processing and key sensor inputs. The LPS 208 levels may include:

Person Detection: This level may detect persons present in nearby surroundings. For example, the PCD 100 may calculate the number of nearby persons using the sensors. In an embodiment, a visual motion queue in the system may be employed to orient the PCD 100. Further, pyroelectric infra red (PIR) sensing and a simple microphone output may be integrated to implement wake up on the microcontroller so that the system can be in a low-power 'sleep' state, but may still respond to someone entering the room. This may be combined with visual motion cues and color segmentation models to detect the presence of people. The detection may be integrated with the LPS 208.

Person Tracking: The PCD 100 may be configured to locate the person in 3D and accordingly, determine the trajectory of the person using sensors such as vision, depth, motion, sound, color, features & active movement. For example, a combination of visual motion detection and 3D person detection may be used to locate the user (especially their head/face). Further, the LPS 208 may be adapted to include temporal models and other inputs to handle occlusions and more simultaneous people. In addition to motion and 3D cues, the system may learn (from moving regions and 3D) a color segmentation model (Naive Bayes) online from images to adaptively separate the users face and hands from the background and combine the results of multiple inputs with the spatial and temporal filtering of the LPS 208 to provide robust person location detection for the system.

Person Identification: The PCD 100 may identify a known and an unknown person using vision sensors, auditory sensors or touch inputs for person ID. In an example, one or more open source OpenCV libraries may be used for face identification module. In addition, person tracking information and motion detection may be combined to identify a limited set of image regions that are candidates for face detection.

Pose/Gesture Tracking: The PCD 100 may identify pose or posture of each person using visual classification (e.g., face, body pose, skeleton tracking, etc.), or touch mapping. In an embodiment, 3D data sets may be used to incorporate this feature with the sensor modalities of the PCD 100. In an example, an open source gesture recognition toolkit may be adopted for accelerating custom gesture recognition based on visual and 3D visual feature tracking.

Attention Focus: The PCD 100 may be configured to determine focus area so that the PCD 100 may point to or look at the determined focus area. Various sensors may be combined into set of locations/directions for attention focus. For example, estimated location of people may generate a set of attention focus locations in the LPS 208. These may be the maximum likelihood locations for estimations of people, along with the confidence of the attention drive for the given location. The set of focus points and directions are rated by confidence and an overall summary of LPS 208 data for use by other modules is produced. The PCD 100 may use these focus points and directions to select gaze targets so as to address users directly and to 'flip its gaze' between multiple users seamlessly. Additionally, this may allow the PCD 100 robot to look at lower-confidence locations to confirm the presence of nearby users.

In accordance with exemplary and non-limiting embodiments, the PCD 100 may be configured to include activity estimation in the system or may incorporate more sensor modalities for tracking and identification by voice input as well as estimation of emotional state from voice prosody. The LPS 208 may combine data from multiple inputs using grid-based particle filter models for processed input features. The particle filters may provide support for robust on-line estimation of the physical state of users as well as a representation for multiple hypothesis cases when there is significant uncertainty that must to be resolved by further sensing and actions on the PCD's part. The particle filtering techniques may also naturally allow a mixture of related attributes and sensory inputs to be combined into a single probabilistic model of physically measurable user state without requiring an explicit, closed form model of the joint distribution. Further, Grid based particle filters may help to fuse the inputs of 3D (stereo) and 2D (vision) sensing in a single coordinate system and enforce the constraint that the space may be occupied by only one object at any given time.

In accordance with exemplary and non-limiting embodiments, the PCD 100 may be configured to include heuristic proposal distributions and heuristic transition models that may help capture model user state over time even when the PCD 100 may not be looking at them directly. This may allow natural turn taking multi-party conversations using verbal and non-verbal cues with the PCD 100 and may easily fit within the particle filtering framework. As a result, this may allow combining robust statistical estimation with human-centric heuristics in a principled fashion. Furthermore, the LPS 208 may learn prior probability distributions from repeated interaction and will adapt to the 'hot spots' in a space where people may emerge from hallways, doors, and around counters, and may use this spatial information to automatically target the most relevant locations for users. The low-level image and signal processing code may be customized and based on quality open source tools such as OpenCV, the integrating vision toolkit (IVT), Eigen for general numerical processing and processor-specific optimization libraries In accordance with exemplary and non-limiting embodiments, the PCD 100 may be configured to recognize from a video stream various levels of emotions such as joy, anger, contempt, disgust, fear, sadness, confusion, frustration, and surprise. In an embodiment, the PCD 100 may be configured to determine head position, gender, age, and whether someone is wearing glasses, has facial hair, etc.

In accordance with exemplary and non-limiting embodiments, the audio input system is focused on the user. In some embodiments, the PCD 100 may be configured to update the direction of the audio beam-forming function in real time for example, depending on robot movement, kinematics and estimated 3D focus of attention directions. This may allow the PCD 100 to selectively listen to specific 'sectors' where there is a relevant and active audio input. This may increase the reliability of ASR and NLU functions through integration with full 3D person sensing and focus of attention.

Spatial Probability Learning

In accordance with exemplary and non-limiting embodiments, spatial probability learning techniques may be employed to help PCD 100 to engage more smoothly when users enter his presence. Over time, the PCD 100 may remember the sequences of arrival and joint presence of users and accumulate these statistics for a given room. This may give the PCD 100 an ability to predict engagement rules with the users on room entry and thereby, may enable the PCD 100 to turn a sector for a given time period and even guess the room occupants. For example, this feature may provide the PCD 100 an ability to use limited predictions to support interactions like "Hey, Billy is that you?" before the PCD 100 may have fully identified someone entering the room. The PCD 100 may be turning to the spatial direction most likely to result in seeing someone at that time of day at the same time.

Psycho-Social Interaction

In accordance with exemplary and non-limiting embodiments, the PCD 100 may be a fully autonomous, artificial character. The PCD 100 may have emotions, may select his own goals (based on user input), and execute a closed loop real-time control system to achieve those goals to keep users happy and healthy. The psycho-social interaction module (PSIM) is a top layer of the closed loop, discrete time control system that may process outputs of the sensors and select actions for outputs and expressions. Various supporting processes may proceed concurrently on CPU, and sensory inputs may be delivered asynchronously to decision-making module. The "tick" is the decision cycle where the accumulated sensor information, current short-term memory/knowledge and task-driven, intentional state of the PCD 100 may be combined to select new actions and expressions.

Figure 3:
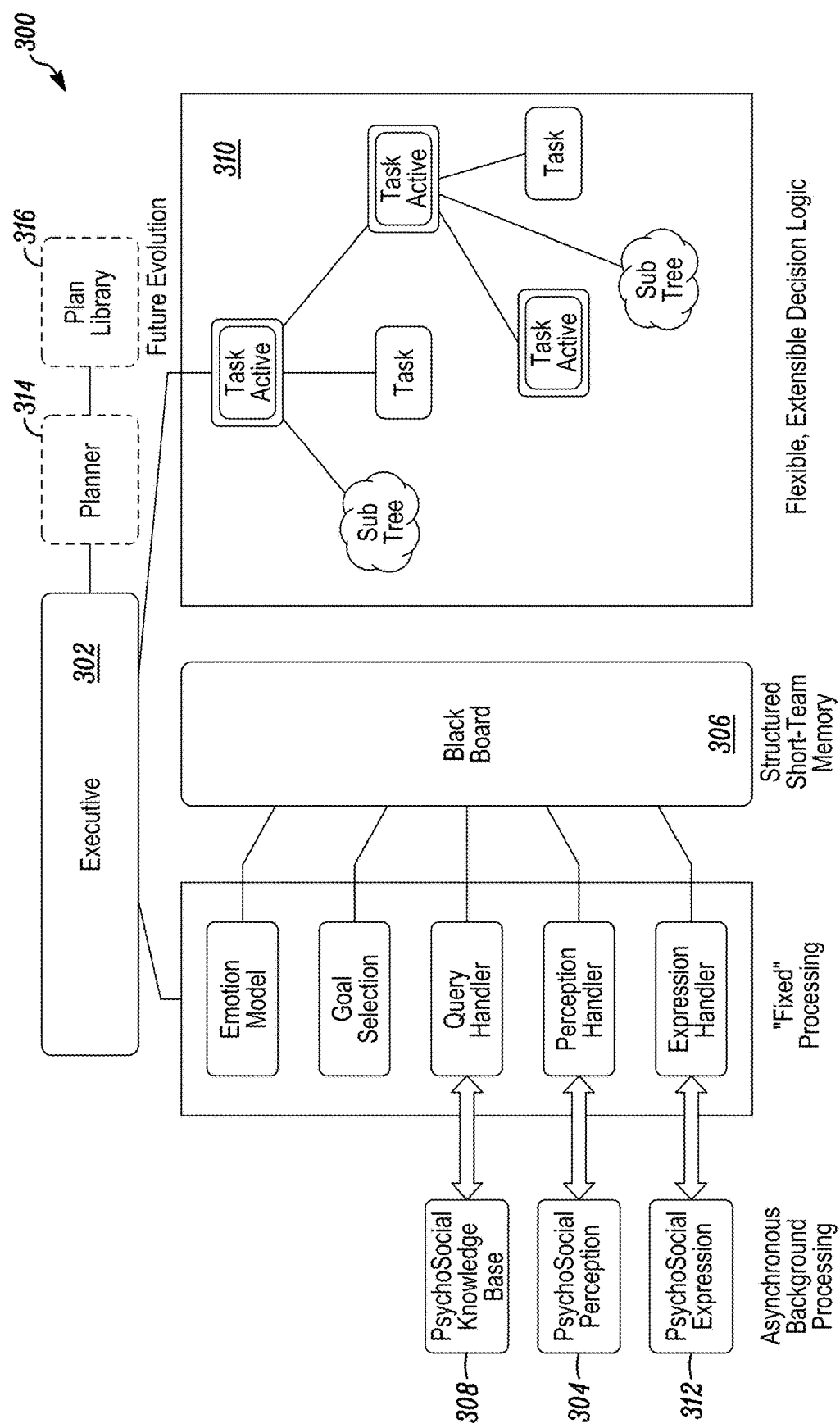
FIG. 3 illustrates architecture of a psycho-social interaction module (PSIM) according to exemplary and non-limiting embodiments.

FIG. 3A depicts architecture of the PSIM 300 in accordance with the exemplary and non-limiting embodiments. The core of the PSIM 300 is an executive 302 that orchestrates the operation of the other elements. The executive 302 is responsible for the periodic update of the brain of the PCD 100. Each "tick" of the PSIM 300 may include a set of processing steps that move towards issuing new commands to the psycho-social expression module in a following fashion Internal Update:
a. Emotion Update
b. Goal Selection Input Handling:
a. Asynchronous inputs from the psycho-social perception 304 are sampled and updated into the black board 306 of the decision module.
b. The input may include information such as person locations, facial ID samples, and parsed NLU utterances form various users.
c. Only new information that may need to be updated as the black board 306 may act like a cache.
d. In addition, information relevant to current Tasks may need to be captured.

Query Handling:
a. Results from any knowledge query operations are sampled into the blackboard 306 from the psycho-social knowledge base 308.
b. This may collect the results of deferred processing of query operations for use in current decisions.

Task Network 310: Think/Update
a. The executive 302 may run the "think" operation of the task network 310 and any necessary actions and decisions are made at each level. The set of active nodes in the task network 310 may be updated during this process.
b. The task network 310 is a flexible form of state machine based logic that acts as a hierarchical controller for the robots interaction.

Output Handling:
a. Outputs loaded into specific blackboard 306 frames are transferred to the psycho-social expression module 312.

In accordance with exemplary and non-limiting embodiments, the executive 302 may also provide the important service of asynchronous dispatch of the tasks in the task network 310. Any task in the network 310 may be able to defer computation to concurrent background threads by requesting an asynchronous dispatch to perform any compute intensive work. This feature may allow the task network 310 to orchestrate heavyweight computation and things like slow or even blocking network I/O as actions without "blocking" the decision cycle or changing the reactivity of decision process of the PCD 100. In some embodiments, the executive 302 may dispatch planning operations that generate new sections of the task network 310 and they will be dynamically attached to the executing tree to extend operation through planning capabilities as the products intelligence matures. The task network 310 may be envisioned as a form of Concurrent Hierarchical Finite State Machine (CHFSM). However, the approach used by behavior tree designs has had great success in allowing human designers and software engineers to work together to create interactive experiences within a content pipeline. The task network design may enable clean, effective implementation and composition of tasks in a traditional programming language.

Figure 4:
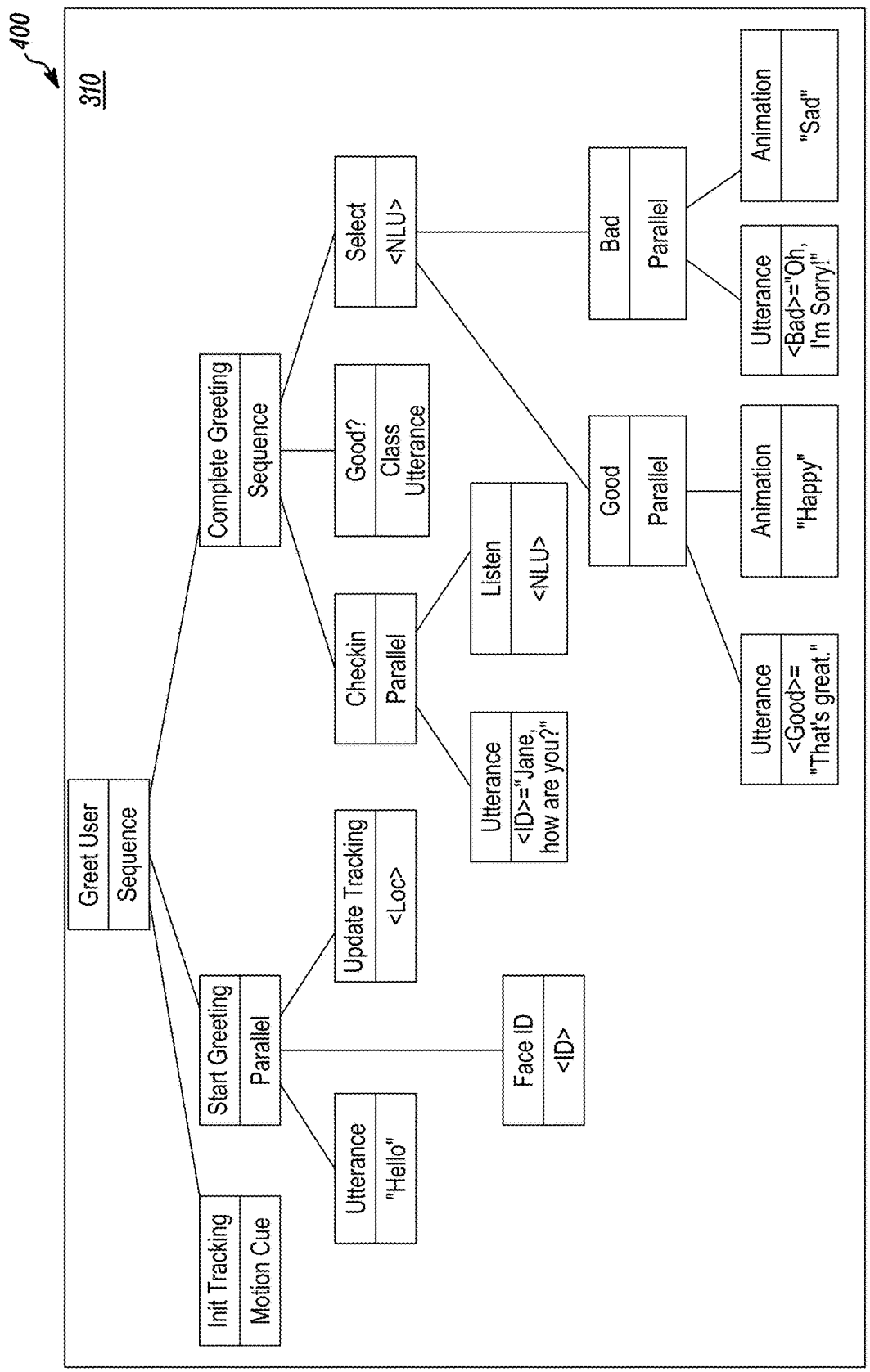
FIG. 4 illustrates a task network that shows a simplified version of a greeting interaction by the PCD according to exemplary and non-limiting embodiments.

FIG. 4 illustrates a task network that shows a simplified version of a greeting interaction by the PCD 100. The architecture of the task network 310 enable various expressions, movements, sensing actions and speech to be integrated within the engine, and thereby giving designers complete control over interaction dynamics of the PCD 100. As illustrated, a tiny portion of the network is active at any time during the operation. The visual task network representation may be used to communicate in both a technical and design audience as part of content creation. In this example, the PIR sensor of the PCD 100 has detected a person entering the area. The PCD 100 is aware of the fact that the PCD 100 may need to greet someone and starts the "Greet User" sequence. This "Greet User" sequence may initialize tracking on motion cues and then say "Hello", while updating tracking for the user as they approach. The PCD 100 may keep updating the vision input to capture a face ID of the User. In this scenario, the ID says it's Jane so the PCD 100 moves on to the next part of the sequence where the PCD 100 may form an utterance to check in on how Jane is doing and opens his ASR/NLU processing window to be ready for responses. Once Jane says something, a knowledge query may be used to classify the utterance into "Good" or "Bad" and the PCD 100 may form an appropriate physical and speech reaction for Jane to complete his greeting. The network may communicate the concept of how the intelligence works.

Psycho-Social Expression

In accordance with exemplary and non-limiting embodiments, the PCD 100 may be configured to include an engine that may complement the sociable nature of the PCD 100. For example, the engine may include a tagging system for modifying the speech output. The engine may allow controlling the voice quality of the PCD 100. In an example, recordings may be done by a voice artist so as to control voice of the PCD 100. The engine may include features such as high quality compressed audio files for embedded devices and a straightforward pricing model. Further, the PCD 100 may include an animation engine for providing animations for physical joint rotations; graphics, shape, texture, and color; LED lighting, or mood coloring; timing; and any other expressive aspect of the PCD 100. These animations can be accompanied by other expressive outputs such as audio cues, speech, scent, etc. The animation engine may then play all or parts of that animation at different speeds, transitions, and between curves, while blending it with procedural animations in real-time. This engine may flexibly accommodate different PCD models, geometry, and degrees of freedom.

Dynamic Targeting

In accordance with exemplary and non-limiting embodiments, the PCD 100 may be configured to employ an algorithm that may orient PCD 100 towards points in 3D space procedurally. The eyes of the PCD 100 may appear to be fixed on a single point while the body of the PCD 100 may be playing a separate animation, or the eye may lead while the body may follow to point in a particular direction. In an embodiment, a closed-form, geometric solver to compute PCD's look-at target may be used. This target pose is then fed into a multi-target blend system which may include support for acceleration constraints, additive blending/layering, and simulated VOR (vestibule-ocular reflex).

Simulation

In accordance with exemplary and non-limiting embodiments, the animation engine may include a simulator that may play and blend animations and procedural animations virtually. The simulator may simulate sensory input such as face detection. In some embodiments, a physical simulation into the virtual model may be built, taking into account the mass of the robot, the power of the motors, and the robot's current draw limits to validate and test animations.

Eye

In accordance with exemplary and non-limiting embodiments, the graphical representation of the personal, e.g., the eye of the PCD 100, may be constructed using joints to allow it to morph and shape itself into different objects. An eye graphics engine may use custom animation files to morph the iris into different shapes, blink, change its color, and change the texture to allow a full range of expression.

Graphics

The PCD API may support the display of graphics, photos, animations, videos, and text in a 2D scene graph style interface.

Platform and Ecosystem

The PCD 100 is a platform, based on a highly integrated, high-performance embedded Linux system, coupled with an ecosystem of mobile device "companion" apps, a cloud-based back-end, and an online store with purchasable content and functionality.

PCD SDK

The PCD SDK may take advantage of JavaScript and the open language of the modern web development community so as to provide an open and flexible platform on which third party developers can add capabilities with a low learning curve. All PCD apps, content and services created by the PCD SDK are available for download from the PCD App Store. All of PCD's functions, including TTS, sensory awareness, NLU, animations, and the others will be available through the PCD API. This API uses NodeJS, a JavaScript platform that is built on top of V8, Chrome's open source JavaScript engine. NodeJS uses an event driven model that is fast and efficient and translates well into robotics programming. NodeJS comes with a plethora of functionality out-of-the-box and is easily extensible as add-ons. PCD's API will be a NodeJS add-on. Because add-ons are also easily removed or modified, the ways may be controlled in which developers are able to interact with PCD. For example, developers may create an outbound socket, but also limit the number of outbound connections.

Cloud Architecture

In accordance with exemplary and non-limiting embodiments, a sophisticated cloud-based back end platform may be used to support PCD's intelligence, to retrieve fresh content and to enable people to stay connected with their family. The PCD device in the home may connect to PCD servers in the cloud via Wi-Fi. access to PCD cloud servers relies on highly secure and encrypted web communication protocols. Various applications may be developed for iOS, Android and HTML5 that may support PCD users, caregivers and family members on the go. With these mobile and web apps, the PCD 100 may always be with you, on a multitude of devices, providing assistance and all the while learning how to better support your preferences, needs and interests. Referring to FIG. 2, the PCD 100 may be configured to mirror in the cloud all the data that may make the PCD 100 unique to his family, so that users can easily upgrade to future PCD robot releases and preserve the persona and relationships they've established. For example, PCD's servers may be configured to collect data in the cloud storage 214 and compute metrics from the PCD robot and other connected devices to allow machine learning algorithms to improve the user models 216 and adapt the PCD persona model 218. Further, the collected data at the cloud storage 214 may be used to analyze what PCD features are resonating best with users, and to understand usage patterns across the PCD ecosystem, in order to continually improve the product offering.

In accordance with exemplary and non-limiting embodiments, a cloud-based back end platform may contain a data base system to be used for storage and distribution of data that is intended to be shared among a multitude of PCSs. The cloud-based back end platform may also host service applications to support the PCDs in the identification of people (for example Voice ID application) and the gathering of personal multi-modal data through interworking with social networks.

Cloud-Based Server

In accordance with exemplary and non-limiting embodiments, the one or more PCD 100 may be configured to communicate with a cloud-based server back-end using RESTful-based web services using compressed JSON.

Security

In accordance with exemplary and non-limiting embodiments, a zero-configuration network protocol along with an OAUTH authentication model may be used to validate identity. Further, Apache Shiro may provide additional security protocols around roles and permissions. All sensitive data will be sent over SSL. On the server side, data using a strict firewall configuration employing OAUTH to obtain a content token may be secured. In addition, all calls to the cloud-based servers may be required to have a valid content token.

Content Delivery

In accordance with exemplary and non-limiting embodiments, a server API to include a web service call to get the latest content for a given PCD device is used. This web service may provide a high level call that returns a list of all the pending messages, alerts, updated lists (e.g., shopping, reminders, check-ins and the like) and other content in a concise, compact job manifest. The PCD robot may then retrieve the pending data represented in that manifest opportunistically based on its current agenda. In some embodiments, PCD's truth is in the cloud, meaning that the master record of lists, reminders, check-ins and other application state is stored on the PCD Servers. To ensure that the robot may have access to the latest content, the API may be called frequently and the content collected opportunistically (but in a timely manner).

Workflow Management

In accordance with exemplary and non-limiting embodiments, a functionality that is offloaded to the cloud and will not return results in real time may be used. This may tie in closely with the concept of the agenda-based message queuing discussed above. In addition, it may involve a server architecture that may allow requests for services to be made over the RESTful web service API and dispatch jobs to application servers. Amazon Simple Workflow (SWF) or similar workflow may be used to implement such a system along with traditional message queuing systems.

Updates

In accordance with exemplary and non-limiting embodiments, the content that may require updating may include the operating system kernel, the firmware, hardware drivers, V8 engine or companion apps of the PCD 100. Updates to these content may be available through a web service that returns information about the types of updates available and allows for the request of specific items. Since PCD will often need to be opportunistic to avoid disrupting a user activity the robot can request the updates when it can apply them. Rather than relying on the PCD robot to poll regularly for updates, the availability of certain types of updates may be pushed to the robot.

Logging/Metrics

In accordance with exemplary and non-limiting embodiments, the PCD 100 may send log information to the servers. The servers may store this data in the appropriate container (SQL or NoSQL). Tools such as Hadoop (Amazon MapReduce) and Splunk may be used to analyze data. Metrics may also be queryable so that the report may be run on how people interact with and use the PCD 100. The results of these analyses may be used to adjust parameters on how PCD learns, interacts, and behaves, and also on what features may be required in the future updates.

Machine Learning

In accordance with exemplary and non-limiting embodiments, various training systems and feedback loop may be developed to allow the PCD robot and cloud-based systems to continuously improve. The PCD robots may collect information that can be used to train machine learning algorithms. Some amount of machine learning may occur on the robot itself, but in the cloud, data may be aggregated from many sources to train classifiers. The cloud-based servers may allow for ground truth to be determined by sending some amount of data to human coders to disambiguate content with low probability of being heard, seen or understood correctly. Once new classifiers are created they may be sent out through the Update system discussed above. Machine learning and training of classifiers/predictors may span both supervised, unsupervised or reinforcement-learning methods and the more complex human coding of ground truth. Training signals may include knowledge that the PCD robot has accomplished a task or explicit feedback generated by the user such as voice, touch prompt, a smiling face, gesture, etc. Accumulating images from the cameras that may include a face and audio data may be used to improve the quality of those respective systems in the cloud.

Telepresence Support

In accordance with exemplary and non-limiting embodiments, a telepresence feature including a video chat option may be used. Further, a security model around the video chat to ensure the safety of users is enabled. In addition, a web app and also mobile device apps that utilize the roles, permissions and security infrastructure to protect the end users from unauthorized use of the video chat capabilities may be used.

Software Infrastructure

The high level capabilities of PCD's software system are built on a robust and capable Embedded Linux platform that is customized with key libraries, board support, drivers and other dependencies to provide our high-level software systems with a clean, robust, reliable development environment. The top-level functional modules are realized as processes in our embedded Linux system. The module infrastructure of the PCD is specifically targeted at supporting flexible scripting of content, interactions and behavior in JavaScript while supporting computationally taxing operations in C++ and C basing on language libraries. It is built on the V8 JavaScript engine and the successful Node.js platform with key extensions and support packaged as C++ modules and libraries.

Hardware System Architecture

Figure 5:
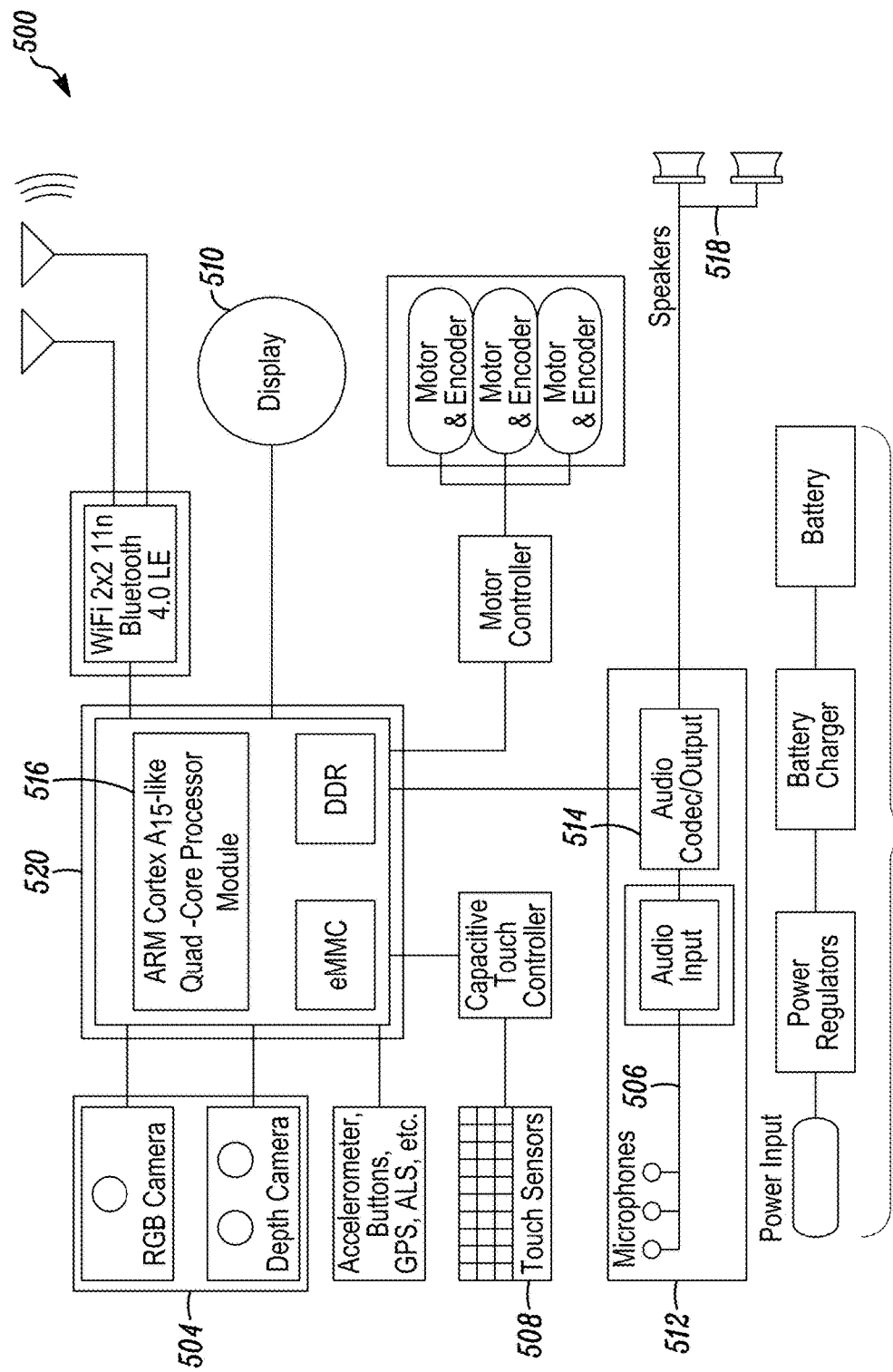
FIG. 5 illustrates hardware architecture of the PCD according to exemplary and non-limiting embodiments.

FIG. 5A illustrates hardware architecture of the PCD 100 that may be engineered to support the sensory, motor, connectivity, power and computational needs of the one or more capabilities of the PCD 100. In some embodiments, one or more hardware elements of the PCD 100 are specializations and adaptations of core hardware that may have used in high-end tablets and other mobile devices. However, the physical realization and arrangement of shape, motion and sensors are unique to the PCD 100. An overall physical structure of the PCD 100 may also be referred herein to a 3-ring Zetatype. Such type of physical structure of the PCD 100 may provide the PCD 100 a clean, controllable and attractive line of action. In an embodiment, the structure may be derived from the principles that may be used by character animators to communicate attention and emotion. The physical structure of the PCD 100 may define the boundaries of the mechanical and electrical architecture based on the three ring volumes, ranges of motion and necessary sensor placement.

In accordance with exemplary and non-limiting embodiments, the PCD 100 may be configured to include three-axes for movement, one or more stereo vision camera 504, a microphone array 506, touch sensing capabilities 508 and a display such as a LCD display 510. The three axes for movement may support emotive expression and the ability to direct sensors and attend users in a natural way. The stereo vision camera 504 may be configured to support 3D location and tracking of users, for providing video input, camera snaps and the like. The microphone array 506 may support beam-formed audio input to maximize ASR performance. The touch sensing capabilities 508 may enable an alternative interaction to make the PCD 100 like a friend, or as a form of user interface. The LCD display 510 may supports emotive expression as well as dynamic information display. Ambient LED lighting may also be included.

In accordance with exemplary and non-limiting embodiments, the hardware architecture 500 may be configured to include an electrical architecture that may be based on a COTS processor from the embedded control and robotics space and combined with high end application processor from the mobile devices and tablet space. The embedded controller is responsible for motion control and low-level sensor aggregation, while the majority of the software stack runs on the application processor. The electrical boards in the product are separated by function for V1 design and this may provide a modularity to match the physical structure of the robot while mitigating the need for design changes on one board from propagating into larger design updates. In some embodiments, the electrical architecture may include a camera interface board that may integrate two mobile-industry based low-resolution MIPI camera modules that may support hardware synchronization so that capture images may be registered in time for the stereo system. The stereo cameras are designed to stream video in continuous mode. In addition, the camera interface board may support a single RGB application camera for taking high resolution photos and video conference video quality. The RGB application camera may be designed to use for specific photo taking, image snaps and video applications.

In accordance with exemplary and non-limiting embodiments, the hardware architecture may include a microphone interface board that may carry the microphone array 506, an audio processing and codec support 514 and sends a digital stream of audio to a main application processor 516. The audio output from our codec 514 may be routed out as speakers 518 are in a separate section of the body for sound isolation.

In accordance with exemplary and non-limiting embodiments, the hardware architecture may include a body control board 520 that may be integrated in a middle section of the body and provides motor control, low-level body sensing, power management and system wakeup functionality for the PCD 100. As an example and not as a limitation, the body control board 520 may be built around an industry standard Cortex-M4F microcontroller platform. In addition, the architecture 500 may include an application processor board that may provide the core System On Chip (SoC) processor and tie together the remainder of the robot system. In an embodiment, the board may use a System On Module (SoM) to minimize the time and expense of developing early prototypes. In some embodiments, the application processor board may include the SoC processor for cost reduction and simplified production. The key interfaces of the application processor board may include interface for supporting MIPI cameras, the display, wireless communications and high performance audio.

In accordance with exemplary and non-limiting embodiments, the hardware architecture 500 may be configured to include power management board 522 that may address the power requirements of the PCD 100. The power management board 522 may include power regulators, battery charger and a battery. The power regulators may be configured to regulate the input power so that one or more elements or boards of the hardware architecture 500 may receive a regulated power supply. Further, the battery charger may be configured to charge the battery so as to enable the PCD 100 to operate for long hours. In an embodiment, the PCD 100 may have a charging dock/base/cradle, which will incorporate a wall plug and a blind mate charging connector such that the PCD 100, when placed on the base, shall be capable of charging the internal battery.

Mechanical Architecture

Figure 6:
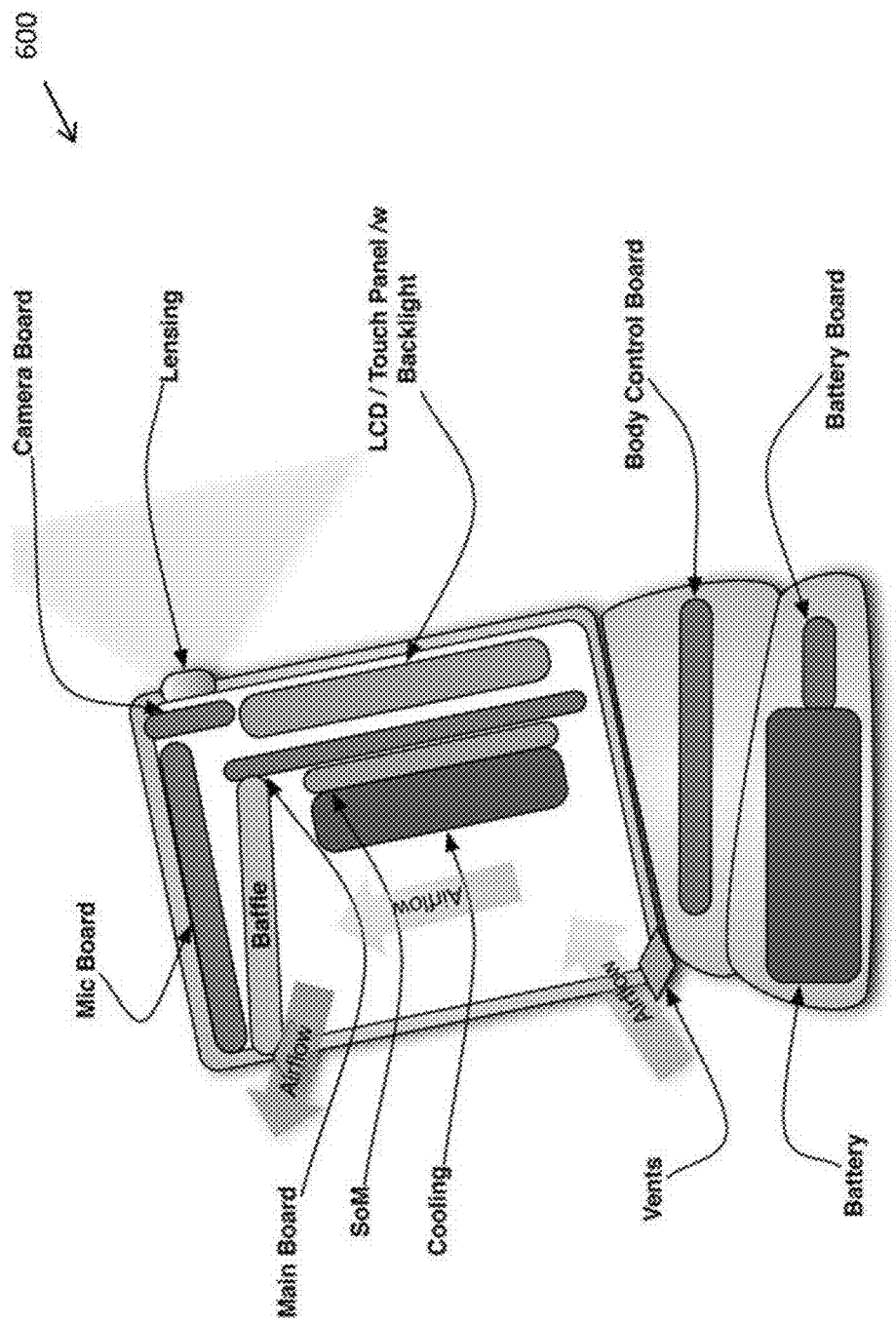
FIG. 6 illustrates mechanical architecture of the PCD according to exemplary and non-limiting embodiments.

In accordance with exemplary and non-limiting embodiments, various features of the PCD 100 are provided to the user in a form of a single device. FIG. 6A illustrates an exemplary design of the PCD 100 that may be configured to include the required software and hardware architecture so as to provide various features to the users in a friendly manner. The mechanical architecture of the PCD 100 has been optimized for quiet grace and expressiveness, while targeting a cost effective bill of materials. By carefully selecting the best elements from a number of mature markets and bringing them together in a unique combination for the PCD 100, a unique device is produced. As illustrated in FIG. 6A, the mechanical architecture depicts placement of various boards such as microphone board, main board, battery board, body control board, camera board at an exemplary position within the PCD 100. In addition, one or more vents are provided in the design of the PCD 100 so as to appropriately allow air flow to provide cooling effect.

In accordance with various exemplary and non-limiting embodiments described below, PCD utilizes a plurality of sensors in communication with a processor to sense data. As described below, these sensors operate to acquire all manner of sensory input upon which the processor operates via a series of programmable algorithms to perform tasks. In fulfillment of these tasks, PCD 100 makes use of data stored in local memory forming a part of PCD 100 and accesses data stored remotely such as at a server or in the cloud such as via wired or wireless modes of communication. Likewise, PCD 100 makes use of various output devices, such as touch screens, speakers, tactile elements and the like to output information to a user while engaging in social interaction. Additional, non-limiting disclosure detailing the operation and interoperability of data, sensors, processors and modes of communication regarding a companion device may be found in published U.S. Application 2009/0055019 A1, the contents of which are incorporated herein by reference.

The embodiments described herein present novel and non-obvious embodiments of features and functionality to which such a companion device may be applied, particularly to achieve social interaction between a PCD 100 and a user. It is understood, as it is known to one skilled in the art, that various forms of sensor data and techniques may be used to assess and detect social cues from a physical environment. Such techniques include, but are not limited to, voice and speech recognition, eye movement tracking, visual detection of human posture, position, motion and the like. Though described in reference to such techniques, this disclosure is broadly drawn to encompass any and all methods of acquiring, processing and outputting data by a PCD 100 to achieve the features and embodiments described herein.

In accordance with exemplary and non-limiting embodiments, PCD 100 may be expressed in a purely physical embodiment, as a virtual presence, such as when executing on a mobile computational device like a mobile phone, PDA, watch, etc., or may be expressed as a mixed mode physical/virtual robot. In some embodiments, the source information for driving a mixed mode, physical, or virtual PCD may be derived as if it is all the same embodiment. For example, source information as might be entered via a GUI interface and stored in a database may drive a mechanical PCD as well as the animation component of a display forming a part of a virtual PCD. In some embodiments, source information comprises a variety of sources, including, outputs from AI systems, outputs from real-time sensing; source animation software models; kinematic information models, and the like. In some embodiments data may be pushed from a single source regarding behavior of a purely virtual character (at the source) and then can output the physical as well as the virtual modes for a physical PCD. In this manner, embodiments of a PCD may span the gamut from purely physical to entirely virtual to a mixed mode involving some of both. PCD 100 possesses and is expressed as a core persona that may be stored in the cloud, and that can allow what a user does with the physical device to be remembered and persist, so that the virtual persona can remember and react to what is happening with the physical device, and vice versa. One can manage the physical and virtual instances via the cloud, such as to transfer from one to the other when appropriate, have a dual experience, or the like.

As illustrated, PCD 100 incorporates a generally tripartite design comprising three distinct body segments separated by a generally circular ring. By rotating each body segment about a ring, such as via internal motors (not shown), PCD 100 is configured to alter its shape to achieve various form factors as well as track users and other objects with sensors 102, 104, 106, 108, and 112. In various embodiments, attributes of PCD 100 may be statically or dynamically configured including, but not limited to, a shape of touch screen 104, expressive body movement, specific expressive sounds and mnemonics, specific quality of prosody and vocal quality when speaking, the specifics of the digital interface, the "faces" of PCD 100, a full spectrum LED lighting element, and the like.

In accordance with exemplary and non-limiting embodiments, the PCD 100 may be configured to employ multi-modal user interface wherein many inputs and outputs may be active simultaneously. Such type of concurrent interface may provide a robust user experience. In some embodiments, one or more of the user interface inputs or outputs might be compromised depending upon the environment resulting in a relatively lesser optimal operation of the PCD 100. Operating the various modes simultaneously may help fail-safe the user experience and interaction with the device to guarantee no loss of communication.

In accordance with exemplary and non-limiting embodiments, the PCD 100 may be configured to process one or more inputs so as to provide enriching experience to the user of the PCD 100. The PCD 100 may be configured to recognize speech of the user. For example, the PCD 100 identify a "wake up word" and/or other mechanism from the speech so as to reduce "false positive" engagements. In some embodiments, the PCD 100 may be configured to recognize speech in a near-field range of N×M feet, where N and M may be determined by the sound quality of speech and detection sensitivity of the PCD. In other embodiments, the PCD 100 may be configured to recognize speech with a far-field range in excess of N feet covering at least the area of 12 feet by 15 feet room size. In some embodiments, PCD 100 may be configured to identify sounds other than spoken language. The PCD may employ a sound signature database configured with sounds that the PCD can recognize and act upon. The PCD may share the content of this database with other PCD devices via direct or cloud based communications. As an example and not as a limitation, the sounds other than the spoken language may comprise sounds corresponding to breaking glass, door bell, phone ringing, a person falling down, sirens, gun shots, audible alarms, and the like.

Further, the PCD 100 may be configured to "learn" new sounds by asking a user to identify the source of sounds that do not match existing classifiers of the PCD 100. The device may be able to respond to multiple languages. In some embodiments, the PCD 100 may be configured to respond to the user outside of the near-field range with the wake-up word. The user may be required to get into the device's field of vision.

In some embodiments, the PCD 100 may have touch sensitive areas on its surface that may be used when the speech input is compromised for any reason. Using these touch inputs, the PCD 100 may ask yes/no questions or display options on the screen and may consider user's touch on the screen as inputs from the user. In some embodiments, the PCD 100 may use vision and movement to differentiate one user from another, especially when two or more users are within the field of vision. Further, the PCD 100 may be capable of interpreting gross skeletal posture and movement, as well as some common gestures, within the near-field range. These gestures may be more oriented toward social interaction than device control. In some embodiments, the PCD 100 may be configured to include cameras so as to take photos and movies. In an embodiment, the camera may be configured to take photos and movies when the user is within a predetermined range of the camera. In addition, the PCD 100 may be configured to support video conferencing (pop-ins). Further, the PCD 100 may be configured to include a mode to eliminate "red eye" when the camera is in photo mode.

In some embodiments, the PCD 100 may be configured to determine if it is being picked up, carried, falling, and the like. In addition, the PCD 100 may be configured to implement a magnetometer. In some embodiments, the PCD 100 may determine ambient lighting levels. In addition, the PCD 100 may adjust the display and accent lighting brightness levels to an appropriate level based on ambient light level. In some embodiments, the PCD 100 may have the ability to use GPS to approximate the location of a device. The PCD 100 may determine relative location within a residence. In some embodiments, the PCD 100 may be configured to include one or more passive IR motion detection sensors (PIR) to aid in gross or far field motion detection. In some embodiments, the PCD 100 may include at least one thermistor to indicate ambient temperature of the environment.

In accordance with exemplary and non-limiting embodiments, the PCD 100 may be configured to speak "one voice" English to a user in an intelligible, natural voice. The PCD 100 may be configured to change the tone of the spoken voice to emulate the animated device emotional state (sound sad when PCD 100 is sad, etc.). In some embodiments, the PCD 100 may be configured to include at least one speaker capable of playing speech, high fidelity music and sound effects. In an embodiment, the PCD 100 may have multiple speakers, one for speech, one for music, and/or additional speakers for special audible signals and alarms. The speaker dedicated for speech may be positioned towards the user and tuned for voice frequency response. The speaker dedicated to music may be tuned for full frequency response. The PCD 100 may be configured to have a true color, full frame rate display. In some embodiments, the displayed active image may be (masked) round at least 4½" in diameter. In some embodiments, the PCD 100 may have a minimum of 3 degrees of freedom of movement, allowing for both 360 degree sensor coverage of the environment and a range of humanlike postures and movements (expressive line of action). The PCD 100 may be configured to synchronize the physical animation to the sound, speech, accent lighting, and display graphics. This synchronization may be close enough as to be seamless to human perception. In some embodiments, the PCD 100 may have designated areas that may use accent lighting for both ambient notification and social interaction. Depending on the device form, the accent lighting may help illuminating the subject in a photo when the camera of the PCD 100 is in photo or movie capture mode. In some embodiments, the PCD 100 may have camera flash that will automatically illuminate the subject in a photo when the camera is in photo capture mode. Further, it may be better for the accent lighting to accomplish the illumination of the subject. In addition, the PCD 100 may have a mode to eliminate "red eye" when the camera is in photo capture mode.

In accordance with exemplary and non-limiting embodiments, the PCD 100 may identify and track the user. In an embodiment, the PCD 100 may be able to notice when a person has entered a near-field range. For example, the near-field range may be of 10 feet. In another embodiment, the PCD 100 may be able to notice when a person has entered a far-field range. For example, the far-field range may be of 10 feet. In some embodiments, the PCD 100 may identify up to 5 different users with a combination of video (face recognition), depth camera (skeleton feature matching), and sound (voice ID). In an embodiment, a "learning" routine is used by the PCD 100 to learn the users that the PCD 100 will be able to recognize. In some embodiments, the PCD 100 may locate and track users in a full 360 degrees within a near-field range with a combination of video, depth camera, and auditory scene analysis. In some embodiments, the PCD 100 may locate and track users in a full 360 degrees within a far-field range of 10 feet. In some embodiments, the PCD 100 may maintain an internal map of the locations of different users relative to itself whenever users are within the near-field range. In some embodiments, the PCD 100 may degrade functionality level as the user gets further from the PCD 100. In an embodiment, a full functionality of the PCD 100 may be available to users within the near-field range of the PCD 100. In some embodiments, the PCD 100 may be configured to track mood and response of the users. In an embodiment, the PCD 100 may determine the mood of a user or group of users through a combination of video analysis, skeleton tracking, speech prosody, user vocabulary, and verbal interrogation (i.e., device asks "how are you?" and interprets the response).

In accordance with exemplary and non-limiting embodiments, the PCD 100 may be programmed with human social code to blend emotive content into its animations. In particular, programmatic intelligence should be applied to the PCD 100 to adjust the emotive content of the outputs appropriately in a completely autonomous fashion, based on perceived emotive content of user expression. The PCD 100 may be programmed to attempt to improve the sensed mood of the user through a combination of speech, lighting, movement, and sound effects. Further, the PCD social code may provide for the ability to build rapport with the user. i.e. mirror behavior, mimic head poses, etc.

In accordance with exemplary and non-limiting embodiments, the PCD 100 may be programmed to deliver proactively customized Internet content comprising sports news and games, weather reports, news clips, information about current events, etc., to a user in a social, engaging method based on learned user preferences and/or to develop its own preferences for sharing that information and data as a way of broadening the user's potential interests.

The PCD device may be programmed with the capability of tailoring both the type of content and the way in which it is communicated to each individual user that it recognizes.

The PCD device may be programmed with the capability of improving and optimizing the customization of content/ delivery to individual users over time based on user preferences and user reaction to and processing habits of the delivered Internet content.

The PCD may be programmed to engage in a social dialogue with the user to confirm that the delivered information was understood by the user.

In accordance with exemplary and non-limiting embodiments, the PCD 100 may be configured to manage and monitor activities of the user. In some embodiments, the communication devices 122 in conjunction with the service, may, at the user's request, create and store to-do, grocery, or other lists that can be communicated to the user once they have left for the shopping trip. In some embodiments, the PCD 100 may push the list to the user (via the service) to a mobile phone as a text (SMS) message, or pulled by a user of either our mobile or web app, upon request. In some embodiments, the user may make such a request via voice on the PCD 100, or via the mobile or web app through the service. The PCD 100 may interact with user to manage lists (i.e., removing items that were purchased/done/no longer needed, making suggestions for additional list items based on user history, etc.). The PCD 100 may infer the need to add to a list by hearing and understanding key phrases in ambient conversation (i.e., device hears "we are out of coffee" and asks the user if they would like coffee added to the grocery list).

In accordance with exemplary and non-limiting embodiments, the PCD 100 may be configured to provide user-generated reminders or messages at correct times. The PCD 100 may be used for setting up conditions for delivering reminders at the correct times. In an embodiment, the conditions for reminders may include real time conditions such as "the first time you see me tomorrow morning", or "the next time my daughter is here", or even "the first time you see me after noon next Tuesday" and the like. Once a condition set is met, the PCD 100 may engage the user (from a "look-at" as well as a body language/expression perspective) and deliver the reminder in an appropriate voice and character. In some embodiments, the PCD 100 may analyze mood content of a reminder and use this information to influence the animation/lighting/delivery of that reminder. In other embodiments, the PCD 100 may follow up with the user after the PCD 100 has delivered a reminder by asking the user if they performed the reminded action.

In accordance with exemplary and non-limiting embodiments, the PCD 100 may monitor absence of the user upon a request that may be given by the user. For example, the user may tell the PCD 100 when and why they are stepping away (e.g., "I'm going for a walk now"), and the expected duration of the activity so that the PCD 100 may ensure that the user has returned within a desired/requested timeframe. Further, the PCD 100 may notify emergency contacts as have been specified by the user for this eventuality, if the user has not returned within the specified window. The PCD 100 may notify the emergency contacts through text message and/or through a mobile app. The PCD 100 may recognize the presence and following up on the activity (i.e., asking how the activity was, or other questions relevant to the activity) when the user has returned. Such type of interaction may enable a social interaction between the PCD 100 and the user, and also enable collection of information about the user for the learning database. The PCD 100 may show check-out/check-in times and current user status to such family/friends as have been identified by the user for this purpose. This may be achieved through a mobile app. The PCD 100 may be capable of more in-depth activity monitoring/patterning/reporting.

In accordance with exemplary and non-limiting embodiments, the PCD 100 may be configured to connect to external networks through one or more data connections. In some embodiments, PCD 100 may have access to a robust, high bandwidth wireless data connection such as WiFi Data Connection. In an embodiment, the PCD 100 may implement 802.11n WiFi specification with a 2×2 two stream MIMO configuration in both 2.4 GHZ and 5 GHz bands. In some embodiments, the PCD 100 may connect to other Bluetooth devices (medical sensors, audio speakers, etc.). In an embodiment, the PCD 100 may implement Bluetooth 4.0 LE (BLE) specification. The BLE enabled PCD 100 device may be configured to customize its UUID to include and share multi-modal user data with other BLE enabled PCD 100 devices. In some embodiments, the PCD 100 may have connectivity to 3G/4G/LTE or other cellular networks.

In accordance with exemplary and non-limiting embodiments, a multitude of PCD 100 devices may be configured in a meshed network configuration using ad-hoc networking techniques to allow for direct data sharing and communications without the need for a cloud based service. Alternatively, data to be shared among multiple PCD 100 devices may be uploaded and stored in a cloud based data base/data center where it may be processed and prepared for broadcasting to a multitude of PCD 100 devices. A cloud based data service may be combined with a meshed network arrangement to provide for both local and central data storage, sharing, and distribution for a multitude of PCD 100 devices in a multitude of locations.

In accordance with exemplary and non-limiting embodiments, a companion application may be configured to connect with the PCD 100. In some embodiments, the companion application may be available on the following platforms: iOS, Android, and Web. The companion application may include an intuitive and easy to use user interface (UI) that may not require more than three interactions to access a feature or function. The companion application may provide user an access to a virtual counterpart of the PCD 100 so that the user may access this virtual counterpart to interact with the real PCD 100.

In some embodiments, the user may be able to access information such as shopping lists, activity logs of the PCD 100 through the companion application. Further, the companion application may present the user with longitudinal reports of user activity local to the PCD 100. In some embodiments, the companion application may connect the user via video and audio to the PCD 100. In addition, the companion application may asynchronously alert the user to certain conditions (e.g., a local user is later than expected by a Check-In, there was a loud noise and local user is unresponsive, etc.).

In some embodiments, an administration/deployment application to allow connectivity or control over a family of devices may be available on a web platform. An UI of the administration application may enable hospital/caregiver administrators or purchasers who may need quick access to detailed reports, set-up, deployment, and/or support capabilities. Further, a group may be able to access information stored across a managed set of PCD 100 devices using the administration application. The administration application may asynchronously alert an administrator to certain conditions (e.g., local user is later than expected by a Check-In, there was a loud noise and local user is unresponsive, etc.). In addition, the administration application may broadcast messages and reminders across a subset or all of its managed devices.

In accordance with exemplary and non-limiting embodiments, a support console may allow personnel of the PCD 100 to monitor/support/diagnose/deploy one or more devices. The support console may be available on web platform. In an embodiment, the support console may support a list view of all deployed PCD devices that may be identified by a unique serial number, owner, institutional deployment set, firmware and application version numbers, or registered exception. In an embodiment, the support console may support interactive queries, with tags including serial number, owner, institutional deployment set, firmware and application version numbers, or registered exception. Further, the support console may support the invocation and reporting of device diagnostics.

In accordance with exemplary and non-limiting embodiments, the support console may assist in the deployment of new firmware and software versions (push model). Further, the support console may assist in the deployment of newer NLUs, new apps, etc. The support console may support customer support scenarios, broadcasting of messages to a subset or all deployed devices to communicate things like planned downtime of the service, etc. In some embodiments, the support console may need to support access to a variety of on-device metrics, including (but not exclusive to): time spent interacting with the PCD 100, time breakdown across all the apps/services, aggregated hit/miss metrics for audio and video perception algorithms, logged actions (to support data mining, etc.), logged exceptions, alert thresholds (e.g. at what exception level should the support console scream at you?), and others.

In accordance with exemplary and non-limiting embodiments, PCD 100 may engage in teleconferencing. In some embodiments, teleconferencing may commence to be executed via a simple UI, either with touch of the body of PCD 100 or touch screen 104 or via voice activation such as may be initiated with a number of phrases, sounds and the like. In one embodiment, there are required no more than two touches of PCD 100 to initiate teleconferencing. In some embodiments, calls may also be initiated as an output of a Call Scheduling/Prompting feature. Once initiated, PCD 100 may function as a phone using microphone 112 and speaker 110 to receive and output audio data from a user while using a WiFi connection, Bluetooth, a telephony connection or some combination thereof to affect phone functionality.

Calls may be either standard voice calls or contain video components. During such interactions, PCD 100 may function as a cameraman for the PCD 100 end of the conversation. In some embodiments, PCD 100 may be placed in the middle of a table or other social gathering point with a plurality of users, such as a family, occupying the room around PCD 1000, all of whom may be up, moving, and active during the call. During the call, PCD 100 may point a camera 106 in a desired place. In one embodiment, PCD 100 may utilize sound localization and face tracking to keep camera 106 pointed at the speaker/user. In other embodiments, PCD 100 may be directed (e.g., "PCD, look at Ruby") by people/users in the room. In other embodiments, a remote person may be able to specify a target to be tracked via a device, and the PCD 100 will autonomously look at and track that target. In either scenario, what camera 106 receives as input is presented to the remote participant if, for example, they are using a smart phone, laptop, or other device capable of displaying video.

The device may be able to understand and respond in multiple languages. During such an interaction, PCD 100 may also function as the "interpreter" for the person on the other end of the link, much like the paradigm of a United Nations interpreter, by receiving voice input, translating the input via a processor, and outputting the translated output. If there is a screen available in the room with PCD 100, such as a TV, iPad, and the like, PCD 100 may send, such as via Bluetooth or WiFi, audio and, if available, video of the remote participant to be displayed on this TV screen. If there is no other screen available, PCD 100 may relay the audio from the remote participant, but no remote video may be available. In such an instance, PCD 100 is merely relaying the words of the remote participant. In some embodiments, PCD 100 may be animated and reactive to a user, such as by, for example, blinking and looking down if the remote participant pauses for a determined amount of time, or doing a little dance or "shimmy" if PCD 100 senses that the remote participant is very excited.

In another embodiment, PCD 100 may be an avatar of the person on the remote end of the link. For example, an eye or other area displayed on touch screen 104 may morph to a rendered version (either cartoon, image based or video stream, among other embodiments) of the remote participant's face. The rendering may be stored and accessible to PCD 100. In other embodiments, PCD 100 may also retrieve data associated with and describing a remote user and imitate motions/non-verbal cues of remote user to enhance the avatar experience.

In some embodiments, during the call, either remote or local participants can cue the storage of still images, video, and audio clips of the participants and PCDs 100 camera view, or notes (e.g., "PCD, remember this number"). These tagged items will be appropriately meta-tagged and stored in a PCD cloud.

In accordance with other embodiments, PCD 100 may also help stimulate remote interaction upon request. For example, a user may ask PCD 100 to suggest a game, which will initiate Connected Gaming mode, described more fully below, and suggest games until both participants agree. In another example, a user may also ask PCD 100 for something to talk about. In response, PCD 100 may access "PCD In The Know" database targeted at common interests of the conversation participants, or mine a PCD Calendar for the participants for an event to suggest that they talk about (e.g., "Grandma, tell Ruby about the lunch you had with your friend the other day").

Scheduling Assistant

In accordance with exemplary and non-limiting embodiments, PCD 100 may suggest calls based on calendar availability, special days, and/or knowledge of presence at other end of the link (e.g., "your mom is home right now, and it's her birthday, would you like to call her?"). The user may accept the suggestion, in which case a PCD Call app is launched between PCD 100 and the remote participant's PCD 100, phone, smart device, or Skype account. A user may also accept the suggestion by asking PCD 100 to schedule the call later, in which case a scheduling app adds it to the user's calendar.

Call Answering and Messaging

Figure 7:
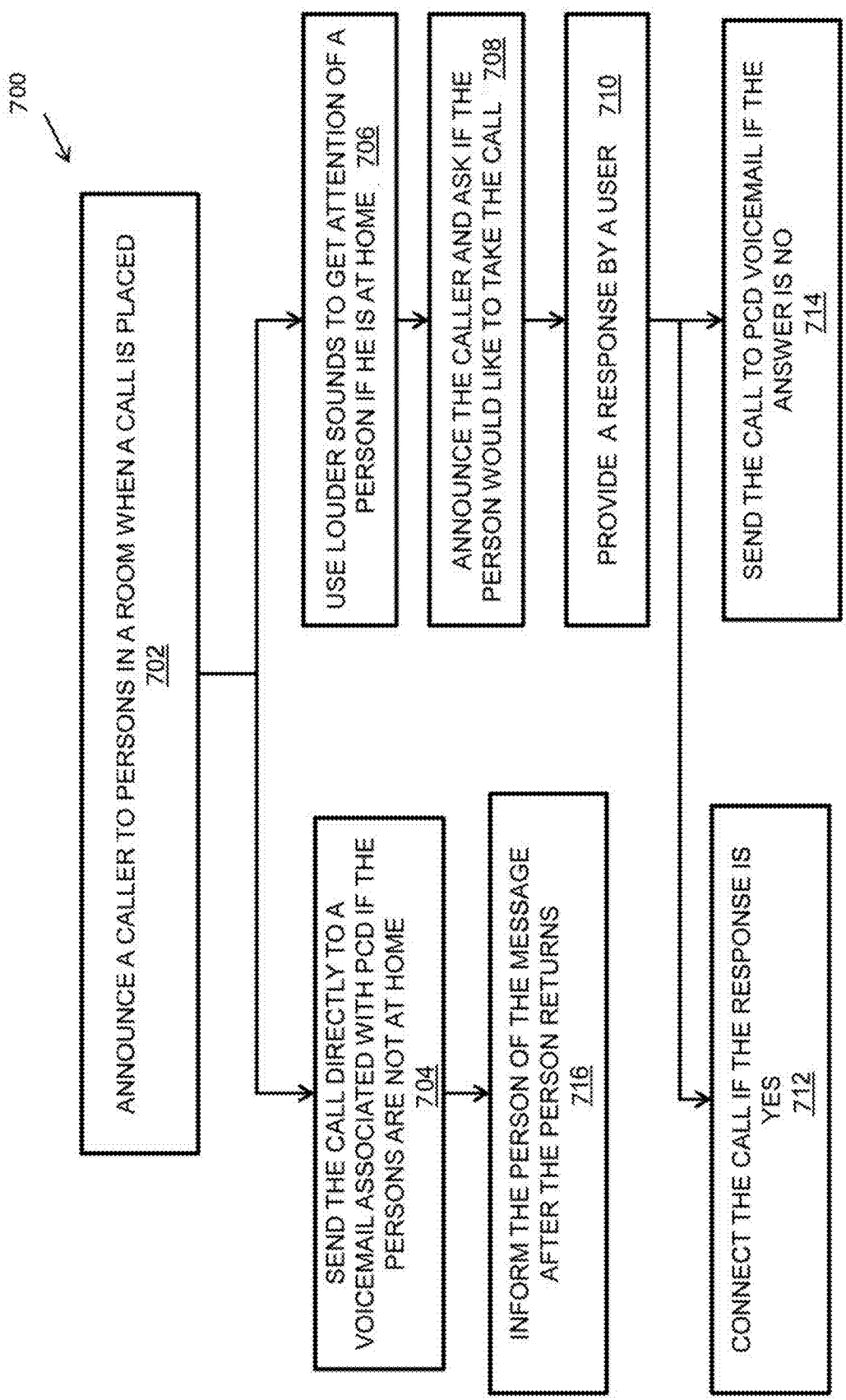
FIG. 7 illustrates a flowchart for a method to provide a call answering and messaging service according to exemplary and non-limiting embodiments.

In accordance with exemplary and non-limiting embodiments, a call answering and messaging functionality may be implemented with PCD 100. This feature applies to voice or video calls placed to PCD 100 and PCD 100 will not perform call management services for other cellular connected devices. With reference to FIG. 7, there is illustrated a flowchart 700 of an exemplary and non-limiting embodiment. As illustrated, at step 702, when a call is placed to PCD 100, PCD 100 may announce the caller to the people in the room. If no one is in the room, PCD 100 may check the user's calendar and, if it indicates that they are not at home, PCD 100 may send the call directly to a voicemail associated with PCD 100, at step 704. If, conversely, it indicates they are at home, PCD 100 will, at step 706, use louder sounds (bells, rings, shouts?) to get the attention of a person in the house.

Once PCD 100 has his user's attention, at step 708, PCD 100 may announce the caller and ask if they would like to take the call. At step 710, a user may respond with a simple touch interface or, ideally, with a natural language interface. If the answer is yes, at step 712, PCD 100 connects the call as described in the Synchronous On-Demand Multimodal Messaging feature. If the answer is no, at step 714, the call is sent to PCD 100 voicemail.

If a caller is directed to voicemail, PCD 100 may greet them and ask them to leave a message. In some embodiments, a voice or voice/video (if caller is using Skype or equivalent) message may be recorded for playback at a later date.

Once the user returns and PCD 100 detects them in the room again, PCD 100 may, at step 716, inform them of the message (either verbally with "you have a message", or nonverbally with lighted pompom, etc.) and ask them if they would like to hear it. If yes, PCD 100 may either play back audio or play audio/video message on a TV/tablet/etc. as described above.

The user may have the option of saving the message for later. He can either tell PCD 100 to ask again at a specific time, or just "later", in which case PCD 100 will ask again after a predetermined amount of time.

If the caller is unknown to PCD 100, PCD 100 may direct the call to voicemail and notify the user that an unidentified call from X number was received, and play back the message if one was recorded. The user may then instruct PCD 100 to effectively block that number from connection/voicemail going forward. PCD 100 may also ask if the user wishes to return the call either synchronously or asynchronously. If user accepts, then PCD 100 launches appropriate messaging mode to complete user request. In some embodiments, PCD 100 may also provide Call Manager functionality for other cellular or landline devices in the home. In yet other embodiments, PCD 100 may answer the call and conversationally prompt the caller to leave a message thus playing role of personal assistant.

Connected Story Reading

In accordance with exemplary and non-limiting embodiments, PCD 100 may incorporate a Connected Story Reading app to enable a remote participant to read a story "through" PCD 100 to a local participant in the room with PCD 100. The reader may interact through a simple web or Android app based interface guided by a virtual PCD 100 through the process of picking a story and reading it. The reader may read the words of the story as prompted by virtual PCD 100. In some embodiments the reader's voice will be played back by the physical PCD 100 to the listener, with preset filters applied to the reader's voice so that the reader can "do the voices" of the characters in an incredibly compelling way even if he/she has no inherent ability to do this. Sound track and effects can also be inserted into the playback. The reader's interface may also show the "PCD's Eye View" video feed of the listener, and PCD 100 may use it's "Cameraman" ability to keep the listener in the video.

Physical PCD 100 may also react to the story with short animations at appropriate times (shivers of fear, etc.), and PCD's 100 eye, described above, may morph into different shapes in support of story elements. This functionality may be wrapped inside a PCD Call feature such that the reader and the listener can interrupt the story with conversation about it, etc. The app may recognize that the reader has stopped reading the story, and pause the feature so the reader and listener can converse unfiltered. Alternatively, the teller could prerecord the story and schedule it to be played back later using the Story Relay app described below.

Hotline

In accordance with exemplary and non-limiting embodiments, a user may utilize PCD 100 to communicate with "in-network" members via a "push to talk" or "walkie-talkie" style interface. This feature may be accessed via a single touch on the skin or a screen icon on PCD 100, or via a simple voice command "PCD 100, talk to Mom". In some embodiments, this feature is limited to only PCD-to-PCD conversation, and may only be useable if both PCDs 100 detect a user presence on their end of the link.

Story Relay

Figure 8:
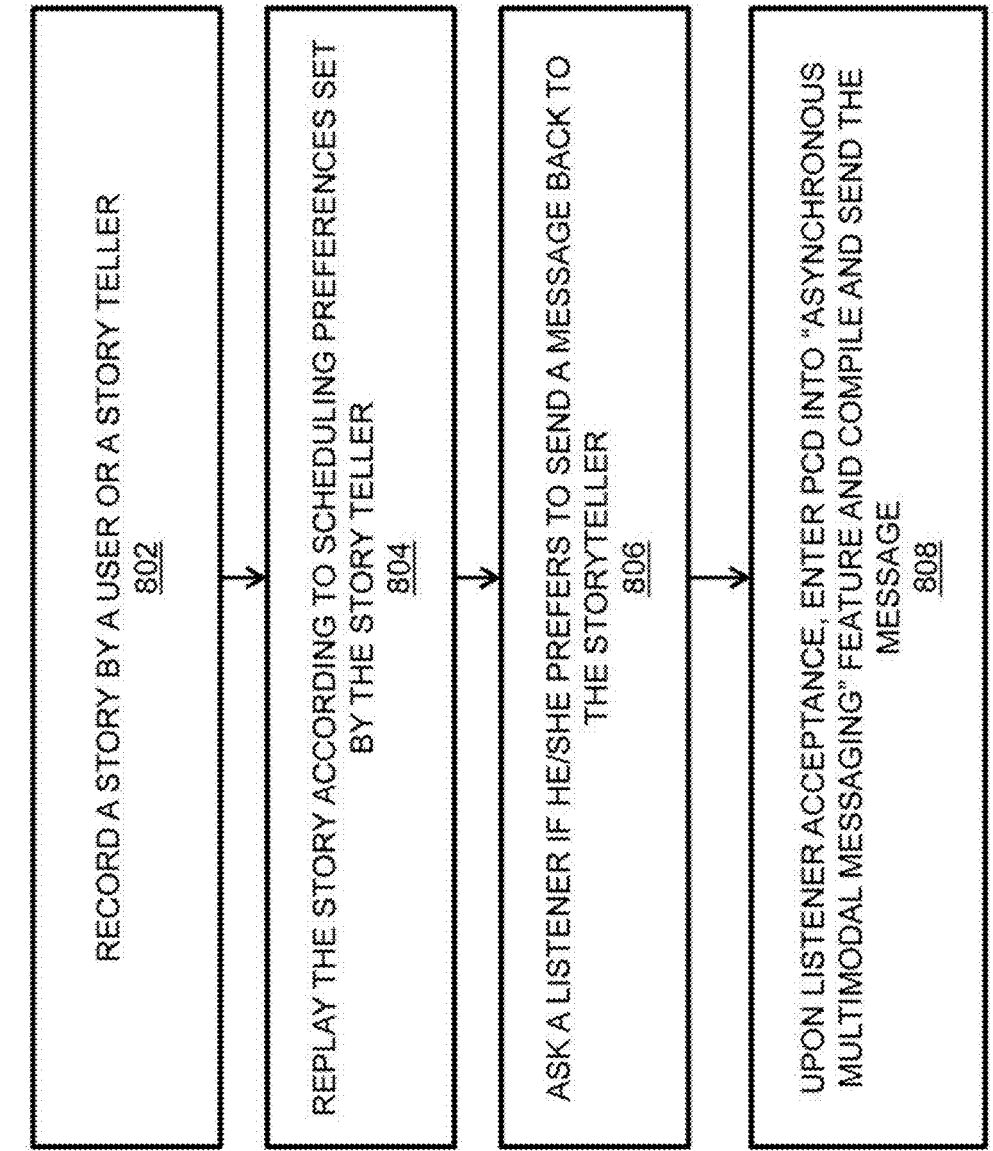
FIG. 8 illustrates a flowchart for a method to relay a story by the PCD according to exemplary and non-limiting embodiments.

With reference to FIG. 8, there is illustrated a flowchart 800 of an exemplary and non-limiting embodiment. As illustrated, at step 802, a user/story teller may record a story at any time for PCD 100 to replay later. Stories can be recorded in several ways:

By PCD 100: the storyteller tells their story to a PCD 100, who records it for playback By Virtual PCD 100 web interface or Android app: the user is guided by virtual PCD 100 to tell their story to a webcam. They also have the opportunity to incorporate more rich animations/sound effects/background music in these types of stories.

Once a story has been recorded, PCD 100 may replay the story according to the scheduling preferences set by the teller, at step 804. The listener will be given the option to hear the story at the scheduled time, and can accept, decline, or reschedule the story.

In an embodiment, during the storytelling, PCD 100 may take still photos of the listener at a predetermined rate. Once the story is complete, PCD 100 may ask listener if he/she would like to send a message back to the storyteller, at step 806. If the user accepts, then at step 808, PCD 100 may enter the "Asynchronous Multimodal Messaging" feature and compile and send the message either to the teller's physical PCD 100 if they have one, or via virtual PCD 100 web link. The listener may have opportunity to incorporate a photo of him/herself listening to the story in the return message.

Photo/Memory Maker

In accordance with exemplary and non-limiting embodiments. PCD 100 may incorporate a photo/memory maker feature whereby PCD 100 takes over the role of photographer for an event. There are two modes for this:

PCD Snap Mode

In this mode, the users who wish to be in the picture may stand together and say "PCD, take a picture of us". PCD 100 acknowledges, then uses verbal cues to center the person/s in the camera image, using cues like "back up", "move left", etc. When they are properly positioned PCD 100 tells them to hold still, then uses some sort of phrase to elicit a smile ("cheese", etc.). PCD 100 may use facial expression recognition to tell if they are not smiling and continue to attempt to elicit a smile. When all users in the image are smiling, PCD 100 may take several pictures, using auto-focus and flash if necessary.

Event Photographer Mode

In this mode, a user may instruct PCD 100 to take pictures of an event for a predetermined amount of time, starting at a particular time (or "now", if desired). PCD 100 uses a combination of sound location and face recognition to look around the room and take candid pictures of the people in the room at a user defined rate. All photos generated may be stored locally in PCD 100 memory.

Once photos are generated, PCD 100 may inform a user that photos have been uploaded to the PCD 100 cloud. At that point, they can be accessed via the PCD 100 app or web interface, where a virtual PCD 100 may guide the user through the process of deleting, editing, cropping, etc. photos. They will then be emailed to the user or posted to Facebook, etc. In this "out of the box" version of this app, photos might only be kept on the PCD 100 cloud for a predetermined amount of time with permanent storage with filing/metatagging offered at a monthly fee as part of, for example, a "living legacy" app described below.

As described herein, PCD 100 may thus operate to aid in enhancing interpersonal and social occasions. In one embodiment, an application, or "app", may be configured or installed upon PCD 100 to access and operate one or more interface components of PCD 100 to achieve a social activity. For example, PCD 100 may include a factory installed app that, when executed, operates to interact with a user to receive one or more parameters in accordance with which PCD 100 proceeds to take and store one or more photos. For example, a user may say to PCD 100, "Please take at least one picture of every separate individual at this party." In response, PCD 100 may assemble a list of party guests from an accessible guest list and proceed to take photos of each guest. In one embodiment, PCD 100 may remain stationary and query individuals as they pass by for their identity, record the instance, and take a photo of the individual. In another embodiment, PCD 100 may interact with guests and ask them to set PCD 100 in front of groupings of guests in order to take their photos. Over a period of time, such as the duration of the party, PCD 100 acquires one more photos of party guests in accordance with the user's wishes in fulfillment of the social goal/activity comprising documenting the social event.

In accordance with other exemplary embodiments, PCD 100 may read and react to social cues. For example, PCD 100 may observe a user indicate to another person the need to speak more softly. In response, PCD 100 may lower the volume at which it outputs verbal communications. Similarly, PCD 100 may emit sounds indicative of satisfaction when hugged or stroked. In other embodiments, PCD 100 may emit or otherwise output social cues. For example, PCD 100, sensing that a user is running late for an appointment, may rock back and forth in a seemingly nervous state in order to hasten the rate of the user's departure.

Interactive Calendar

In accordance with exemplary and non-limiting embodiments, PCD 100 may be configured with a calendar system to capture the business of a user and family outside of work. PCDs 100 may be able to share and integrate calendars with those of other PCD 100s if their users give permission, so that an entire extended family with a PCD 100 in every household would be able to have a single unified calendar for everyone.

Items in PCD 100s calendar may be metatagged with appropriate information, initially the name of the family member(s) that the appointment is for, how they feel about the appointment/event, date or day-specific info (holidays, etc.) and the like. Types of events that may be entered include, but are not limited to, wake up times, meal times, appointments, reminders, phone calls, household tasks/yard work, etc. Note that not all events have to be set to a specific time—events may be scheduled predicated on sensor inputs, etc., for instance "remind me the first time you see me tomorrow morning to pack my umbrella".

Entry of items into PCD's 100 calendar may be accomplished in a number of ways. One embodiment utilizes an Android app or web interface, where virtual PCD 100 guides the user through the process. It is at this point that emoticons or other interface can be used to tell PCD 100 how a user is feeling about apt/event. Graphical depiction of a calendar in this mode may be similar to Outlook, allowing a user to see the events/appts of other network members. PCD 100 Calendar may also have a feature for appointment de-confliction similar to what Outlook does in this regard.

In some embodiments, users may also be able to add items to the calendar through a natural language interface ("PCD, I have a dentist appointment on Tuesday at 1 PM, remind me half an hour earlier", or "PCD, dinner is at 5:30 PM tonight"). User feeling, if not communicated by a user, may be inquired afterward by PCD 100 (e.g., "How do you feel about that appointment?"), allowing appropriate emotional metatagging.

Once an event reminder is tripped, PCD 100 may pass along the reminder in one of two ways. If the user for whom the reminder was set is present in PCD 100's environment, he will pass along the reminder in person, complete with verbal reminder, animation, facial expressions, etc. Emotional content of facial expression may be derived from metatagging of an event such as through emoticon or user verbal inputs. His behaviors can also be derived from known context (for instance, he's always sleepy when waking up or always hungry at mealtimes). Expressions that are contextually appropriate to different events can be refreshed by authoring content periodically to keep it non-repetitive and entertaining.

If the user for whom the reminder is occurring is NOT physically present with PCD 100, PCD 100 can call out for them. In such an instance, if they are non-responsive to this, PCD 100 may text their phone with the reminder.

List Manager

In accordance with exemplary and non-limiting embodiments, PCD 100 may be configured with a List Manager feature. In accordance with this feature, PCD 100 may, at the user's request, create to-do lists or shopping lists that can be texted to the user once they have left for the shopping trip. The feature may be initiated by the user via a simple touch interface, or ideally, through a natural language interface. A user may specify the type of list to be made (e.g., "grocery", "clothes", "to-do", or a specific type of store or store name). PCD 100 may ask what is initially on the list, and the user may respond via spoken word to have PCD 100 add things to the list. At any later time, user may ask PCD 100 to add other items to the list.

In accordance with some embodiments, PCD 100 may be able to parse everyday conversation to determine that an item should be added to the list. For example, if someone in the room says "we're out of milk", PCD 100 might automatically add that to the grocery list.

When the user is leaving for a trip to a store for which PCD 100 has maintained a list, the user may request PCD 100 to text the appropriate list to them, so that it will be available to them when they are shopping in the store. Additionally, if the user is away from PCD 100 but near a store, they may request the list to be sent through the Android or web app.

Upon their return (i.e., the next time PCD 100 sees that user after they have requested the list to be texted to them), PCD 100 may ask how the trip went/whether the user found everything on the list. If "yes", PCD 100 will clear the list and wait for other items to be added to it. If "no", PCD 100 will inquire about what was not purchased, and clear all other items from the list.

In the case of to-do lists, a user may tell PCD 100 "I did X", and that item may be removed from the stored list.

Users might also request to have someone else's PCD-generated list texted to them (pending appropriate permissions). For example, if an adult had given a PCD 100 to an elder parent, that adult could ask PCD 100 to send them the shopping list generated by their parent's PCD 100, so that they could get their parents groceries while they were shopping for their own, or they could ask PCD 100 for Mom's "to-do" list prior to a visit to make sure they had any necessary tools, etc.

PCD in the Know

In accordance with exemplary and non-limiting embodiments, PCD 100 may be configured with an "In the Know" feature. In accordance with this feature, PCD 100 may keep a user up to date on the news, weather, sports, etc. in which a user is interested. This feature may be accessed upon request using a simple touch interface, or, ideally, a natural language command (e.g., "PCD 100, tell me the baseball scores from last night").

The user may have the ability to set up "information sessions" at certain times of day. This may be done through a web or mobile app interface. Using this feature, PCD 100 may be scheduled to relay certain information at certain times of day. For instance, a user might program their PCD 100 to offer news after the user is awake. If the user says "yes", PCD 100 may deliver the information that the user has requested in his/her "morning briefing". This may include certain team scores/news, the weather, review of headlines from major paper, etc. PCD 100 may start with an overview of these items and at any point the user may ask to know more about a particular item, and PCD 100 will read the whole news item.

News items may be "PCD-ized". Specifically, PCD 100 may provide commentary and reaction to the news PCD 100 is reading. Such reaction may be contextually relevant as a result of AI generation.

Mood, Activity, Environment Monitor

In accordance with exemplary and non-limiting embodiments, PCD 100 may be configured with a mood, activity, and environment monitor feature in the form of an application for PCD 100. This application may be purchased by a person who had already purchased PCD 100, such as for an elder parent. Upon purchase, a web interface or an Android app interface may be used to access the monitoring setup and status. A virtual PCD 100 may guide the user through this process. Some examples of things that can be monitored include (1) Ambient temperature in the room/house where PCD 100 is, (2) Activity (# of times a person walked by per hour/day, # of hours without seeing a person, etc.), (3) a mood of person/s in room: expressed as one of a finite set of choices, based upon feedback from sensors (facial expressions, laughter frequency, frequency of use of certain words/phrases, etc.) and (4) PCD 100 may monitor compliance to a medication regimen, either through asking if medication had been taken, or explicitly watching the medication be taken.

The status of the monitors that may have been set can be checked via the app or web interface, or in the case of an alert level being exceeded (e.g., it is too cold in the house, no one has walked by in a threshold amount of time), then a text could be sent by PCD 100 to a monitoring user. In addition, PCD 100 may autonomously remind the user if certain conditions set by the monitoring user via the app or web interface are met such as, for example, shivering and asking the heat to be turned up if it is too cold.

Mood Ring

Figure 9:
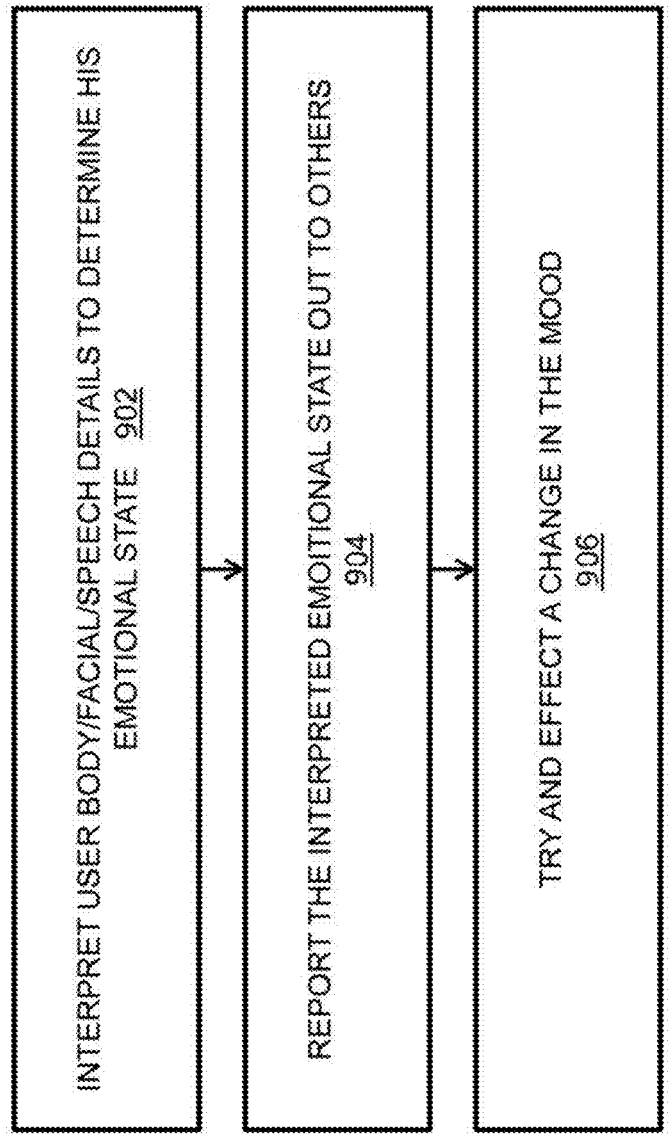
FIG. 9 illustrates a flowchart for a method to indicate and/or influence emotional state of a user by use of the PCD according to exemplary and non-limiting embodiments.

In accordance with exemplary and non-limiting embodiments, PCD 100 may be configured with a Mood Ring feature. The mood ring feature may make use of PCD's 100 sensors to serve as an indicator and even an influencer of the mood/emotional state of the user. This feature may maintain a real time log of the user's emotional state. This indicator may be based on a fusion of facial expression recognition, body temperature, eye movement, activity level and type, speech prosody, keyword usage, and even such simple techniques as PCD 100 asking a user how they are feeling. PCD 100 will attempt to user verification techniques (such as asking) to correct his interpretations and make a better emotional model of the user over time. This may also involve "crowd sourcing" learning data (verified sensor data<->emotional state mappings from other users) from the PCD 100 cloud. With reference to FIG. 9, there is illustrated a flowchart 900 of an exemplary and non-limiting embodiment. At step 902, PCD 100 interprets user body/facial/speech details to determine his emotional state. Over time, PCD 100 is able to accurately interpret user body/facial/speech details to determine the emotional state.

Once PCD 100 has determined the emotional state of the user, he reports this out to others at step 904. This can be done in a number of ways. To caregivers that are co-located (in hospital setting, for instance), PCD 100 can use a combination of lighting/face graphics/posture to indicate the mood of the person he belongs to, so that a caregiver could see at a glance that the person under care was sad/happy/angry/etc. and intervene (or not) accordingly.

To caregivers who are not co-located (for example, an adult taking care of an aging parent who still lives alone), PCD 100 could provide this emotional state data through a mobile/web app that is customizable in terms of which data it presents and for which time periods.

Once this understanding of a user's mood is established, PCD 100 tries and effects a change in that mood, at step 906. This could happen autonomously, wherein PCD 100 tries to bring about a positive change in user emotional state through a process of story/joke telling, commiseration, game playing, emotional mirroring, etc. Alternatively, a caregiver, upon being alerted by PCD 100 that the primary user is in a negative emotional state, could instruct PCD 100 to say/try/do certain things that they may know will alleviate negative emotions in this particular circumstance.

Night Light

In accordance with exemplary and non-limiting embodiments, PCD 100 may be configured with a Night Light feature. In accordance with this feature, PCD 100 may act as an animated nightlight if the user wakes in the middle of the night. If the right conditions are met (e.g., time is in the middle of the night, ambient light is very low, there has been stillness and silence or sleeping noises for a long time, and then suddenly there is movement or speaking), PCD 100 may wake gently, light a pompom in a soothing color, and perhaps inquire if the user is OK. In some embodiments, PCD 100 may suggest an activity or app that might be soothing and help return the user to sleep.

Random Acts of Cuteness

In accordance with exemplary and non-limiting embodiments, PCD 100 may be configured with a Random Acts of Cuteness feature. In accordance with this feature, PCD 100 may operate to say things/asking questions throughout the day at various times in a manner designed to be delightful or thought provoking. In one embodiment, this functionality does not involve free form natural language conversation with PCD 100, but, rather, PCD's 100 ability to say things that are interesting, cute, funny, etc. as fodder for thought/conversation.

In some embodiments PCD 100 may access a database, either internal to PCD 100 or located externally, of sayings, phrases, jokes, etc., that is created, maintained, and refreshed from time to time. Data may come from, for example, weather, sports, news, etc. RSS feeds, crowd sourcing from other PCD 100s, and user profiles. Through a process of metatagging these bits and comparing the metatags to individual PCD 100 user preferences, the appropriate fact or saying may be sent to every individual PCD 100.

When PCD 100 decides to deliver a Random Act of Cuteness, PCD 100 may connect to the cloud, give a user ID, etc., and request a bit from the data repository. As described above, the server will match a fact to the user preferences, day/date/time, weather in the user's home area, etc., to determine the best bit to deliver to that user.

In some embodiments, this feature may function to take the form of a simple question where the question is specific enough to make recognition of the answer easier while the answers to such questions may be used to help build the profile of that user thus ensuring more fitting bits delivered to his/her PCD 100 at the right times. In other embodiments, a user may specifically request an Act of Cuteness through a simple touch interface or through a natural language interface. In some embodiments, this feature may employ a "like/dislike" user feedback solicitation so as to enable the algorithm to get better at providing bits of interest to this particular user.

DJ PCD

In accordance with exemplary and non-limiting embodiments, PCD 100 may be configured with a DJ feature. In accordance with this feature, PCD 100 may operate to feature music playing, dancing, and suggestions from PCD 100. This feature may operate in several modes. Such modes or functions may be accessed and controlled through a simple touch interface (no more than 2 beats from beginning to desired action), or, in other embodiments, through a natural language interface. Music may be stored locally or received from an external source.

When PCD 100 plays a song using this feature, PCD 100 may use beat tracking to accompany the song with dance animations, lighting/color shows, facial expressions, etc. PCD's 100 choice of song may depend on which mode is selected such as:

Jukebox Mode

In this mode, PCD 100 may play a specific song, artist, or album that the user selects.

Moodbox Mode

In this mode, the user requests a song of a certain mood. PCD 100 may use mood metatags to select a song. The user can give feedback on songs similar to Pandora, allowing PCD 100 to tailor weightings for future selections.

Ambient Music Mode

Once a user selects this mode, PCD 100 uses information from the web (date, day of the week, time of day, calendar events, weather outside, etc.) as well as from sensors 102, 104, 106, 108, 112 (e.g., number/activity level of people in the room, noise levels, etc.) to select songs to play and volumes to play them at, in order to create background ambience in the room. Users may have the ability to control volume or skip a song. In addition, users may be able to request a specific song at any time, without leaving ambient music mode. The requested song might be played, and the user choice (as with volume changes) might be used in future selection weightings.

PCD Likes

While in some embodiments a user may directly access this mode ("what kind of music do you like, PCD?"), PCD 100 may also occasionally interject one or more choices into a stream of songs, or try to play a choice upon initiation of Jukebox or Moodbox Mode (in ambient music mode, PCD 100 may NOT do this). PCD's music choices may be based on regularly updated lists from PCD 100, Inc., created by writers or by, for instance, crowd sourcing song selections from other PCDs. PCD 100 Likes might also pull a specific song from a specific PCD 100 in the user's network—for instance PCD 100 may announce "Your daughter is requesting this song all the time now!", and then play the daughter's favorite song.

Dancing PCD

In accordance with exemplary and non-limiting embodiments, after playing a song in any mode, PCD 100 may ask how it did (and might respond appropriately happy or sad depending on the user's answer), or gives the user a score on how well the user danced. PCD 100 may also capture photos of a user dancing and offer to upload them to a user's PCD profile, a social media site, or email them. Various modes of functionality include:

Copy You

In this mode, PCD 100 chooses a song to play, and then uses sound location/face/skeleton tracking to acquire the user in the vis/RGBD camera field of view. As the user dances along to the music, PCD 100 may try to imitate the user's dance. If the user fails to keep time with the music, the music may slow down or speed up. At the end of the song, PCD 100 may ask how it performed in copying the moves of the user, or give the user a score on how well the user kept the beat. PCD 100 may also capture photos of the user dancing and offer to upload them to the user's PCD profile, a social media site, or email them to the user.

Copy PCD

In this mode, PCD 100 dances and the user tries to imitate the dance. Again, the playback of music is affected if the user is not doing a good job. In some embodiments, a separate screen shows a human dancer for both a user and PCD 100 to imitate. The user and PCD 100 both do their dance-alongs and then PCD 100 grades both itself and the user.

Dance Along

In this mode, the user plays music from a radio, iPod, singing, humming, etc., and PCD 100 tries to dance along, asking how well it did at the end.

Story Acting/Animating

Figure 10:
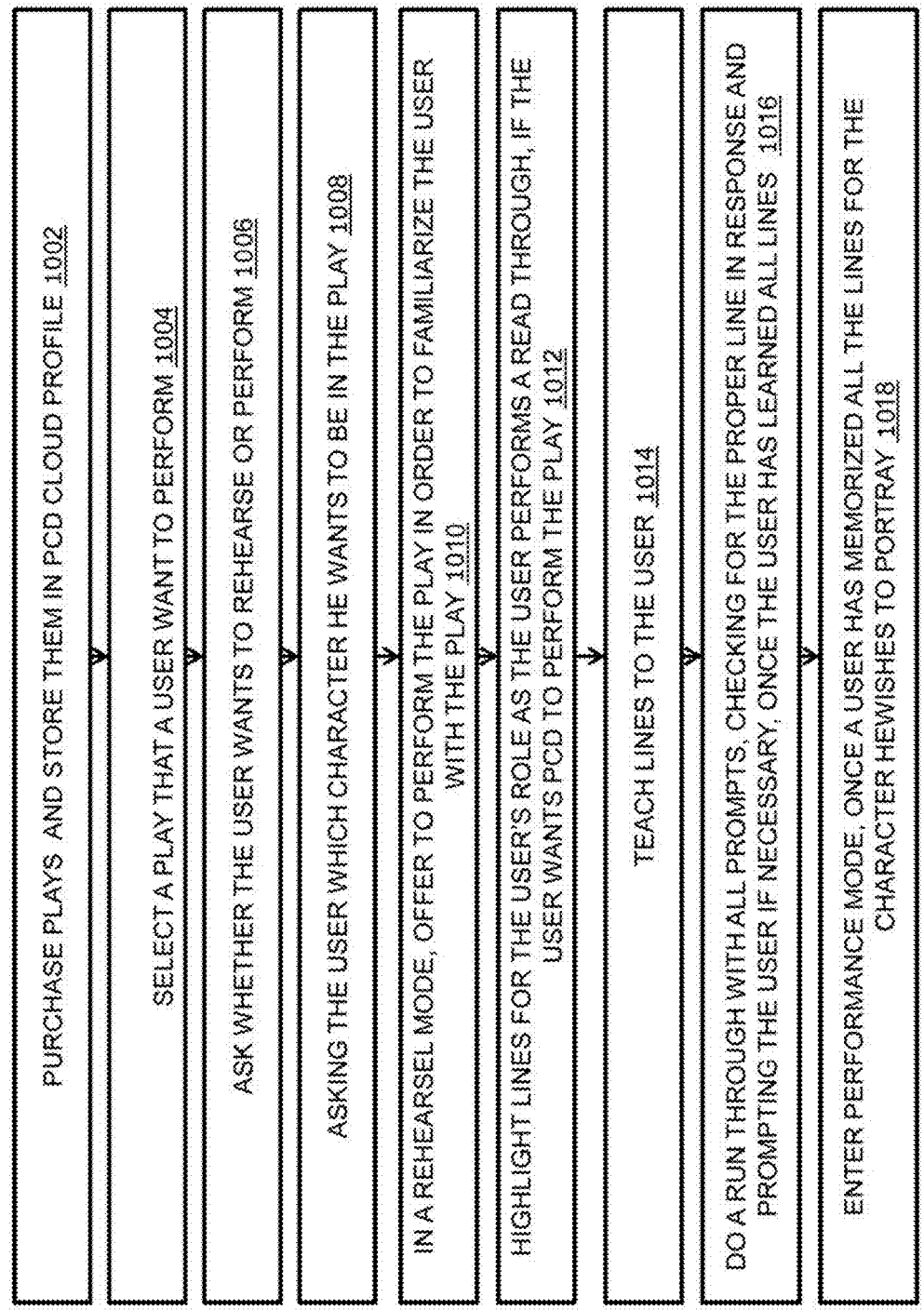
FIG. 10 illustrates a flowchart for a method to enable story acting or animation feature by the PCD according to exemplary and non-limiting embodiments.

In accordance with exemplary and non-limiting embodiments, PCD 100 may be configured with a Story Acting/Animating feature. In accordance with this feature, PCD 100 may operate to allow a user to purchase plays for an interactive performance with PCD 100. With reference to FIG. 10, there is illustrated a flowchart 1000 of an exemplary and non-limiting embodiment. The plays may be purchased outright and stored in the user's PCD Cloud profile, or they may be rented Netflix style, at step 1002.

Purchasing of plays/scenes may occur through, for example, an Android app or web interface, where a virtual PCD 100 may guide the user through the purchase and installation process. In some embodiments, at step 1004, users may select the play/scene they want to perform. This selection, as well as control of the feature while using it, may be accomplished via a simple touch interface (either PCD's 100 eye or body), or via a natural language interface. Once a user selects a play, PCD 100 may ask whether the user wants to rehearse or perform at step 1006, which will dictate the mode to be entered.

Regardless of mode chosen, at step 1008, PCD 100 may begin by asking the user which character they want to be in the play. After this first time, PCD 100 will verify that choice if the play is selected again, and the user can change at any time.

Rehearsal Mode

Once the user has entered rehearsal mode, PCD 100 may offer to perform the play in order to familiarize the user with the play, at step 1010. The user may skip this if they are already familiar. If the user does want PCD 100 to perform the play, PCD 100 may highlight the lines for the user's role as the user performs a read through, at step 1012.

Following this read through, PCD 100 may begin to teach lines to the user, at step 1014. For each line, PCD 100 may announce the prompt and the line, and then show the words on touch screen 104 while the user recites the line. PCD 100 may use speech recognition to determine if the user is correct, and will keep trying until the user repeats the line correctly. PCD 100 may then offer the prompt to the user and let them repeat the line, again trying until the user can repeat the line appropriately to the prompt. PCD 100 may then move to the next line.

Once the user has learned all lines, at step 1016, PCD 100 will do a run through with all prompts, checking for the proper line in response and prompting the user if necessary.

Note that prompts can take the form of graphical at first, with the eye morphing into a shape that suggests the line. This might be the first attempt at a prompt, and if the user still cannot remember the line, then PCD 100 can progress to verbal prompting.

Performance Mode

Once a user has memorized all the lines for the character they wish to portray, they can enter Performance Mode, at step 1018. In this mode, PCD 100 will do a full up performance of the play, pausing to let the user say their lines and prompting if the user stumbles or forgets. PCD 100 will use full sound effects, background music, animations, and lighting effects during this performance, even during user-delivered lines. In some embodiments, after the play is performed, PCD 100 may generate a cartoon/animated version of the play, with the user's voice audio during their lines included and synced to the mouth of the character they play (if that is possible). This cartoon may be stored on the PCD cloud, posted to social media sites, or emailed to user for sharing/memory making. In some embodiments, PCD 100 may also be configured to perform plays with multiple participants each playing their own character, and participants may be remote (e.g., on the other end of a teleflow).

Dancing PCD—Sharing

In accordance with an exemplary and non-limiting embodiment, PCD 100 may be configured to employ an additional feature of the Dancing PCD app described above. In some embodiments of this feature, a user may create a custom dance for PCD 100. This is created through a mobile or web app, allowing the user to pick the song and select dance moves to put together for PCD 100 to perform with the music. User may also let PCD 100 pick a dance move such that the dance is created collaboratively with PCD 100. In some embodiments, lighting/sound effects (e.g., PCD saying "get down!") may be added and synced with the dance. In other embodiments, PCD 100 dances may be sent to other PCDs 100, shown to friends performed by the virtual PCD 100, saved online, etc. The user may also play other PCD 100 dances created by other PCD 100 users.

Celebrity Generated Content

In accordance with exemplary and non-limiting embodiments, this feature allows the user to download or stream to their PCD 100 celebrity generated content. Content is chosen through a web interface or Android app, where a Virtual PCD 100 may guide the user through the process of content purchase. Content may be either:

Prerecorded

This might include director/actor commentary for movies, Mystery Science Theater 3000 type jokes, etc. All content may be cued to a film. Audio watermarking may be used to sync PCD 100's delivery of content with the media being watched.

Live Streaming

In this mode, PCD 100 may stream content that is being generated real time by a celebrity/pundit in a central location. The content creator may also have the ability to real-time "puppet" PCD 100 to achieve animations/lighting/color effects to complement the spoken word. In such instances, no audio watermarking is necessary as the content creator will theoretically be watching event concurrently with user and making commentary real time. This might include political pundits offering commentary on presidential speeches, election coverage, etc., or a user's favorite athlete providing commentary on a sporting event.

In accordance with an exemplary and non-limiting embodiment, a persistent companion device (PCD) 100 is adapted to reside continually, or near continually, within the environment of a person or persons. In one embodiment, the person is a particular instance of a person for which various parametric data identifying the person is acquired by or made available to the PCD. As described more fully below, in addition to a person's ID, PCD 100 may further recognize patterns in behavior (schedules, routines, habits, etc.), preferences, attitudes, goals, tasks, etc.

The identifying parametric data may be used to identify the presence of the person using, for example, voice recognition, facial recognition and the like utilizing one or more of the sensors 102, 104, 106, 108, 112 described above. The parametric data may be stored locally, such as within a memory of PCD 100, or remotely on a server with which PCD 100 is in wired or wireless communication such as via Bluetooth, WiFi and the like. Such parametric data may be inputted into PCD 100 or server manually or may be acquired by the PCD 100 over time or as part of an initialization process.

For example, upon bringing an otherwise uninitialized PCD 100 into the environment of a user, a user may perform an initialization procedure whereby the PCD 100 is operated/interacted with to acquire an example of the user's voice, facial features or the like (and other relevant factual info). In a family hub embodiment described mire fully below, there may be a plurality if users forming a social network of users comprising an extended family. This data may be stored within the PCD 100 and may be likewise communicated by the PCD 100 for external storage such as, for example, at server. Other identifying user data, such as user name, user date of birth, user eye color, user hair color, user weight and the like may be manually entered such as via a graphical user interface, speech interface, of server or forming a part of PCD 100. Once a portion of the parametric data is entered into or otherwise acquired by PCD 100, PCD 100 may operate to additionally acquire other parametric data. For example, upon performing initialization comprising providing a sample voice signature, such as by reciting a predetermined text to PCD 100, PCD 100 may autonomously operate to identify the speaking user and acquire facial feature data required for facial identification. As PCD 100 maintains a persistent presence within the environment of the user, PCD 100 may operate over time to acquire various parametric data of the user.

In some embodiments, during initialization PCD 100 operates to obtain relevant information about a person beyond their ID. As noted above, PCD 100 may operate to acquire background info, demographic info, likes, contact information (email, cell phone, etc.), interests, preferences, personality, and the like. In such instances, PCD 100 may operate to acquire text based/GUI/speech entered information such as during a "getting acquainted" interaction. In addition, PCD 100 may also operate to acquire contact info and personalized parameterized information of the family hub (e.g., elder parent, child, etc.), which may be shared between PCDs 100 as well as entered directly into a PCD 100. In various embodiments described more fully below, PCD 100 operates to facilitate family connection with the extended family. As further described below, daily information including, but not limited to, a person's schedule, events, mood, and the like may provide important context for how PCD 100 interacts, recommends, offers activities, offers information, and the like to the user.

In accordance with exemplary and non-limiting embodiments, contextual, longitudinal data acquired by PCD 100 facilitates an adaptive system that configures its functions and features to become increasingly tailored to the interests, preferences, and use cases of the user(s). For instance, if the PCD 100 learns that a user likes music, it can automatically download the "music attribute" from the cloud to be able to discover music likes, play music of that kind, and make informed music recommendations.

In this way, PCD 100 learns about a user's life. PCD 100 can sense the user in the real world and it can gather data from the ecology of other devices, technologies, systems, personal computing devices, personal electronic devices that are connected to the PCD 100. From this collection of longitudinal data, the PCD 100 learns about the person and the patterns of activities that enable it to learn about the user and to configure itself to be better adapted and matched to the functions it can provide. Importantly, PCD 100 learns about your social/family patterns, Who the important people are in your life (your extended family), it learns about and tracks your emotions/moods, it learns about important behavioral patterns (when you tend to do certain things), it learns your preferences, likes, etc., it learns what you want to know about, what entertains you, etc.

As described more fully below, PCD 100 is configured to interact with a user to provide a longitudinal data collection facility for collecting data about the interactions of the user of PCD 100 with PCD 100.

In accordance with exemplary and non-limiting embodiments, PCD 100 is configured to acquire longitudinal data comprising one or more attributes of persistent interaction with a user via interaction involving visual, auditory and tactile sensors 102, 104, 106, 108, and 112. In each instance, visual, auditory and tactile sensations may be perceived or otherwise acquired by PCD 100 from the user as well as conveyed by PCD 100 to the user. For example, PCD 100 may incorporate camera sensor 106 to acquire visual information from a user including data related to the activities, emotional state and medical condition of the user. Likewise, PCD 100 may incorporate audio sensor 112 to acquire audio information from a user including data derived from speech recognition, data related to stress levels as well as contextual information such as the identity of entertainment media utilized by the user. PCD 100 may further incorporate tactile sensor 102 to acquire tactile information from a user including data related to a user's touching or engaging in physical contact with PCD 100 including, but not limited to, petting and hugging PCD 100. In other embodiments, a user may also use touch to navigate a touch screen interface of PCD 100. In other embodiments, a location of PCD 100 or a user may be determined, such as via a cell phone the user is carrying and used as input to give location context-relevant information and provide services.

As noted, visual, auditory and tactile sensations may be conveyed by PCD 100 to the user. For example, audio output device may be used to output sounds, alarms, music, voice instructions and the like and to engage in conversation with a user. Similarly, graphical element may be utilized to convey text and images to a user as well as operate to convey graphical data comprising a portion of a communication interaction between PCD 100 and the user. It can use ambient light and other cues (its LED pom pom). Tactile device 102 may be used to convey PCD 100 emotional states and various other data including, via, for example, vibrating, and to navigate the interface/content of the device. The device may emit different scents that suit the situation, mood, etc. of the user.

Information may be gathered through different devices that are connected to the PCD 100. This could come from $3^{rd}$ party systems (medical, home security, etc. data), mobile device data (music playlists, photos, search history, calendar, contact lists, videos, etc.), desktop computer data (esp. entered through the PCD 100 portal).

In addition to the sensors described above, data and information involved in interactions between PCD 100 and a user may be acquired from, stored on and outputted to various data sources. In exemplary and non-limiting embodiments, interaction data may be stored on and transmitted between PCD 100 and a user via cloud data or other modes of connectivity (Bluetooth, etc.). In one embodiment, access may be enabled by PCD 100 to a user's cloud stored data to enable interaction with PCD 100. For example, PCD 100 may search the Internet, use an app/service, or access data from the cloud—such as a user's schedule from cloud storage and use information derived there from to trigger interactions. As one example, PCD 100 may note that a user has a breakfast appointment with a friend at 9:00 am at a nearby restaurant. If PCD 100 notices that the user is present at home five minutes before the appointment, PCD 100 may interact with the user by speaking via audio device 110 to query if the user shouldn't be getting ready to leave. In an exemplary embodiment, PCD 100 may accomplish this feat by autonomously performing a time of travel computation based on present GPS coordinates and those of the restaurant. In this manner, PCD 100 may apply one or more algorithms to accessed online or cloud data to trigger actions that result in rapport building interactions between PCD 100 and the user. People can communicate with PCD 100 via social networking, real-time or asynchronous methods, such as sending texts, establishing a real-time audio-visual connection, connecting through other apps/services (Facebook, twitter, etc.), and the like. Other examples include access by the PCD 100 to entertainment and media files of the user stored in the cloud including, but not limited to iTunes and Netflix data that may be used to trigger interactions.

In a similar manner, in accordance with other exemplary embodiments, interaction data may be stored in proximity to or in a user's environment such as on a server or personal computer or mobile device, and may be accessible by the user. PCD 100 may likewise store data in the cloud. In other embodiments, interaction data may be acquired via sensors external to PCD 100.

In accordance with exemplary and non-limiting embodiments, there may be generated and activities log and a device usage log, such as may be stored on PCD 100, on a server or in the cloud, which may be utilized to facilitate interaction. Activities log may store information recording activities engaged in by the user, by PCD 100 or by both the user and PCD 100 in an interactive manner. For example, an activities log may record instances of PCD 100 and the user engaging in the game of chess. There may additionally be stored information regarding the user's emotional state during such matches from which may be inferred the user's level of enjoyment. Using this data, PCD 100 may determine such things as how often the user desires to play chess, how long has it been since PCD 100 and the user last played chess, the likelihood of the user desiring to engage in a chess match and the like. In a similar manner, a device usage log may be stored and maintained that indicates when, how often and how the user prefers to interact with PCD 100. As is evident, both the activities log and the device usage log may be used to increase both the frequency and quality of interactions between PCD 100 and the user.

In accordance with an exemplary and non-limiting embodiment, interaction data may be acquired via manual entry. Such data may be entered by the user directly into PCD 100 via input devices 102, 104, 106, 108, 112 forming a part of PCD 100 or into a computing device, such as a server, PDA, personal computer and the like, and transmitted or otherwise communicated to PCD 100, such as via Bluetooth or WiFi/cloud. In other embodiments, interaction data may be acquired by PCD 100 via a dialog between PCD 100 and the user. For example, PCD 100 may engage in a dialog with the user comprising a series of questions with the user's answers converted to text via speech recognition software operating on PCD 100, on a server or in the cloud, with the results stored as interaction data. Similarly for GUI or touch-based interaction.

In accordance with an exemplary and non-limiting embodiment, interaction data may be generated via a sensor 102, 104, 106, 108, 112 configured to identify olfactory data. Likewise PCD 100 may be configured to emit olfactory scents. In yet other embodiments, GPS and other location determining apparatus may be incorporated into PCD 100 to enhance interaction. For example, a child user may take his PCD 100 on a family road trip or vacation. While in transit, PCD 100 may determine its geographic location, access the Internet to determine nearby landmarks and engage in a dialogue with the child that is relevant to the time and place by discussing the landmarks.

In addition to ascertaining topics for discussion in this manner, in some embodiments, the results of such interactions may be transmitted at the time or at a later time to a remote storage facility whereat there is accumulated interaction data so acquired from a plurality of users in accordance with predefined security settings. In this manner, a centralized database of preferable modes of interaction may be developed based on a statistical profile of a user's attributes and PCD 100 acquired data, such as location. For instance, in the previous example, PCD 100 may determine its location as being on the National Mall near the Air and Space Museum and opposite the Museum of Natural History. By accessing a centralized database and providing the user's age and location, it may be determined that other children matching the user's age profile tend to be interested in dinosaurs. As a result, PCD 100 commences to engage in a discussion of dinosaurs while directing the user to the Museum of Natural History.

In accordance with an exemplary and non-limiting embodiment, PCD 100 may modulate aspects of interaction with a user based, at least in part, upon various physiological and physical attributes and parameters of the user. In some embodiments, PCD 100 may employ gaze tracking to determine the direction of a user's gaze. Such information may be used, for example, to determine a user's interest or to gauge evasiveness. Likewise, a user's heart rate and breathing rate may be acquired. In yet other embodiment's a user's skin tone may be determined from visual sensor data and utilized to ascertain a physical or emotional state of the user. Other behavioral attributes of a user that may be ascertained via sensors 102, 104, 106, 108, 112 include, but are not limited to, vocal prosody and word choice. In other exemplary embodiments, PCD 100 may ascertain and interpret physical gestures of a user, such as waving or pointing, which may be subsequently utilized as triggers for interaction. Likewise, a user's posture may be assessed and analyzed by PCD 100 to determine if the user is standing, slouching, reclining and the like.

In accordance with various exemplary and non-limiting embodiments, interaction between PCD 100 and a user may be based, at least in part, upon a determined emotional or mental state or attribute of the user. For example, PCD 100 may determine and record the rate at which a user is blinking, whether the user is smiling or biting his/her lip, the presence of user emitted laughter and the like to ascertain whether the user is likely to be, for example, nervous, happy, worried, amused, etc. Similarly, PCD 100 may observe a user's gaze being fixated on a point in space while the user remains relatively motionless and silent in an otherwise silent environment and determine that the user is in a state of thought or confused. In yet other embodiments, PCD 100 may interpret user gestures such as nodding or shaking one's head as indications of mental agreement or disagreement.

In accordance with an exemplary and non-limiting embodiment, the general attributes of the interface via which a user interacts may be configured and/or coordinated to provide an anthropomorphic or non-human based PCD 100. In one embodiment, PCD 100 is configured to display the characteristics of a non-human animal. By so doing, interaction between PCD 100 and a user may be enhanced by mimicking and/or amplifying an existing emotional predilection by a user for a particular animal. For example, PCD 100 may imitate a dog by barking when operating to convey an excited state. PCD 100 may further be fitted with a tail like appendage that may wag in response to user interactions. Likewise, PCD 100 may output sounds similar to the familiar feline "meow". In addition to the real time manifestations of a PCD 100 interface, such interface attributes may vary over time to further enhance interaction by adjusting the aging process of the user and PCD 100 animal character. For example, a PCD 100 character based on a dog may mimic the actions of a puppy when first acquired and gradually mature in its behaviors and interactions to provide a sense on the part of the user that the relationship of the user and the PCD character is evolving.

As noted, in addition to PCD characteristics based on animals or fictional creatures, PCD 100 may be configured to provide an anthropomorphic interface modeled on a human being. Such a human being, or "persona", may be pre-configured, user definable or some combination of the two. This may include impersonations where PCD 100 may take on the mannerisms and characteristics of a celebrity, media personality or character (e.g., Larry Bird, Jon Stewart, a character from Downton Abby, etc.). The persona, or "digital soul", of PCD 100 may be stored (e.g. in the cloud), in addition to being resident on PCD 100, external to PCD 100 and may therefore be downloaded and installed on other PCDs 100. These other PCDs can be graphical (e.g., its likeness appears on the users mobile device) or into another physical PCD 100 (e.g., a new model).

The Persona of PCD 100 can also be of a synthetic or technological nature. As a result, PCD 100 functions as personified technology wherein device PCD 100 is seen to have its own unique persona, rather than trying to emulate something else that already exists such as a person, animal, known character and the like. In some embodiments, proprietary personas may be created for PCD 100 that can be adapted and modified over time to better suit its user. For example, the prosody of a user's PCD 100 may adapt over time to mirror more closely that of its user's own prosody as such techniques build affinity and affection. PCD 100 may also change its graphical appearance to adapt to the likes and preferences of its user in addition to any cosmetic or virtual artifacts its user buys to personalize or customize PCD 100.

In an exemplary embodiment, the digital soul of PCD 100 defines characteristics and attributes of the interface of PCD 100 as well as attributes that affect the nature of interactions between user and PCD 100. While this digital soul is bifurcated from the interaction data and information utilized by PCD 100 to engage in interaction with a user, the digital soul may change over time in response interaction with particular users. For example to separate users each with their own PCD 100 may install an identical digital soul based, for example, on a well know historical figure, such as Albert Einstein. From the moment of installation on the two separate PCDs 100, each PCD 100 will interact in a different manner depending on the user specific interaction data generated by and accessible to PCD 100. The Digital Soul can be embodied in a number of forms, from different physical forms (e.g., robotic forms) or digital forms (e.g., graphical avatars).

In accordance with an exemplary and non-limiting embodiment, PCD 100 provides a machine learning facility for improving the quality of the interactions based on collected data. The algorithms utilized to perform the machine learning may take place on PCD 100, on a computing platform in communication with PCD 100. In an exemplary embodiment, PCD 100 may employ association conditioning in order to interact with a user to provide coaching and training. Association, or "operant" conditioning focuses on using reinforcement to increase a behavior. Through this process, an association is formed between the behavior and the consequences for that behavior. For example, PCD 100 may emit a happy noise when a user wakes up quickly and hops out of bed as opposed to remaining stationary. Over time, this interaction between PCD 100 and the user operates to motivate the user to rise more quickly as the user associates PCDs 100 apparent state of happiness with such an action. In another example, PCD 100 may emit encouraging sounds or words when it is observed that the user is exercising. In such an instance PCD 100 serves to provide persistent positive reinforcement for actions desired by the user.

In accordance with various exemplary embodiments, PCD 100 may employ one of a plurality of types of analysis known in the art when performing machine learning including, but not limited to temporal pattern modeling and recognition, user preference modeling, feature classification, task/policy modeling and reinforcement learning.

In accordance with exemplary and non-limiting embodiments, PCD 100 may employ a visual, audio, kinesthetic, or "VAK", model for identifying a mode of interaction best suited to interacting with a user. PCD 100 may operate to determine the dominant learning style of a user. For example, if PCD 100 determines that a user processes information in a predominantly visual manner, PCD 100 may employ charts or illustrations, such as on a graphic display 104 forming a part of PCD 100 to convey information to the user. Likewise, PCD 100 may operate to issue questions and other prompts to a user to help them stay alert in auditory environments.

Likewise, if PCD 100 determines that a user processes information in a predominantly auditory manner, PCD 100 may commence new interactions with a brief explanation of what is coming and may conclude with a summary of what has transpired. Lastly, if PCD 100 determines that a user processes information in a predominantly kinesthetic manner, PCD 100 may operate to interact with the user via kinesthetic and tactile interactions involving movement and touch. For example, to get a user up and active in the morning, PCD 100 may engage in an activity wherein PCD 100 requests a hug from the user. In other embodiments, to highlight and reinforce an element of a social interaction, PCD 100 may emit a scent related to the interaction.

The ability to move PCD 100 around the house is an important aspect as PCD 100. In operation, PCD 100 operates to give a remote person a physically embodied and physically socially expressive way to communicate that allows people to "stay in the flow of their life" rather than having to stop and huddle in front of a screen (modern video conferencing). As a result, PCD 100 provides support for casual interactions, as though a user were visiting someone in their house. A user may be doing other activities, such as washing dishes, etc. and still be carrying on a conversation because of how the PCD 100 can track the user around the room. In exemplary embodiments described above, PCD 100 is designed to have its sensors and outputs carry across a room, etc. Core technical aspects include A user may control the PCD 100's camera view, and it can also help to automate this by tracking and doing the inverse kinematics to keep its camera on the target object.

PCD 100 may render a representation of you (video stream, graphics, etc.) to the screen in a way that preserves important non-verbal cues like eye-contact.

PCD 100 may mirror the remote person's head pose, body posture so that person has an expressive physical presence. PCD 100 may also generate its own expressive body movements to suit the situation, such as postural mirroring and synchrony to build rapport.

PCD 100 may further trigger fun animations and sounds. So a user may either try to convey yourself accurately as you, or as a fun character. This is really useful for connected story reading, where a grandma can read a story remotely with her grandchild, while taking on different characters during the story session.

PCD 100 may track who is speaking to automatically shift its gaze/your camera view to the speaker (to reduce the cognitive load in having to manually control the PCD 100)

PCD 100 may have a sliding autonomy interface so that the remote user can assert more or less direct control over the PCD 100, and it can use autonomy to supplement.

PCD 100 may provide a user with a wide field of view (much better than the tunnel vision other devices provide/ assume because you have to stay in front of it)

By doing all these things, and being able to put PCD 100 in different places around the house, the remote person feels that now they not only can communicate, but can participate in an activity. To be able to share a story at bedtime, be in the playroom and play with grandkids, participate in thanksgiving dinner remotely, sit on the countertop as you help your daughter cook the family recipe, etc. It supports hands free operation so you feel like you have a real physical social presence elsewhere.

In accordance with exemplary and non-limiting embodiments, PCD 100 may be configured or adapted to be positioned in a stable or balanced manner on or about a variety of surfaces typical of the environment in which a user lives and operates. For example, generally planar surfaces of PCD 100 may be fabricated from or incorporate, at least in part, friction pads which operate to prevent sliding of PCD 100 on smooth surfaces. In other embodiments, PCD 100 may employ partially detachable or telescoping appendages that may be either manually or automatically deployed to position PCD 100 on uneven surfaces. In other embodiments, the device may have hardware accessories that enable it to locomote in the environment or manipulate objects. It may be equipped with a laser pointer or projector to be able to display on external surfaces or objects. In such instances, PCD 100 may incorporate friction pads on or near the extremities of the appendages to further reduce slipping. In yet other embodiments, PCD 100 may incorporate one or more suction cups on an exterior surface or surfaces of PCD 100 for temporary attachment to a surface. In yet other embodiments, PCD 100 may incorporate hooks, loops and the like for securing PCD 100 in place and/or hanging PCD 100.

In other exemplary embodiments, PCD 100 is adapted to be portable by hand. Specifically, PCD 100 is configured to weigh less than 10 kg and occupy a volume of no more than 4,000 cm$^3$. Further, PCD 100 may include an attached or detachable strap or handle for use in carrying PCD 100.

In accordance with exemplary and non-limiting embodiments, PCD 100 is configured to be persistently aware of, or capable of determining via computation, the presence or occurrence of social cues and to be socially present. As such, PCD 100 may operate so as to avoid periods of complete shutdown. In some embodiments, PCD 100 may periodically enter into a low power state, or "sleep state", to conserve power. During such a sleep state, PCD 100 may operate to process a reduced set of inputs likely to alert PCD 100 to the presence of social cues, such as a person or user entering the vicinity of PCD 100, the sound of a human voice and the like. When PCD 100 detects the presence of a person or user with whom PCD 100 is capable of interacting, PCD 100 may transition to a fully alert mode wherein more or all of PCDs 100 sensor inputs are utilized for receiving and processing contextual data.

The ability to remain persistently aware of social cues reduces the need for PCD 100 to ever be powered off or manually powered on. As the ability to be turned off and on is an attributed associated with machine devices, the ability of PCD 100 to avoid being in a fully powered down mode serves to increase the perception that PCD 100 is a living companion. In some embodiments, PCD 100 may augment being in a sleep state by emitting white noise or sounds mimicking snoring. In such an instance, when a user comes upon PCD 100, PCD 100 senses the presence of the user and proceeds to transition to a fully alert or powered up mode by, for example, greeting the user with a noise indicative of waking up, such as a yawn. Such actions serve as queues to begin interactions between PCD 100 and a user.

In accordance with exemplary and non-limiting embodiments, PCD 100 is adapted to monitor, track and characterize verbal and nonverbal signals and cues from a user. Examples of such cues include, but are not limited to, gesture, gaze direction, word choice, vocal prosody, body posture, facial expression, emotional cues, touch and the like. All such cues may be captured by PCD 100 via sensor devices 102, 104, 106, 108, 112. PCD 100 may further be configured to adapt and adjust its behavior to effectively mimic or mirror the captured cues. By so doing, PCD 100 increases rapport between PCD 100 and a user by seeming to reflect the characteristics and mental states of the user. Such mirroring may be incorporated into the personality or digital soul of PCD 100 for long-term projection of said characteristics by PCD 100 or may be temporary and extend, for example, over a period of time encompassing a particular social interaction.

For example, if PCD 100 detects that a user periodically uses a particular phrase, PCD 100 may add the phrase to the corpus of interaction data for persistent use by PCD 100 when interacting with the user in the future. Similarly, PCD 100 may mimic transient verbal and non-verbal gestures in real or near real time. For example, if PCD 100 detects is raised frequency of a user's voice coupled with an increased word rate indicative of excitement, PCD 100 may commence to interact verbally with the user in a higher than normal frequency with an increased word rate.

In accordance with exemplary and non-limiting embodiments, PCD 100 may project a distinct persona or digital soul via various physical manifestations forming a part of PCD 100 including, but not limited to, body form factor, physical movements, graphics and sound. In one embodiment, PCD 100 may employ expressive mechanics. For example, PCD 100 may incorporate a movable jaw appendage that may be activated when speaking via the output of an audio signal. Such an appendage may be granted a number of degrees of freedom sufficient to mimic a smile or a frown as appropriate. Similarly, PCD 100 may be configured with one or more "eye like" accessories capable of changing a degree of visual exposure. As a result, PCD 100 can display a "wide eyed" expression in response to being startled, surprised, interested and the like.

In accordance with exemplary and non-limiting embodiments, PCD 100 may detect its posture or position in space to transition between, for example, a screen mode and an overall mode. For example, if PCD 100 incorporates a screen 104 for displaying graphical information, PCD 100 may transition from whatever state it is in to a mode that outputs information to the screen when a user holds the screen up to the user's face and into a position from which the user can view the display.

In accordance with another embodiment, one or more pressure sensors forming a part of PCD 100 may detect when a user is touching PCD 100 in a social manner. For example, PCD 100 may determine from the pattern in which more than one pressure sensors are experiencing pressure that a user is stroking, petting or patting PCD 100. Different detected modes of social touch may serve as triggers to PCD 100 to exhibit interactive behaviors that encourage or inhibit social interaction with the user.

In accordance with exemplary and non-limiting embodiments, PCD 100 may be fitted with accessories to enhance the look and feel of PCD 100. Such accessories include, but are not limited to, skins, costumes, both internal and external lights, masks and the like.

As described above, the persona or digital soul of PCD 100 may be bifurcated from the physical manifestation of PCD 100. The attributes comprising a PCD 100 persona may be stored as digital data which may be transferred and communicated, such as via Bluetooth or WiFi to one or more other computing devices including, but not limited to, a server and a personal computing device. In such a context, a personal computing device can be any device utilizing a processor and stored memory to execute a series of programmable steps. In some embodiments, the digital soul of PCD 100 may be transferred to a consumer accessory such as a watch or a mobile phone. In such an instance, the persona of PCD 100 may be effectively and temporarily transferred to another device. In some embodiments, while transferred, the transferred instance of PCD 100 may continue to sense the environment of the user, engage in social interaction, and retrieve and output interaction data. Such interaction data may be transferred to PCD 100 at a later time or uploaded to a server for later retrieval by PCD 100.

In accordance with exemplary and non-limiting embodiments, PCD 100 may exhibit visual patterns, which adjust in response to social cues. For example, display 104 may emit red light when excited and blue light when calm. Likewise, display 104 may display animated confetti falling in order to convey jubilation such as when a user completes a task successfully. In some embodiments, the textures and animations for display may be user selectable or programmable either directly into PCD 100 or into a server or external device in communication with PCD 100. In yet other embodiments, PCD 100 may emit a series of beeps and whistles to express simulated emotions. In some embodiments, the beeps and whistles may be patterned upon patterns derived from the speech and other verbal utterances of the user. In some instances, the beeps, whistles and other auditory outputs may serve as an auditory signature unique to PCD 100. In some embodiments, variants of the same auditory signature may be employed on a plurality of PCDs 100, such as a group of "related" PCDs 100 forming a simulated family, to indicate a degree of relatedness.

In some embodiments, PCD 100 may engage in anamorphic transitioning between modes of expression to convey an emotion. For example, PCD 100 may operate a display 104 to transition from a random or pseudorandom pattern or other graphic into a display of a smiling or frowning mouth as a method for displaying human emotion.

In other exemplary embodiments, PCD 100 may emit scents or pheromones to express emotional states.

In accordance with yet another exemplary embodiment, may be provided with a back story in the form of data accessible to PCD 100 that may for the basis of interactions with users. Such data may comprise one or more stories making reference to past events, both real and fictional, that form a part of PCDs 100 prior history. For example, PCD 100 may be provided with stories that may be conveyed to a user via speech generation that tell of past occurrences in the life of PCD 100. Such stories may be outputted upon request by a user of may be triggered by interaction data. For example, PCD 100 may discern from user data that today is the user's birthday. In response, PCD 100 may be triggered to share a story with the user related to a past birthday of PCD 100. Data comprising the back story may be centrally stored and downloaded to PCD 100 upon request by a user or autonomously by PCD 100.

Figure 11:
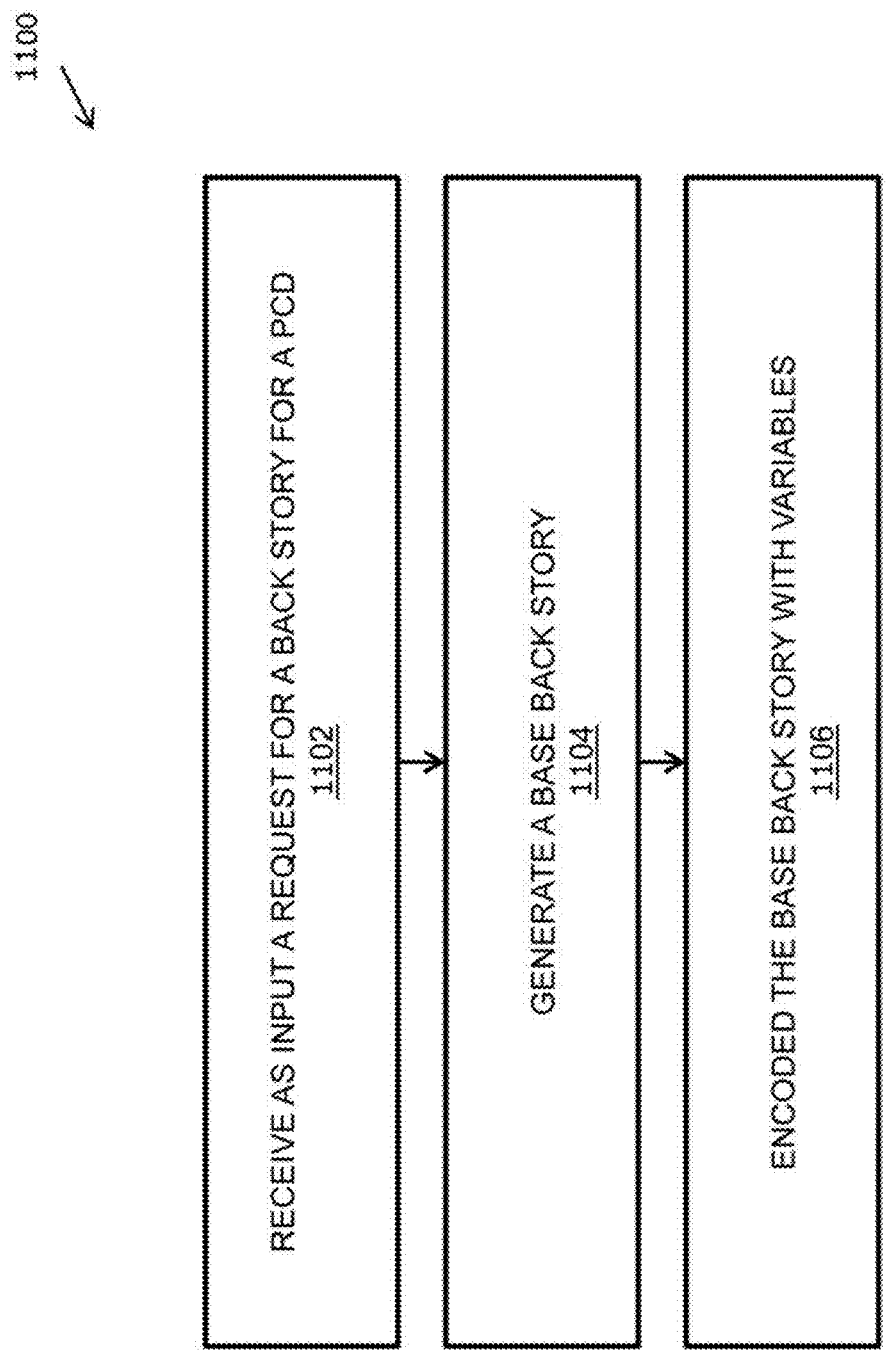
FIG. 11 illustrates a flowchart for a method to generate and encode back stories according to exemplary and non-limiting embodiments.
Figure 12:
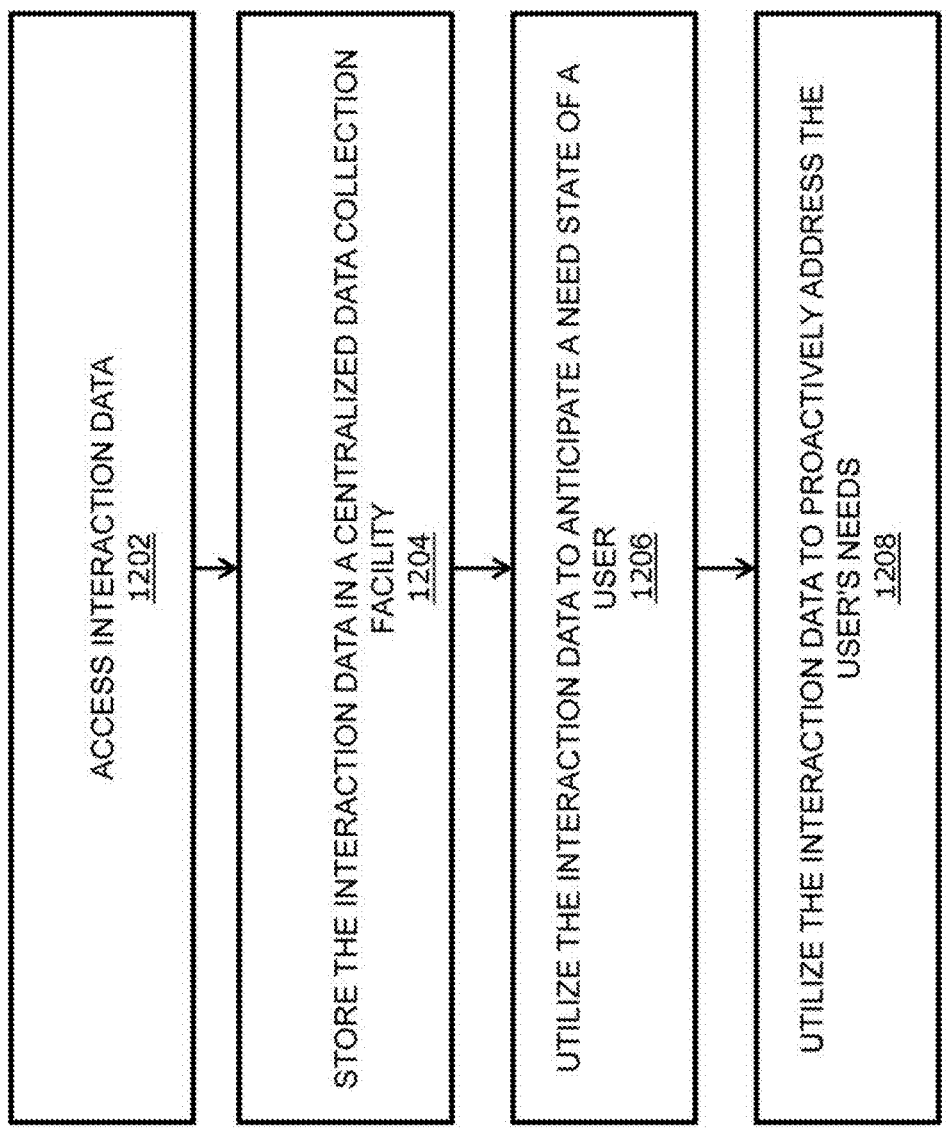
FIG. 12 illustrates a flowchart for a method to access interaction data and use it to address a user's needs according to exemplary and non-limiting embodiments.

Back stories may be generated and stored by a manufacturer of PCD 100 and made available to a user upon request. With reference to FIG. 11, there is illustrated a flowchart 1100 of an exemplary and non-limiting embodiment. In an example, at step 1102, a manufacturer may receive as input a request for a back-story for a PCD 100 modeled on a dog associated with a user interested in sports, particularly, baseball and the Boston Red Sox. In response, the manufacturer or third party back-story provider may generate a base back story, at step 1104. In an example, the story may comprise relatively generic dog stories augmented by more particular stories dealing with baseball to which are added details related to the Red Sox.

In some embodiments, at step 1106, the back-story may be encoded with variables that will allow for further real time customization by PCD 100. For example, a back story may be encoded in pseudo code such as: "Me and my brothers and sisters <for i==1 to max_siblings, insert sibling_name[i]> were raised in . . . ". In this manner, when read by PCD 100, the story may be read as including the name of other PCDs 100 configured as related to PCD 100.

In accordance with an exemplary and non-limiting embodiment, PCD 100 may be provided with an executable module or program for managing a co-nurturance feature of PCD 100 whereby the user is encouraged to care for the companion device. For example, a co-nurturance module may operate to play upon a user's innate impulse to care for a baby by commencing interaction with a user via behavior involving sounds, graphics, scents and the like associated with infants. Rapport between PCD 100 and a user may be further encouraged when a co-nurturance module operates to express a negative emotion such as sadness, loneliness and/or depression while soliciting actions from a user to alleviate the negative emotion. In this way, the user is encouraged to interact with PCD 100 to cheer up PCD 100.

In accordance with an exemplary and non-limiting embodiment, PCD 100 may include a module configured to access interaction data indicative of user attributes, interactions of the user of PCD 100 with PCD 100, and the environment of the user of PCD 100. With reference to FIG. 1200, there is illustrated a flowchart of an exemplary and non-limiting embodiment. At step 1202, the interaction data is accessed. At step, 1204, the interaction data may be stored in a centralized data collection facility. Once retrieved and stored, at step 1206, the interaction data may be utilized to anticipate a need state of the user. Once a need state is identified, it can be utilized to proactively address a user's needs without reliance on a schedule for performing an action, at step 1208. In some embodiments, a user's physical appearance, posture and the like may form the basis for identifying a need state. In some instances, the identification of a need state may be supplemented by schedule data, such as comprising a portion of interaction data. For example, a schedule may indicate that it is past time to fulfill a user's need to take a dose of antibiotics. PCD 100 may ascertain a user's need state, in part, from data derived from facial analysis and voice modulation analysis.

In accordance with exemplary and non-limiting embodiments, PCD 100 may be used as a messenger to relay a message from one person to another. Messages include, but are not limited to audio recordings of a sender's voice, PCD 100 relaying a message in character, dances/animations/ sound clips used to enhance the message and songs.

Messages may be generated in a variety of ways. In one embodiment, PCD 100 is embodied as an app on a smart device. The sender may open the app, and selects a message and associated sounds, scheduling, etc. A virtual instance of PCD 100 in the app may walk the user through the process. In another embodiment, through direct interaction with PCD 100, a sender/user may instruct PCD 100, via a simple touch interface or a natural language interface, to tell another person something at some future time. For example a user might say "PCD, when my wife comes into the kitchen this morning, play her X song and tell her that I love her". Sender might also have PCD 100 record his/her voice to use as part of the message. In other embodiments, instead of a sender's PCD 100 delivering the message, the message may be delivered by a different PCD 100 at another location. In yet another embodiment, a user/sender can, for instance, tweet a message to a specific PCDs 100 hash tag, and PCD 100 will speak that message to the user/recipient. Emoticons may also be inserted into the message, prompting a canned animation/sound script to be acted out by PCD 100. Some exemplary emoticons are:

TABLE 1

Emoticon Definitions

| PCD 100ticon | Meaning | PCD 100ticon | Meaning |
|---|---|---|---|
| ') | Wink | oO | Wohooooo! |
| o( | Sad | oD | Laugh out loud!!!!! |
| o) | Happy | oX | Don't ask don't tell |
| oB | Bunny Rabbit gonna EAT you! | or | Snaggletooth PCD 100 |
| op | Raspberries! | od | Yummmm! |
| oP | Capital Raspberries! | o[ | Vampire/Naughty |
| o / | Hmmm . . . not sure . . . confused | o{ | Grumpy/Grumpy Old man |
| o * | Cheek kiss | o# | Secret. Don't tell! |
| os | Nauseous PCD 100 | | My lips are sealed. |
| ol | Fake smile (or indifferent) | {o | huh?/Curious |
| o+ | Sick/ate something bad/sour | }o | Angry |
| | | o> | A little bird told me |

In addition, messages may be scheduled to be sent later, at a particular date and time or under a certain set of circumstances (e.g., "the first time you see person X on Tuesday", or "when person Y wakes up on Wednesday, give them this message").

In other embodiments, PCD 100 may be used to generate messages for users who don't have PCDs. Such messages may be generated in the form of a we blink, and may incorporate a Virtual PCD 100 for delivering the message just as a physical PCD 100 would if the receiver had one.

As is therefore evident, PCD 100 may be configured to receive messages from persons, such as friends and family of the user, wherein the messages trigger actions related to emotions specified in the messages. For example, a person may text a message to a PCD 100 associated with a user within which is embedded an emoticon representing an emotion or social action that the sender of the message wishes to convey via PCD 100. For example, if a sender sends a message to PCD 100 reading "Missing you a lot OX", PCD 100 may, upon receiving the message, output, via a speech synthesizer, "In coming message from Robert reads 'Missing you a lot'" while simultaneously emitting a kissing sound, displaying puckered lips on a display or similar action. In this way, message senders may annotate their messages to take advantage of the expressive modalities by which PCD 100 may interact with a user.

With reference to FIG. 14, there is illustrated an exemplary and non-limiting embodiment of an example whereby PCD 100 may utilize a user interface to display a recurring, persistent, or semi-persistent, visual element, such as an eye, during an interaction with a user. For example, as shown below, to display a question mark, the visual element 1400, comprising a lighter circle indicative of an iris or reflection on the surface of the eye, may shift its position to the bottom of the question mark as the eye morphs or otherwise smoothly transitions into a question mark visual element 1400''' via intermediary visual elements 1400', 1400". The ability of the visual element to morph as described and illustrated results in high-readability.

With reference to FIG. 15, there is illustrated an exemplary and non-limiting embodiment of an example whereby a visual element 1500, in instances where the eye is intended to morph into a shape that is too visually complex for the eye, may "blink" as illustrated to transition into the more visually complex shape 1500'. For example, as illustrated, the visual element of the eye 1500, "blinks" to reveal a temperature or other weather related variable shape 1500'.

Figure 16:
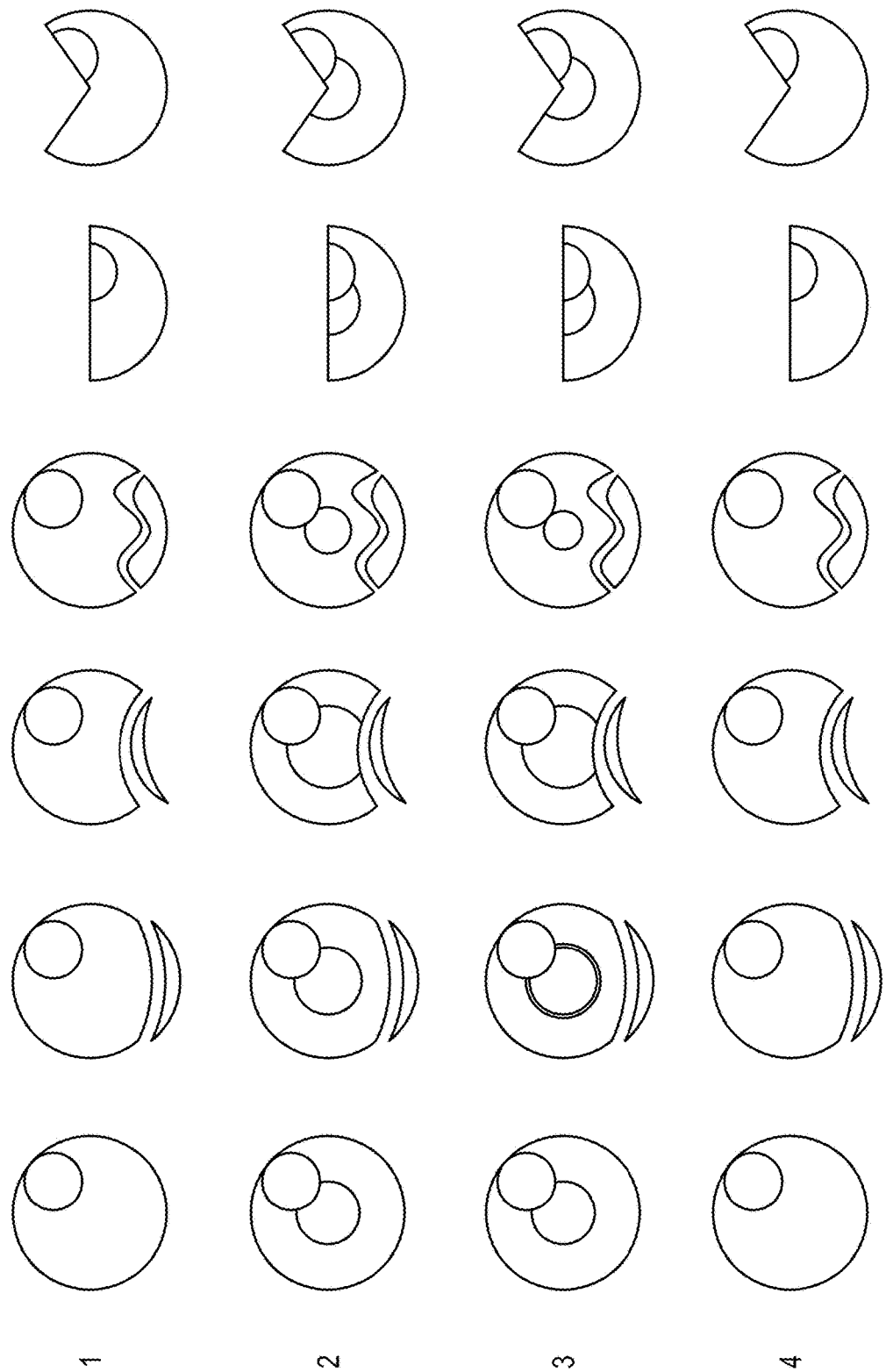
FIG. 16 illustrates an example of displaying a recurring, persistent, or semi-persistent, visual element, according to an exemplary and non-limiting embodiment.

With reference to FIG. 16, there is illustrated an exemplary and non-limiting embodiment of an example whereby a mouth symbol may be formed or burrowed out of the surface area of the eye visual element. In various embodiments, the color of the visual element may be altered to reinforce the displayed expression.

In accordance with various exemplary and non-limiting embodiments, the PCD 100 may have and exhibit "skills," as compared to applications that run on conventional mobile devices like smartphones and tablets. Just like applications that run on mobile platforms like iOS and Android, the PCD 100 may support the ability to deploy a wide variety of new skills. A PCD skill may comprise a JavaScript package, along with assets and configuration files that may invoke various JavaScript APIs, as well as feed information to an execution engine. As a result, both internal and external developers may be supported in developing new skills for the PCD 100.

As a fundamental principle, any new social robot skill is capable of being written entirely in JavaScript that relates to a set of JavaScript APIs that comprise the core components of a software development kit (SDK) for developing new skills. However, to facilitate development, a set of tools, such as an expression tool suite and a behavior editor, may allow developers to create configuration files that feed into the execution engine, facilitating simpler and more rapid skill development as well as the use of previously developed skills.

Figure 17:
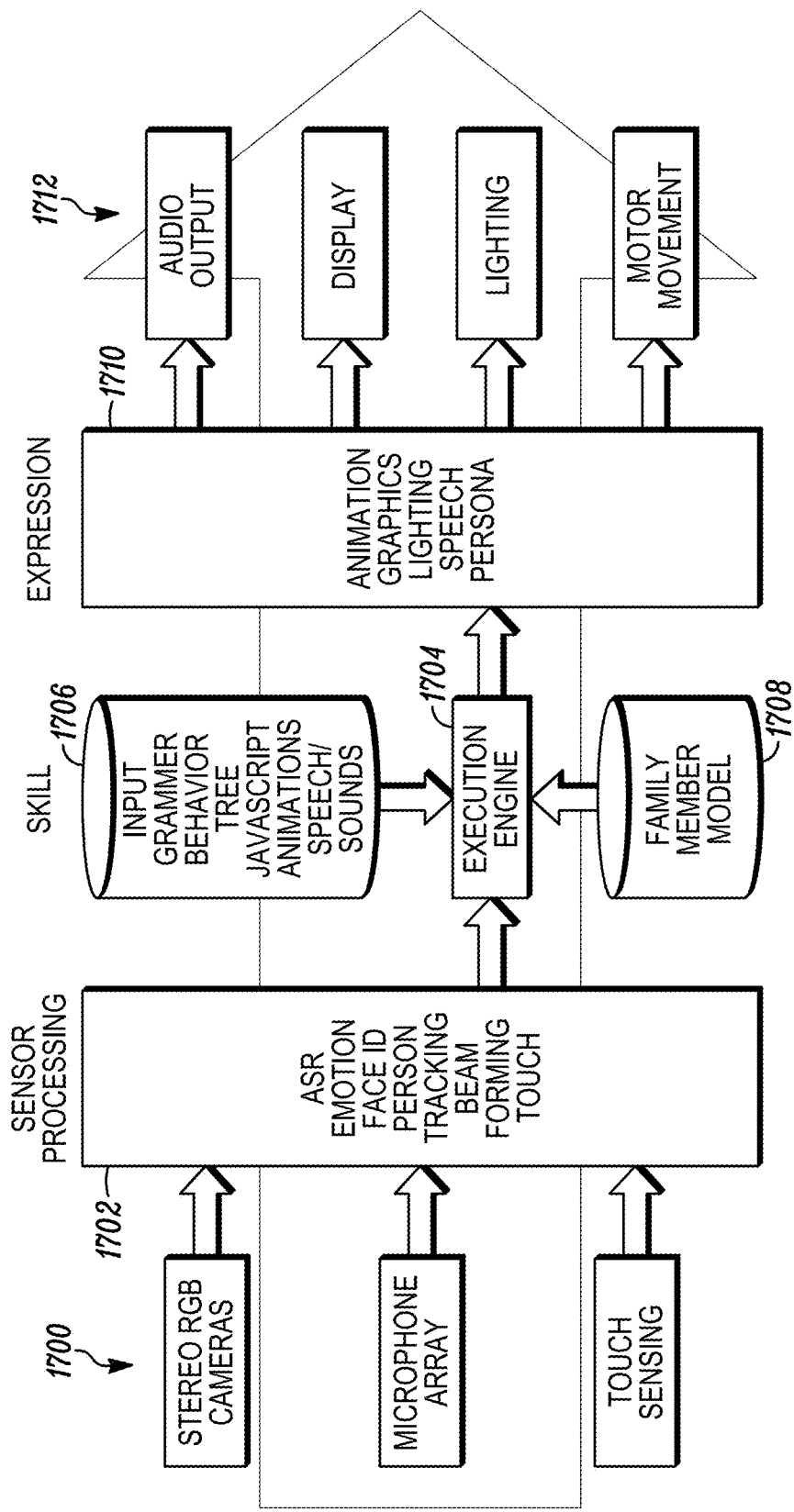
FIG. 17 illustrates an exemplary and non-limiting embodiment of a runtime skill for a PCD.

With reference to FIG. 17, there is illustrated an exemplary and non-limiting embodiment of a platform for enabling a runtime skill for a PCD 100. As illustrated, various inputs 1700 are received which include, but are not limited to, imagery from a stereo RGB camera, a microphone array and touch sensitive sensors. Inputs 1700 may come via a touch screen. Inputs 1700 may form an input to sensory processing module 1702 at which processing is performed to extract information from and to categorize the input data. Inputs may come from devices or software applications external to the device, such as web applications, mobile applications, Internet of Things (IoT) devices, home automation devices, alarm systems, and the like. Examples of forms of processing that may be employed in sensory processing module include, but are not limited to, automated speech recognition (ASR), emotion detection, facial identification (ID), person or object tracking, beam forming, and touch identification. The results of the sensory processing may be forwarded as inputs to execution engine 1704. The execution engine 1704 may operate to apply a defined skill, optionally receiving additional inputs 1706 in the form of, for example, without limitation, one or more of an input grammar, a behavior tree, JavaScript, animations and speech/sounds. The execution engine 1704 may similarly receive inputs from a family member model 1708.

The execution engine 1704 may output data forming an input to expression module 1710 whereat the logical defined aspects of a skill are mapped to expressive elements of the PCD 100 including, but not limited to, animation (e.g., movement of various parts of the PCD), graphics (such as displayed on a screen, which may be a touchscreen, or movement of the eye described above), lighting, and speech or other sounds, each of which may be programmed in the expression module 1710 reflect a mode, state, mood, persona or the like of the PCD as described elsewhere in this disclosure. The expression module 1710 may output data and instructions to various hardware components 1712 of a PCD 100 to express the skill including, but not limited to, audio output, a display, lighting elements, and movement enabling motors. Outputs may include control signals or data to device or applications external to the PCD 100, such as IoT devices, web applications, mobile applications, or the like.

Figure 18:
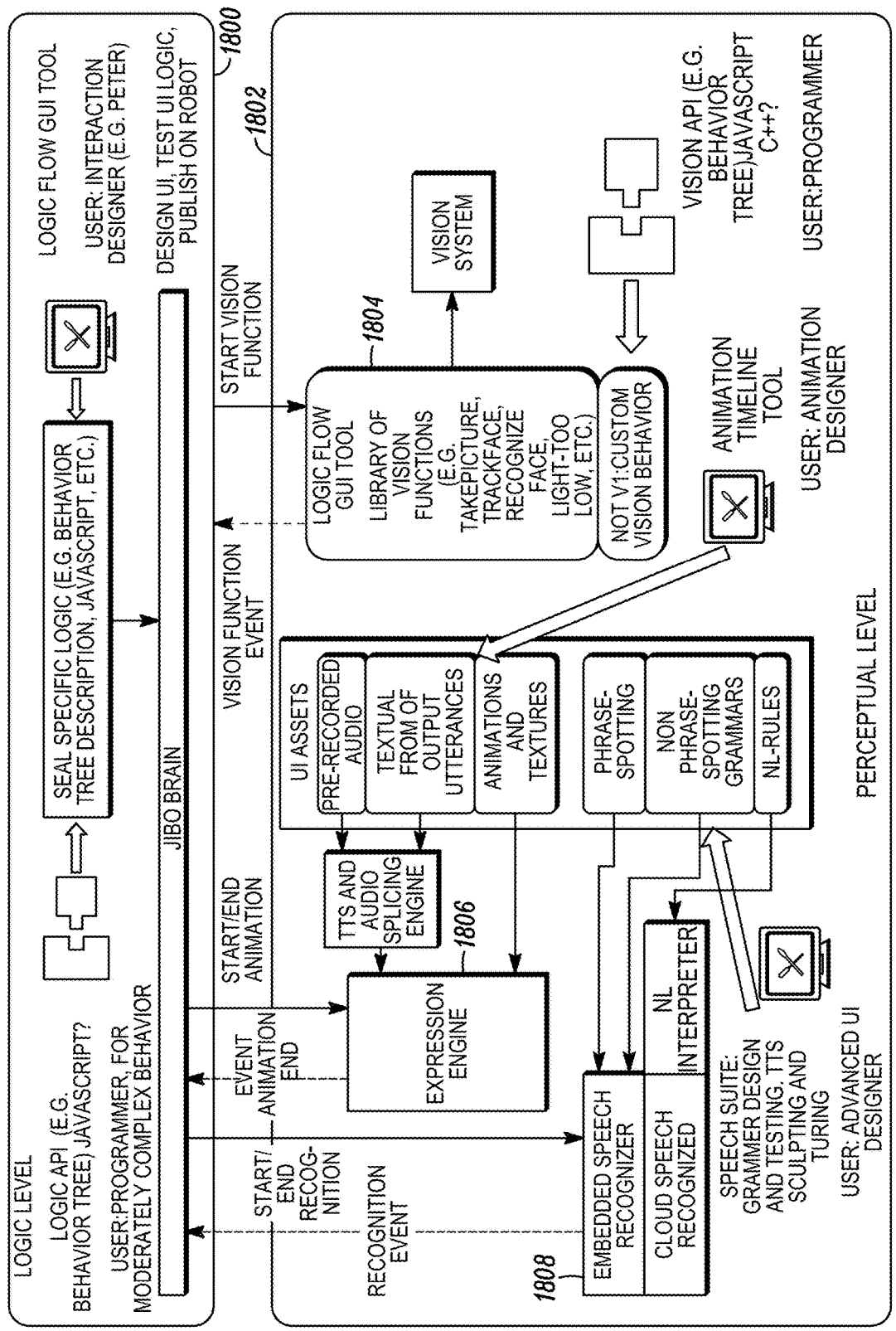
FIG. 18 is an illustration of an exemplary and non-limiting embodiment of a flow and various architectural components for a platform enabling development of a skill using the SDK.

With reference to FIG. 18, there is illustrated an exemplary and non-limiting embodiment of a flow and various architectural components for a platform enabling development of a skill using the SDK. As illustrated, a logic level 1800 may communicate with a perceptual level 1802. Perceptual level 1802 may detect various events such as vision function events via vision function module 1804, an animation event via expression engine 1806 and a speech recognition event via speech recognizer 1806. Communication between logic level 1800 and perceptual level 1802 may serve to translate perceived events into expressed skills.

With this in mind, certain capabilities may be provided via a set of JavaScript APIs. First, JavaScript APIs may exist for various types of sensory input. JavaScript APIs may exist for various expression output. JavaScript APIs may also exist for the execution engine 1704, which in turn may invoke other existing JavaScript APIs. JavaScript APIs may exist for information stored within various models, such as a family member model 1708. The execution engine 1704 uses any of these APIs, such as by extracting information via them for use in the execution engine 1704. In embodiments, developers who do not use the execution engine may directly access the family member model 1708. Among other things, the PCD 100 may learn, such as using machine learning, about information, behavioral patterns, preferences, use case patterns, and the like, such as to allow the PCD 100 to adapt and personalize itself to one or more users, to its environment, and to its patterns of usage. Such data and the results of such learning may be embodied in the family member model 1708 for the PCD 100.

Sensory input APIs may include a wide range of types, including automated speech recognition (ASR) APIs, voice input APIs, APIs for processing other sounds (e.g., for music recognition, detection of particular sound patterns and the like), APIs for handling ultrasound or sonar, APIs for processing electromagnetic energy (visible light, radio signals, microwaves, X-rays, infrared signals and the like), APIs for image processing, APIs for handling chemical signals (e.g., detection of smoke, carbon monoxide, scents, and the like) and many others. Sensory input APIs may be used to handle input directly from sensors of the PCD 100 or to handle sensor data collected and transmitted by other sensory input sources, such as sensor networks, sensors of IOT devices, and the like.

With respect to various sensory inputs, timestamps may be provided to allow merging of various disparate sensory input types. For example, timestamps may be provided with a speech recognizer to allow merging of recognized speech with other sensory input. ASR may be used to enroll various speakers. Overall, a speech tool suite may be provided for the speech interface of the PCD 100.

Also provided may be a variety of face tracking and people tracking APIs, touch APIs, emotional recognition APIs, expression output APIs, movement APIs, screen and eye graphics APIs, lighting APIs (e.g., for LED lights), sound and text to speech (TTS) APIs, and various others. Sound and TTS APIs may allow the PCD 100 to play audio files, speak words from a string of text, or the like. This may be either constant or the content of a string variable, an arbitrary amount of silence, or any arbitrary combination of them. For instance, a developer can specify a command such as: Speak("beep.wav", NAME, ":SIL 3 sec", "I am so happy to see you"), resulting in a beeping sound, speaking a particular name represented by populating NAME variable with an actual name, a silent period of three seconds, then the greeting. Text may be expressed in SSML (Speech Synthesis Markup Language). Simple text may be spoken according to conventional punctuation rules. In embodiments there may be expressive filters or sound effects overlaid or inserted into the spoken utterance.

The PCD SDK may include methods to upload content assets, like audio files, as well as to set properties of audio output, such as volume. The social robot may be configured to play various different formats, such as .wav, .mp3, and the like. Assets may be stored in various libraries, such as in the cloud or a local computing device. The PCD SDK may allow the PCD to search for assets, such as by searching the Internet, or one or more sites, for appropriate content, such as music, video, animations, or the like.

A set of family member and utility APIs may be provided that act as a front end to data stored remotely, such as in the cloud. These APIs may also include utilities that developers may want to use (such as logging, etc.).

A set of execution engine APIs may be provided to enable interface with the execution engine 1704. The execution engine 1704 may comprise an optional JavaScript component that can act on the configuration files created using several different tools, such as, without limitation, the Behavior Editor and the Expression Tool Suite. The execution engine may also multiplex data from the Family Member store, again making it easier for developers to write skills. In embodiments the Family Member store can also include hardware accessories to expand the physical capabilities of the PCD 100, such as projectors, a mobile base for the PCD 100, manipulators, speakers, and the like, as well as decorative elements that allow users to customize the appearance of the PCD 100.

One may follow a workflow to create a new PCD skill, commencing with asset creation and proceeding in turn to skill writing, simulation, testing and certification (such certification being provided in embodiments by a host enterprise that manages the methods and systems described herein).

Figure 19:
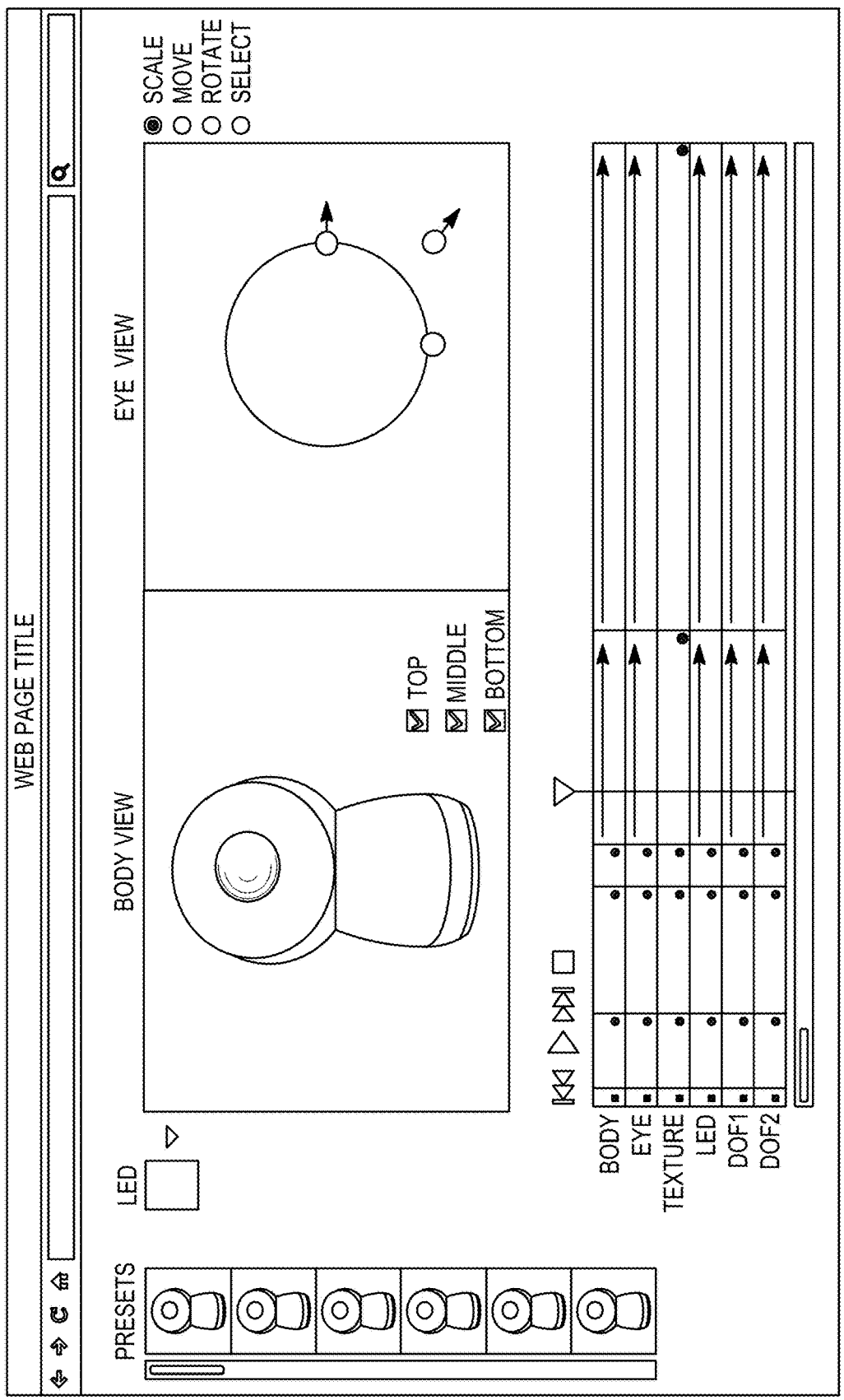
FIG. 19 is an illustration of an exemplary and non-limiting embodiment of a user interface that may be provided for the creation of assets.

With reference to FIG. 19, there is illustrated an exemplary and non-limiting embodiment of a user interface that may be provided for the creation of assets. Asset creation may involve creating the skill's assets. It may not necessarily be the first step, but is often an ongoing task in the flow of creating a skill, where assets get refined or expanded as the skill itself gets developed. The types of assets that may be created include animations, such as using a special tool within an expression tool suite to easily create new body and eye animations. Developers may also be able to repurpose body and eye animations in the "Developers" section of a PCD skills store. In embodiments developers may share their assets with consumers or other developers, such as on a skills store for the PCD 100 or other environment, such as a developer's portal. Assets may also include sounds, such that developers may create their own sounds using their favorite sound editor, as long as the resource is in an appropriate format with appropriately defined characteristics. Assets may include text-to-speech assets, leveraging a parametric TTS system, so that developers may create text-to-speech instances, and annotate these instances with various attributes (like "happy") that can modulate the speech.

Assets may include light visualizations, such as to control the LED lights on the PCD 100 (such as on the torso), in which case developers may use an expression tool suite to specify control. Note that developers can also repurpose LED light animations, such as from a "Developers" section of the PCD skills store as well.

Assets may include input grammars. In order to manage a skills recognized input grammar, developers may use a speech tool suite to specify the various grammars they wish recognized.

Once a developer has the assets for a skill in order, the developer may write the skill itself using a behavior editor. The behavior editor enables the logic governing the handling of the sensory input, as well as the control of the expression output. While most of this step can be done using a straight-forward editor, the SDK may enable the addition of straight JavaScript code to enable a developer to do things that might be unique to the particular skill, such as exchanging data with one or more proprietary REST APIs, or the like.

Once a skill is (partially) written, the developer may exercise various aspects of the skill using a PCD simulator, which may occur in real time or near real-time. The simulator may support the triggering of basic sensory input, and may also operate on a sensory input file created earlier via PCD's developer record mode. Inputs to the simulator may come from physical input to the PCD 100, from one or more sensors external to the PCD 100, directly from the simulator, or from external devices, such as IoT devices, or applications, such as web applications or mobile applications. The simulator will support parts of the Expression System via WebGL graphic output, as well as text to represent the TTS output. The development and simulation cycle can be in real time or near-real time, using a WYSIWYG approach, such that changes in a skill are immediately visible on the simulator and are responsive to dynamic editing in the simulator.

Ultimately, the developer may need to test the skill on the PCD 100 itself, since more complex behaviors (such as notifications) may not be supported within the simulator. In addition to adhoc live testing, the developer may again drive the testing via sensory input files created via the PCD's record mode. In embodiments inputs may be streamed in real time or near real time from an external source.

Also, if the developer wished to enable others to use and purchase the new skill, the developer may submit the skill, such as to the host of the SDK, for certification. Various certification guidelines may be created, such as to encourage consistency of behavior across different skills, to ensure safety, to ensure reliability, and the like. Once certified, the skill may be placed in the PCD store for access by users, other developers, and the like. In embodiments developers can also post assets (e.g., animations, skills, sounds, etc.) on a store for the PCD 100, a developer's portal, or the like.

Various tools may be deployed in or in connection with the SDK. These may include a local perception space (LPS) visualization tool that allows a developer to see, understand and/or test the social robot's local perception space (e.g. for identification of a person, tracking a person, emotion detection, etc.). Tools may include various tools related to speech in a speech tool suite of utilities to create new grammars, and annotate the text-to-speech output. In embodiments, tools may be used to apply filters or other sounds or audio effects over a spoken utterance. Tools may include a behavior editor to allow developers to author behavior, such as through behavior trees (e.g. the "brain") for a given skill.

An expression tool suite may include a suite of utilities to author expressive output for the social robot, which may include an animation simulator that simulates animated behavior of the PCD 100. This may comprise HTML or JavaScript with a webkit and an interpreter, such as V8 JS Interpreter™ from Google™ underneath. Behaviors and screen graphics may be augmented using standard web application code.

A simulated runtime environment may be provided as a tool for exercising various aspects of a skill.

With reference to FIG. 20, there are illustrated exemplary and non-limiting screen shots of a local perception space (LPS) visualization tool that may allow a developer to see the local perception space of the PCD 100, such as seen through a camera of the PCD 100. This can be used to identify and track people within the view of the PCD 100. In embodiments this may grow in complexity and may comprise a three dimensional world, with elements like avatars and other visual elements with which the PCD 100 may interact.

A speech tool suite may include tools related to hearing (e.g., an "ear" tool) and speaking. This may include various capabilities for importing phrases and various types of grammars (such as word spotting, statistical, etc.) from a library, such as yes/no grammars, sequences of digits, natural numbers, controls (continue, stop, pause), dates and times, non-phrase-spotting grammars, variables (e.g., $name), and the like. These may use ASR, speech-to-text capabilities, and the like and may be cloud-based or embedded on the PCD 100 itself. The tool suite may include basic verification and debugging of a grammar, with application logic, in the simulator noted above. A tool suite may include tools for developing NLU (natural language understanding) modes for the PCD 100. Resources may be created using an on-device grammar compilation tool. Resources may include tools for collecting data (e.g., like mechanical turk) and machine learning tools for training new models: such as for phrase spotting, person identification via voice, or other speech or sound recognition or understanding capabilities. Grammars may publish output tags for GUI presentation and logic debugging. A sensor library of the PCD 100 may be used to create sensory resources and to test grammar recognition performance. Testing may be performed for a whole skill, using actual spoken ASR. Phrase-spotting grammars may be created, tested and tuned.

In the behavior editor, when invoking the recognizer, a developer may modify a restricted set of a recognizer's parameters (e.g. timeout, rejection, etc.) and/or invoke call-back on recognition results (such as to perform text processing).

With reference to FIG. 21, a screenshot is provided of a behavior editor according to an exemplary and non-limiting embodiment. The PCD behavior editor 2100 may enable developers/designers to quickly create new skills on a PCD 100. The output file, defined in this section, drives the execution engine 1704. More details on the behavior editor 2100 are provided below.

In embodiments, the behavior authoring tool may comprise a behavior tree creator designed to be easy to use, unambiguous, extensible, and substantially WYSIWYG. The behaviors themselves may comprise living documentation. Each behavior may have a description and comment notation. A behavior may be defined without being implemented. This allows designers to "fill in" behaviors that don't yet exist.

The PCD behavioral system may be, at its core, made up of very low level simple behaviors. These low level behaviors may be combined to make more high level complex behaviors. A higher-level behavior can either be hand coded, or be made up of other lower level behaviors. This hierarchy is virtually limitless. Although there are gradients of complexity, behavior hierarchies can be divided roughly into three levels: (1) atomic behaviors (the minimal set of behaviors to have a functioning behavior tree, generally including behaviors that are not necessarily dependent on the functions of the PCD 100); (2) PCD 100 based behaviors (behaviors that span the full capability set of the PCD 100, such as embodied in various JavaScript APIs associated with the social robot), (3) compound, high level behaviors (which may be either hand coded, or made up of parameterized behavior hierarchies themselves) and (4) skeleton behaviors (behaviors that are do not exist, are not fully implemented, or whose implementation is separate). Behavior hierarchies may be learned from the experience of the PCD 100, such as using machine learning methods such as reinforcement learning, among others. Each function call in the social robot API, such as embodied in a JavaScript API, may be represented as a behavior where it makes sense. A skeleton behavior can be inserted into a behavior tree for documentation purposes and implemented later and bound at runtime. This allows a designer who needs a behavior that does not yet exist to insert this "Bound Type" which includes a description and possible outcomes of this behavior (Fail, Succeed, etc.) and have an engineer code the implementation later. If, during playback, the bound type exists then that type is bound to the implementation; otherwise, the PCD 100, or the simulation, may speak the bound behavior name and its return type and continue on in the tree. The tools may also support the definition of perceptual hierarchies to develop sophisticated perceptual processing pipelines. Outputs of these perceptual trees may be connected to behaviors, and the like. In addition, the development platform and SDK support a suite of multi-modal libraries of higher-order perceptual classification modules (Reusable Multi-Modal Input-Output Modules) made available to developers.

At the most atomic, a behavior tree may be made of these elementary behaviors: BaseBehavior—a leaf node; BaseDecorator—a behavior decorator; Parallel—a compound node; Sequence (and sequence variations)—a compound node; Select—a compound node; and Random (and random variations)—a compound node. Atomic behaviors may be almost the raw function calls to the PCD JavaScript API, but wrapped as a behavior with appropriate timing. They span the entire API and may be very low level. Some examples include: LookAt; LoadCompileClip; and PlayCompiledClip. Compiled clips may have embedded events. A behavior or decorator can listen for an event of a certain type and execute logic at the exact moment of that event. This allows tight synchronization between expression output and higher-level decision making. Atomic behaviors may also include: PlayMp3; Listen; ListenTouch; and Blink (such with parameters relating to blinkSpeed, interruptPreviousBlink=true|false).

Compound/High-level behaviors may be high level behaviors that combine other high level and/or low level behaviors. These behaviors may be parameterized. Examples may include: BeAttentive; TakeRandomPictures; BeHappy; and StreamCameraToScreen. Behaviors can be goal directed, such as to vary actions to achieve a desired outcome or state with the world. For example, in the case of object tracking, a goal may be to track an object and keep it within the visual field. More complex examples would be searching to find a particular person or varying the behavior of the PCD 100, such as to make a person smile. In embodiments, the mood or affective or emotive state of the PCD 100 can modify the behavior or style of behavior of the PCD 100. This may influence prioritization of goals or attention of the PCD. This may also influence what and how the PCD 100 learns from experience.

Readability of the behavior trees is important, especially when the trees become large. Take a simple case statement that branches the tree based on an utterance. The formal way to declare a case statement is to create a Select behavior that has children from which it will "select" one to execute. Each child is decorated with a FailOnCondition that contains the logic for "selecting" that behavior. While formal, it makes it difficult to automatically see why one element might be selected over another without inspecting the logic of each decorator. The description field, though, may be manually edited to provide more context, but there is not necessarily a formal relationship between the selection logic and the description field. With reference to FIG. 22, there is illustrated a formal way of creating branching logic according to an exemplary and non-limiting embodiment. Notice, the code of the first and second decorator 2200, 2202. FIG. 22 illustrates the formal relationship.

In the PCD 100, there are common branching patterns. A few of these include: grammar-based branching; touch-based branching; and vision-based branching.

For the most common branching, the behavior tool GUI may simplify the tree visualization and provide a formal relationship between the "description" and the logic. This may be achieved by adding to the behavior tree editor an "Info" column, which is auto-populated with a description derived by introspecting the underlying logic. The GUI tool may know that the specialized Select behavior called "GrammarSelect" is meant to be presented in a particular mode of the GUI. The underlying tree structure may be exactly the same as in FIG. 22, but it may be presented in a more readable way.

With reference to FIG. 23, there is illustrated an exemplary and non-limiting embodiment whereby select logic may be added as an argument to the behavior itself. In this case, the added argument may be a string field that corresponds to the grammar tag that is returned, and the value of that argument may be automatically placed in the "Info" field. The value of the added argument in each child behavior to GrammarSelect can be used to generate the correct code that populates the underlying SucceedElseFail decorator.

The "common pattern" for multimodal interaction is known, and it is an evolution of the common pattern for unimodal interaction (speech), which has been used in the past. This is true only in "sequential multimodality" (e.g. the two modes). However, robot behavior and human-machine interaction (HMI) have slightly different paradigms. While the first is more easily expressed by a behavior tree, the "nesting" structure of dialog lends itself better to nested "case" statements, or even more generally, to a representation involving a recursive directed graph with conditional arcs. So one may match the two with an enhancement to the GrammarSelect to increase readability of the HMI flow allowing for building sophisticated interactions.

Practically any human-machine interaction may happen in this way. First, a machine is configured to output something (in general something like animation+audio+texture), then the human inputs something (in general speech or touch) or some other process returns an event that is significant for the interaction, and the sequence iterates from there with additional outputs and inputs.

So, the case statement above (GrammarSelect) would cover that if one extended it to the full event paradigm and one could have a general HMI select, where one can specify the tag (which corresponds to an event) and the type of tag (grammar, vision, touch). So the above would be:

HMI_InputSelect:
AnyBehavior1 Speech:RANDOMPICTURE, Touch: AREA1
AnyBeahvior2 Speech:PLAYMUSIC, Touch: AREA2
AnyBehavior3 Vision: TRACKINGFACELOST The tags separated by commas are in OR. In this example the behavior would respond with AnyBehavior1 to someone saying "take random pictures" OR touching AREA1, Behavior 2 to someone saying "Play Music", or Touching Area 2, or with Behavior3 if the vision system returns a TRACKINGFACELOST.

Another way to improve readability of the HMI flow is to explicitly see the text of the prompts in the behavior tree specification view, by introducing a basic behavior called, for example, "Speak". So, referring to the above example, if someone says RANDOMPICTURE, than one enters into AnyBehavior1Sequence:AnyBehavior1.

The PCD 100 speaks: "OK, I am going to take a picture of you now. Ready?"

The user returns a "Yes," resulting in processing of either Behavior Speech:YES or Touch:YESAREA.

Then the PCD 100 initiates a sequence, such as a TakePictureBehavior. I

If the PCD 100 detects a "no," such as hearing a NoBehavior Speech:NO or sensing a Touch:NOAREA, then the user executes a GoHomeBehavior and initiates a speech behavior: robotSpeak "OK. Going back to home screen".

In this case, the PCD Speak is a basic behavior that randomizes a number of prompts and the corresponding animations (in embodiments, one can see the prompts and the animations if one double clicks the behavior, and the behavior editing box will pop up). It is important to have typing of this behavior, because the UI design can write the prompt while a developer is designing the application. Then one can automatically mine the behavior tree for all the prompts and create a manifest table for the voice talent, automatically create files names for the prompts, etc. (that alone will save a lot of design and skill-development time).

The way interaction behavior is expressed in the example above, a developer can quickly understand what's going to occur, so as this will represent at the same time the design and the implementation.

One thing to notice, regarding using indented trees to represent interactions, is that if the interaction is deep (such as having many nested turns), one quickly runs out of horizontal real estate. So, a designer may make the habit of encapsulating subsequent turns into behaviors that are defined elsewhere. Another problem that affects readability is that the exit condition is not clear in nested statements. In a directed graph representation one can put an arc at any point that goes wherever wanted, and it is perfectly readable. In a nested procedure one may generate a condition that causes the procedure to exit, as well as the other calling procedures.

The main window of the behavior editor may be a tree structure that is expandable and collapsible. This represents the tree structure of the behaviors. For each behavior in this view one can, in embodiments, drag, drop, delete, copy, cut, paste, swap with another behavior, add or remove one or more decorations, add a sibling above or below and add a child (and apply any of the above to the sibling or child).

This top level view should be informative enough that an author can get a good idea of what the tree is trying to do. This means that every row may contain the behavior and decorator names, a small icon to represent the behavior type, and a user-filled description field.

Each behavior may be parameterized with zero or more parameters. For example a SimplePlayAnimation behavior might take one parameter: the animation name. More complex behaviors will typically take more parameters.

A compound behavior may be created in the behavior tool as sub behaviors. In embodiments, one may arbitrarily parameterize subtree parameters and bubble them up to the top of the compound behavior graphically.

Each parameter to a behavior may have a "type" associated with it. The type of the parameter may allow the behavior authoring tool to help the user as much as possible to graphically enter valid values for each argument. The following is an embodiment of a type inheritance structure with descriptions on how the tool will graphically help a user fill in an appropriate value: (1) CompiledClip: Editing a compiled clip may take a developer to the Animation Editor, which may be a timeline based editor; (2) String: A text box appears; (3) File: a file chooser appears: (4) Animation File: A file chooser window appears that lists available animations, which may include user generated animations and PCD-created animations. It may also display a link to the animation authoring tool to create an animation on the spot; (5) Sound File: A file chooser may appear that lists available mp3 files; (6) Grammar File: A file chooser that lists available .raw or .grammar files; (7) Grammar Text: shows a grammar syntax editor with autocomplete and syntax highlighting; (8) TTS: a TTS editor appears, possibly in preview mode; (9) JavaScript: Shows a JavaScript editor, such as Atom, with syntax highlighting and possible code completion for The social robot APIs; (10) Environment Variables: These are variables that are important to the PCD 100; (11) Number: A number box appears. Min Max, default; (12) Integer: An integer select box appears. Min Max, default; (13) Boolean: A true/false combo box or radio select buttons appears; (14) Array<Type>: Displays the ability to add, subtracts, move up or down elements of type; (15) Vector3d: Displays an (x, y, z) box; and (16) Person: May be nearest, farthest, most well known, etc.

As the PCD 100 runs a behavior tree, a debug web interface may show a graphical representation of the tree, highlighting the current node that it is on. Start, stop, and advance buttons may be available. During pause, the tool may allow introspection on global watch variables and behavior parameter values. Furthermore, limited input interaction may remain available. This may include triggering a phrase or placing a person near the social robot, which may be able to add template knowledge about this person, for example. In embodiments developers may also share behavior models with other developers, such as sharing sensory-motor skills or modules. For example, if the PCD 100 has a mobile base, navigation and mapping models may be shared among developers. The behavior logic classes may be modified by developers, such as to expand and provide variants on functionality.

The tools of the SDK may include an expression tool suite for managing expressions of the social robot. A core feature of the Expression Tool Suite is the simulation window. With reference to FIG. 24, there is illustrated an embodiment of a simulation window where the main view in both screenshots simulates the animation of the PCD 100. The top main view 2400 also simulates the focal point for the eye graphic. The upper left portion in each screenshot simulates the screen graphic 2402, 2402'. This simulation view may be written in WebGL, such that no special tools are required to simulate the social robot animation (other than having a current version of a browser, such as Chrome™, running). This simulation view need not be a separate tool unto itself; instead, it may be a view that can be embedded in tools that will enable the host of the PCD platform and other developers to create and test PCD animations, such as animations of various skills. It may either be invoked when a developer wants to play back a movement or animation in real time or by "stepping through" the animation sequentially. Thus, provided herein is a simulation tool for simulating behavior of social robot, where the same code may be used for the simulation and for the actual running of the social robot.

Figure 25:
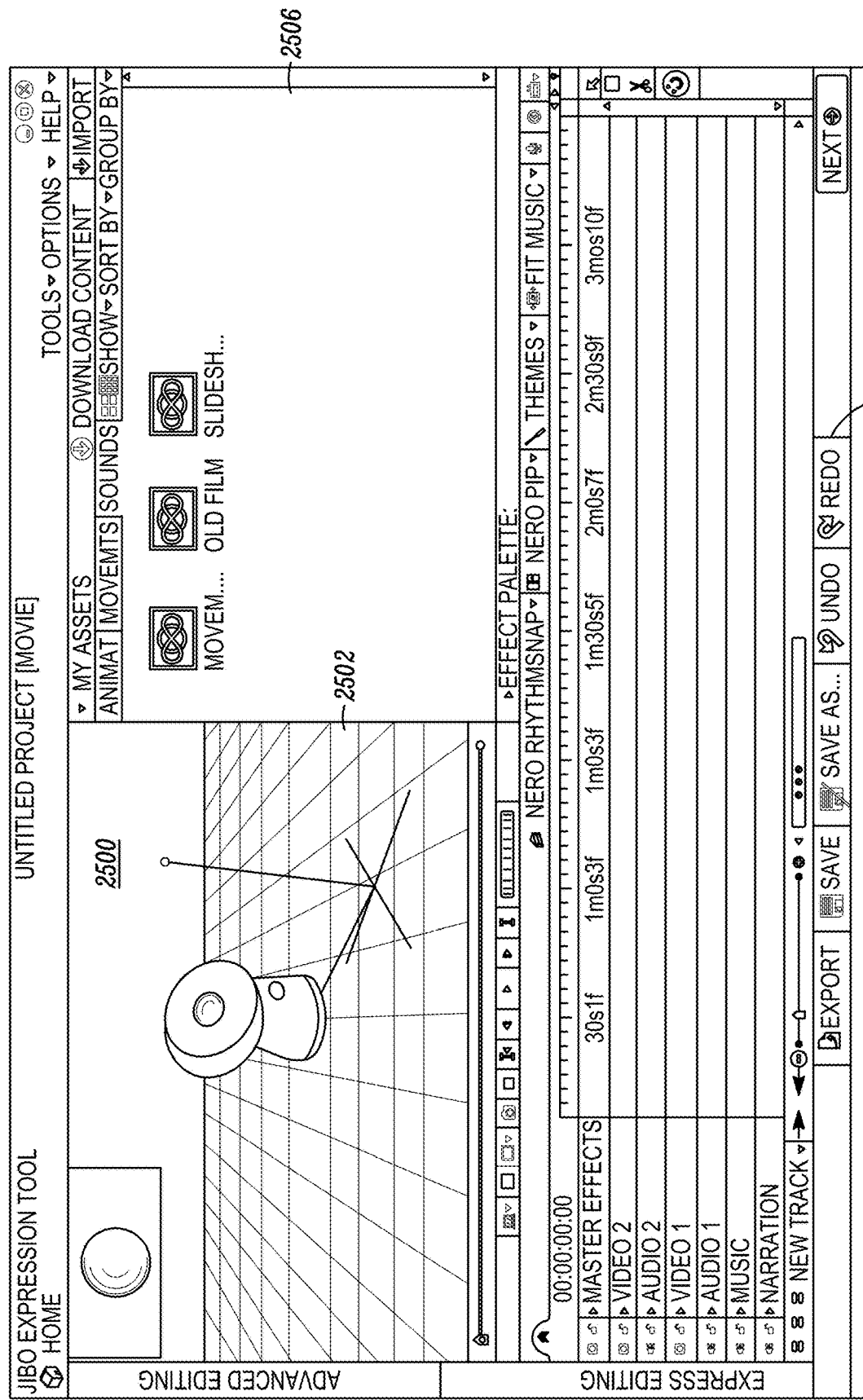
FIG. 25 is an illustration of an exemplary and non-limiting embodiment of a social robot animation editor of a social robot expression tool suite.

With reference to FIG. 25, there is illustrated an exemplary and non-limiting embodiment of a social robot animation editor of a social robot expression tool suite. With such a tool, a developer may piece together social robot animations, comprised of one or more social robot movements, screen graphics, sounds, text-to-speech actions, and lighting, such as LED body lighting and functionality. FIG. 25 shows a conventional animation editor 2500 of the type that may be adapted for use with the PCD 100. Key features of the animation editor may include a simulation window 2502 for playing back social robot animations, an animation editor 2504 where a developer/designer may place assets (movements, graphics, sound/TTS, LED body lighting, or complete animations) into a timeline, and an assets library 2506, where a developer/designer can pick existing assets for inclusion in the timeline. Assets may come from either the developer's hard drive, or from the PCD store. This may support 3D viewing for altering the view, scale, rotation, or the like of the PCD 100. In embodiments, the editor may allow for use of backgrounds or objects that may expand the virtual environment of the PCD, such as having avatars for simulating people, receiving inputs from a user interface, and the like. In embodiments the animation editor may have a mode that inverses controls and allows users to pose the robot and have an interface for setting keyframes based on that pose. In a similar manner, animating screen-based elements like an eye, overlay or background element may be done by touch manipulation, followed by keyframing of the new orientation/changes. Variants of this approach may also be embodied, such as using the PCD 100 to record custom sound effects for animations (placeholder or final) would greatly speed up the creative process of design skills. In embodiments the tool may allow previewing animations via the animation editor directly on the PCD 100 to which the editor is connected.

In embodiments, the host of the PCD platform may support the ability to import assets and create new assets. "Import" and "create" capabilities may support the various asset types, described herein. For example, creating a new movement may launch the social robot animation movement tool, while creating new TTS phrases launches the social robot's speaking tool.

Creating new LED lighting schemes may be specified via a dialog box or a lighting tool.

In embodiments, one or more tools may be embodied as a web application, such as a Chrome™ web application. In embodiments, the given tool may save both the social robot animation itself, such as in a unique file type, such as a .jba or .anim file, as well as a being saved as a social robot animation project file, such as of a .jbp file type. This approach may be extensible to new tools as the PCD 100 evolves with new capabilities, such as perceptual capabilities, physical capabilities, expressive capabilities, connectivity with new devices (e.g., augmented reality devices), and the like.

Figure 26:
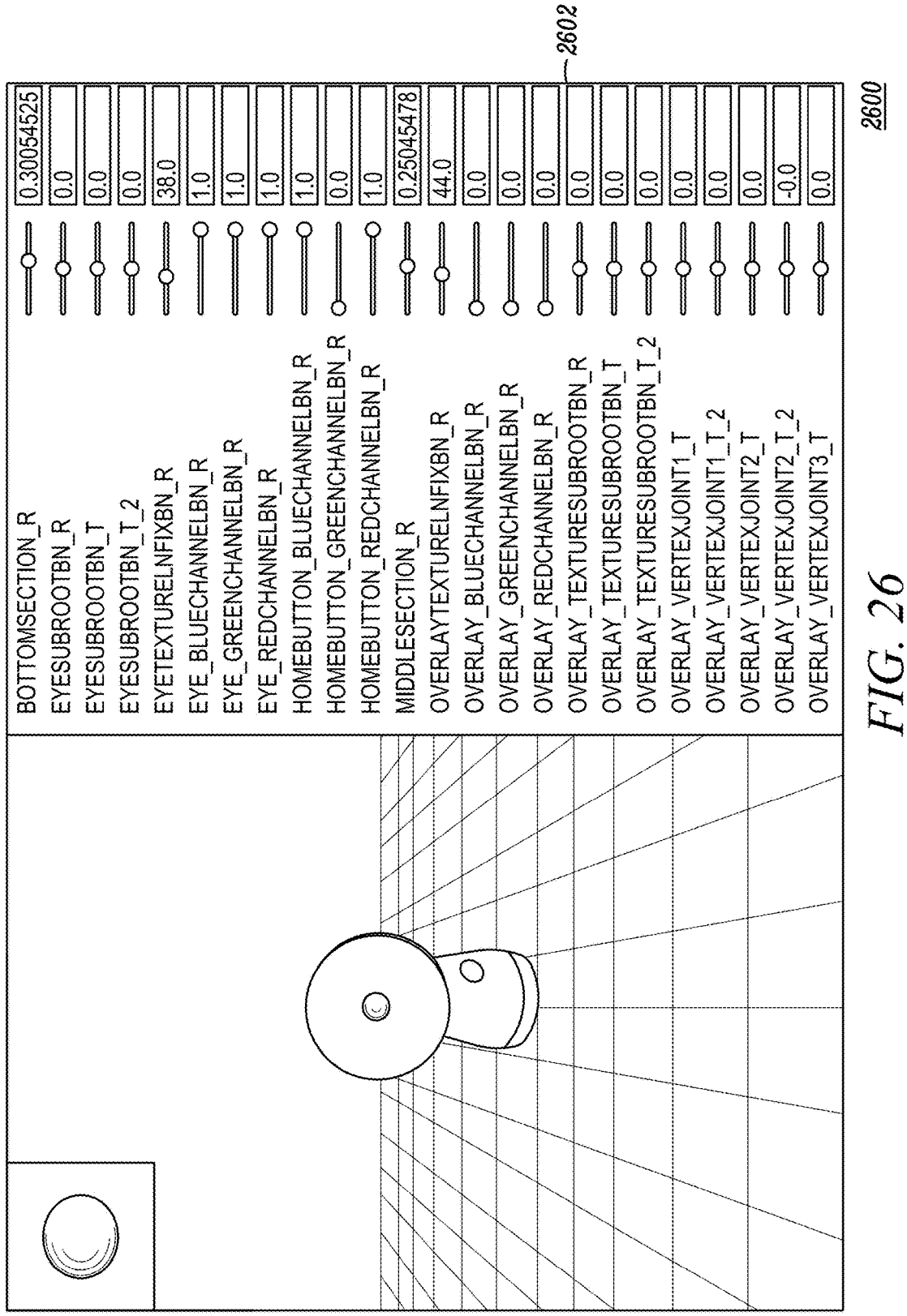
FIG. 26 is an illustration of an exemplary and non-limiting embodiment of a PCD animation movement tool.

With reference to FIG. 26, there is illustrated an exemplary and non-limiting embodiment of a PCD animation editor 2500 that may be used, such as by invoking "New . . . Animation" from the PCD animation editor 2500. At its core, there are radian positions that specify body positions (such as, in a three part robot, by controlling the radial positions bottom, middle, and top sections of the robot). In FIG. 26, a set of sliders 2602 may be used to provide movement positions. In embodiments, each set of positions may also be time-stamped, such that a complete movement is defined by an array of time/body-position values. The remaining sliders may be used for controlling the joints in the eye animation. In embodiments, one may separate creating new eye animations from creating new body animations (the two are conflated in this embodiment). Finally, the tool may also support the importing of a texture file to control the look of the eye graphic. The tool may support simulating interaction with a touch screen. In embodiments, the tool may enable various graphics beyond the eye, such as interactive story animations.

The PCD simulator may not only include the above-referenced simulation window, but also may have an interface/console for injecting sensory Input.

In embodiments, a key based access to a web portal associated with a PCD 100 may allow a developer to install skills on the social robot for development and testing. The web portal on the PCD 100 may provide a collection of web-based development, debugging and visualization tools for runtime debugging of the skills of the PCD 100 while a user continues to interact with the PCD 100.

The PCD 100 may have an associated remote storage facility, such as a PCD cloud, which may comprise a set of hosted, web-based tools and storage capabilities that support content creation for animation of graphics, body movement, sound and expression. In embodiments, the PCD 100 may have other off-board processing, such as speech recognition machine learning, navigation, and the like. This may include web-based tools for creation of behavior trees for the logic of skills using behavior tree libraries, as well as a library of "plug-in" content to enhance developer skills, such as common emotive animations, graphics and sounds. The interface may be extensible to interface with other APIs, such as home automation APIs and the like.

The methods and systems disclosed herein may address various security considerations. For example, skills may require authorization tokens to access sensitive platform resources such as video and audio input streams. Skills may be released as digitally signed "packages" through the social robot store and may be verified during installation. Developers may get an individual package, with applicable keys, as part of the SDK.

In embodiments, the PCD SDK may include components that may be accessed by a simple browser, such as a Chrome™ browser, with support for conventional web development tools, such as HTML5, CSS, JS and WebGL, as well as a canvas for visualization. In embodiments, an open source version of a browser such as Chrome™ may be used to build desktop applications and be used for the simulator, development environment and related plugins, as well as being used for the PCD 100 application runtime. This means code for the PCD 100, whether for development, simulation or runtime usage can typically run in regular browsers with minimal revision, such as to allow skills to be previewed on mobile or PC browsers.

The SDK described herein may support various asset types, such as input grammars (such as containing pre-tuned word-spotting grammars), graphics resources (such as popular graphics resources for displaying on the screen of the social robot); sounds (such as popular sound resources for playing on speakers of the PCD 100, sculpting prosody of an utterance of the PCD 100, adding filters to the voice, and other sound effects); animations (such as popular bundles of movement, screen graphics, sound, and speech packaged into coordinated animations); and behavior trees (such as popular behavior tree examples that developers can incorporate into skills).

The PCD SDK may enable managing a wide range of sensory input and control capabilities, such as capabilities relating to the local perceptual space (such as real time 3D person tracking, person identification through voice and/or facial recognition and facial emotion estimation); imaging (such as snapping photos, overlaying images, and compressing image streams); audio input (such as locating audio sources, selecting direction of an audio beam, and compressing an audio stream); speech recognition (such as speaker identification, recognition of phrases and use of phrase-spotting grammars, name recognition, standard speech recognition, and use of custom phrase-spotting grammars); touch (such as detecting the touching of a face on a graphic element and detecting touches to the head of the social robot); and control (such as using a simplified IFTTT, complex behavior trees with JavaScript or built-in behavior libraries).

The PCD SDK may also have various capabilities relating to the output of expressions and sharing, such as relating to movement (such as playing social-robot-created animations, authoring custom animations, importing custom animations and programmatic and kinematic animation construction); sound (such as playing social robot-created sounds, importing custom sounds, playing custom sounds, and mixing (such as in real time) or blending sounds); speech output (such as playing back pre-recorded voice segments, supporting correct name pronunciation, playing back text using text-to-speech, incorporating custom pre-recorded voice segments and using text-to-speech emotional annotations); lighting (such as controlling LED lights); graphics (such as executing social robot-created graphics or importing custom graphics); sharing a personalization or skill (such as running on devices within a single account, sharing with other developers on other devices, and distributing to a skills store).

In accordance with various exemplary and non-limiting embodiments, methods and systems are provided for using a PCD 100 to coordinate a live performance of Internet of Things (TOT) devices.

In some embodiments, a PCD 100 may automatically discover types and locations of IOT devices including speakers, lights, etc. The PCD 100 may then control lights and speakers to enhance a live musical performance. The PCD 100 may also learn from experience what preferences of the users are, such as to personalize settings and behaviors of external devices, such as music devices, IOT devices and the like.

As inexpensive IOT devices become common, it will be possible to utilize them in entertaining ways. A PCD 100, with spatial mapping, object detection, and audio detection is ideally equipped to control these devices in coordination with music, video and other entertainment media. A well orchestrated performance will delight its audience.

Commercial solutions exist to automatically control sound and lighting to enhance theatrical and live music performances. Similar systems are also used to enhance Karaoke performances. The problem with existing commercial systems is that they are expensive and require expertise to correctly configure sound and lighting devices. Controllable devices are generally designed specifically for theater or auditorium environments. These systems and devices are not found in homes.

Provided herein is an appropriately programmed PCD 100 that can (1) automatically discover types and locations of IOT devices including lights, speakers, etc. and (2) control these lights, speakers, etc., such as to enhance a live musical performance.

Consider a family with a home in which IOT lights and speakers have been installed in, say, the kitchen and adjacent family room. This family, being adopters of new technology, may purchase a personal PCD 100 that may be deployed in the kitchen. As part of its setup procedure, the social robot may discover the types and locations of the family's IOT devices and request permission to access and control them. If permission is granted, the PCD 100 may offer to perform a popular song. The social robot then uses its own sound system and expressive physical animation to begin the performance. Then, to the delight of the family, the IOT lights in the kitchen and family room begin to pulse along with the music, accentuating musical events. Then the IOT speakers begin playing, enhancing the stereo/spatial nature of the music.

The ability to coordinate IOT devices with a music (or other) performance enhances the perceived value of the PCD 100. It could also make the PCD 100 valuable in automatically setting up and enhancing ad hoc live performances outside the home.

Provided herein are methods and systems for using a PCD 100 to moderate a meeting or conversation between human participants. In such embodiments, a properly designed PCD 100 can be employed as a meeting moderator in order to improve the dynamic and the effectiveness of meetings and conversations.

Meetings are often not as effective as intended, and individuals who can skillfully moderate meetings are not always available. Successful attempts to address the factors that contribute to suboptimal meetings generally take the form of specialized training sessions or the utilization of expert moderators. These approaches can be effective, but they are expensive.

Attempts by untrained individuals to moderate meetings often fail because individuals are resistant to instruction and advice offered by peers.

Often, the goal of a meeting or a conversation is to discuss ideas and opinions as they are contributed by the participants in the course of the meeting. Often, the expectation is that participants will have the opportunity to contribute freely. Given these goals and expectations, an optimal meeting or conversation is one in which valuable and relevant contributions are made by all participants and all important ideas and opinions are contributed.

A number of human factors can limit the success of a meeting. For example, individuals are not always committed to the goals and expectations of the meeting. Also, the dynamic between individuals does not always align with the goals and expectations of the meeting. Sometimes the intent of a meeting's participants is explicitly counter to the goals of the meeting. For example, a meeting intended to catalyze a mutual discussion may be hijacked by a participant whose goal is to steer the discussion in a certain direction. In other cases, the dynamic between individuals may be hostile, causing the discussion to focus on the dynamic rather than the intended subject. Unintentional disruption can also minimize the success of a meeting. For example, a talkative, expressive participant can inadvertently monopolize the discussion, preventing others from contributing freely.

Because of these limiting factors, many (if not most) meetings are sub-optimal. In a business setting, suboptimal, inefficient meetings can be an expensive waste of resources. In a family, suboptimal conversations can be an unfortunate missed opportunity.

The problem, as stated above, is the result of innate human tendencies, and it persists because very little is done to address and correct it. During the typical education of individuals, significant time is spent on instruction for reading, writing, arithmetic, science, art, music, business, etc. But little or no explicit instruction is provided for important skills like conversation, collaboration or persuasion (rhetoric). Because of this, there is an opportunity to significantly improve the effectiveness of collaboration, in general, and meetings, in particular.

Research reveals that humans are more willing to receive and follow instruction and advice from a social robot than from another human. A social robot can act as an impartial, non-judgmental, expert moderator for meetings. The PCD's biometric recognition capability can allow it to accurately track and measure the degree of participation by each individual in a meeting. This information can be presented as a real time histogram of participation. The histogram can include: talk time per individual; back and forth between individuals; tone (positive/negative) projected by each individual; politeness; idiomatic expressions (positive and negative, encouraging and derogatory, insensitivity); cultural faux pas; emotional state of individuals (affective analysis); overall energy over time; and topics and subtopics discussed.

Throughout the course of a meeting, a PCD 100 can transcribe the verbal content and correlate it with social measurements to provide an objective tool for both capturing the discussion and evaluating the effectiveness of the meeting.

The PCD 100 can be configured with relevant thresholds so that it can interject during the meeting in order to keep the meeting on track. For example, the robot can interject when: someone is talking too much; the tone is too negative; inappropriate idiomatic expressions are used; insensitivity is detected; the overall energy is too low; and/or essential topics are not addressed.

In its capacity as both an impartial meeting moderator and a social mirror, the PCD 100 can help participants accomplish two important goals: conduct meetings more effectively and learning to collaborate and converse more effectively.

A meeting, for example, is an environment in which may be deployed a technology. Meeting participants may include experts from a variety of disciplines with a variety of communication styles. In the case where the meeting is dominated by a talkative participant, the PCD moderator can (in a non judgmental way) present a real-time histogram—displayed on an appropriate display—that shows the relative talk time of all participants. Additionally, if inappropriate expressions are used, the social robot can (without judgment) attribute these expressions to the contributing participants, such as via a histogram. The energy and tone of the meeting can also be measured and tracked in real time and compared to previous, effective meetings. As a learning opportunity, both effective and ineffective meetings can be compared using the statistics gathered by the PCD 100.

Thus, a social robot such as a PCD 100 may act as a moderator of meetings, recording and displaying relevant information, and improving the effectiveness and dynamics of meetings, which can translate into increased productivity and a better use of resources.

Also provided herein are methods and systems for organizing a network of robot agents to distribute information among authenticated human identities and networked mobile devices.

As the number and variety of communication channels increases, so does the "noise" with which message senders and recipients must contend. Additionally, new channels often specialize in a particular mode of message delivery. The result is that a message sender must decide which channel to use to maximize the likelihood and effectiveness of message delivery. Likewise the message recipient must decide which channel(s) to "watch" in order to receive messages in a timely manner. These decisions are increasingly difficult to make.

Today, messages from multiple email accounts may be automatically consolidated by mail-reading programs, making it possible to simultaneously monitor multiple email channels. Likewise, mobile devices may present text messages from multiple channels in a consolidated manner. However, message consolidation does not solve the problem of "noise." It may make the problem worse by bombarding the recipient with messages that are all presented in the same mode.

Social robots can play a unique role in message communication, because of their ability to command attention and because of the importance that humans assign to human-like communication. When a social robot is used as the channel for delivering a message to a recipient, the delivery mode can be chosen automatically by the social robot, so that the message receives an optimal degree of attention by the recipient.

This may be accomplished using several characteristics unique to social robots: (1) The physical presence of the social robot allows it to attract attention with expressive cues to which humans are innately attuned. i.e. motion, gaze direction, "body language"; (2) a social robot with biometric recognition capability can detect when the intended recipient of a message is physically present and can prompt that recipient with the most effective physical cues; and (3) the learning algorithms employed by a social robot can use the message content, situational context, and behavior history of the recipient to make an optimal decision about how to effectively deliver a message.

Networked Social Robots such as a PCD 100, as well as other devices, such as mobile devices and other network-connected devices, may be used in the methods and systems disclosed herein. The message-delivery advantages afforded by an individual social robot are amplified when multiple, networked social robots are robots are employed. In a household setting, a number of PCDs—distributed among rooms/zones of a house—can coordinate their message-delivery efforts. The physical presence of multiple PCDs throughout the household increases the window during which messages can be delivered by the robots. The network of PCDs can use their shared biometric recognition capabilities to track the whereabouts of intended recipients throughout the household. The learning algorithms employed by the network of PCDs can generate predictive models about recipient movement and behavior to determine which PCD agent can most effectively deliver the message.

This same dynamic can be applied in any physical location and can be applied to businesses, museums, libraries, etc.

The physical forms of robots in a network of PCDs may vary. The network may consist of PCDs that are stationary, mobile, ambulatory, able to roll, able to fly, embedded in the dashboard of a vehicle, embedded in an appliance like a refrigerator, etc.

In addition, the PCD's "brain" (its software, logic, learning algorithms, memory, etc.) can be replicated across a variety of devices, some of which have physically expressive bodies, and some of which do not—as in the case where the PCD 100 software is embodied in a mobile phone or tablet (replicated to a mobile device).

When a PCD's software is replicated to mobile device, that device can act as a fully cooperative, fully aware member of a social robot network, as well as with human beings in a social and/or technical network. The degree to which a physically constrained PCD instance can contribute to the task of delivering messages depends on the functionality that it does possess. i.e. PCD software embodied in a typical smartphone will often be able to provide biometric recognition, camera surveillance, speech recognition, and even simulated physical expression by means of on-screen rendering.

A smartphone-constrained PCD instance may generally be able to contribute fully formed messages that can then be delivered by other unconstrained PCDs within the network.

In a network of PCD instances, each instance can operate as a fully independent contributor. However, any given instance can also act as a remote interface (remote control) to another PCD instance on the network. This remote interface mode can be active intermittently, or an instance can be permanently configured to act as the remote interface to another instance—as in the case where PCD software is embodied in a smartphone or smartwatch for the specific purpose of providing remote access to an unconstrained instance.

In embodiments, in a family home setting, a message may be created by a parent using an unconstrained (full-featured) robot unit in the kitchen. The parent may create the message by speaking with the PCD 100.

The message may be captured as an audio/video recording and as a text transcript, such as from a speech-to-text technology, and delivered via text-to-speech (TTS). Delivery is scheduled some time in the future, such as after school today. The intended recipient, Teenager, may not be currently at home, but may arrive at the intended delivery time. In this example, the Teenager does come home after school, but does not enter the kitchen. A tablet-embodied robot unit—embedded in the wall by the garage entrance—may recognize the teenager as she arrives. Because the tablet-embodied unit is networked with the kitchen robot unit, the upstairs robot unit, and the teenager's iPod-embodied unit, all four units cooperate to deliver the timely message. For this kind of message, the preferred delivery mode is via an unconstrained robot unit, so the tablet unit only mentions that a message is waiting. "Hi, [teenager], you have a message waiting." The teenager might proceed to her room, bypassing the kitchen and upstairs robot units. When the delivery time arrives, the network of robot units can determine that because the teenager is not in proximity to an unconstrained robot unit, the next best way to deliver the message is via teenager's iPod-embodied unit. As a result, the iPod unit sounds an alert tone and delivers the message: "Hey, [teenager]. There is a brownie waiting for you in the kitchen." When the teenager finally does enter the kitchen, the kitchen robot unit is already aware that the message was delivered and only offers a courtesy reminder: "Hi, [teenager]. If you ready for that brownie, it's in the toaster oven." The PCD 100 may also summarize the content of the message, and who it is from, such as "Carol, Jim left a message for you. Something about picking up the kids from soccer today." This may help Carol decide when to listen to the message (immediately, or somewhat later).

Thus, a network of social robots can use biometric recognition, tracking, physical presence (such as based on a link between the PCD 100 and an associated mobile device), non-verbal and/or social cues, and active prompting to deliver messages that would otherwise be lost in the noise of multiple, crowded message channels.

In other embodiments, listening to TV or playing video games loudly that are played loudly can be highly annoying to others in the vicinity with different tastes in what makes audio pleasing. Additionally many families have members who stay up later than others.

A proposed solution is to support a way for listeners to use headphones receiving audio wirelessly from a social robot so only the listener can hear him and they are free to listen as loudly as they desire with no compromise. Variants may include Bluetooth headphones, a headphones bundle, a mobile receiver with wired headphones (such as using local WiFi or Bluetooth), and the like.

In accordance with exemplary and non-limiting embodiments, a PCD 100 may have Reminder capabilities similar to those in personal assistant's on popular smartphones. Example: "At 3 pm on December 5th, remind me to buy an anniversary gift" "OK, I'll remind you". Reminders can be recurring to support things like medication reminders. Users may have the option to create the reminder as an audio or video recording, in which case the PCD 100 may need to prompt at the beginning of recording. The PCD 100 may summarize after the message has been created: For example, "OK, I'm going to remind John tomorrow when I see him [play audio]." A reminder is just a special form of PCD Jot where a time is specified.

The PCD 100 may be able to remind known people (one or more for the same reminder) in the family about things. For example, "When you see Suzie, remind her to do her homework" or "At 6 pm, remind Dad and Mom to pick me up from soccer practice." If a reminder is given, the originator of the reminder should be notified on the social robot PCD link if he or she has a social robotLink device. A reminder is just a special form of the PCD Jot where a time is specified. In embodiments, a link may between a PCD 100 and a mobile device.

If the PCD 100 isn't able to deliver a reminder because the target person isn't there, the reminder may appear on the target's social robotLink device(s). If there is no social robotLink device assigned to the target, the PCD 100 may display message as soon as it sees the target person.

In accordance with exemplary and non-limiting embodiments, the PCD 100 may be able to send short text messages or audio/visual recordings to other PCD's in its directory, referred to herein as "Jots." The PCD Jot messages may be editable, and the PCD Jot recordings may be able to play back and re-record before sending. The PCD 100 may confirm for senders that the PCD Jot was successfully sent. The PCD 100 may maintain a "sent" Jots folder for each member of the household, which can be browsed and deleted message by message. Sent Jots may be viewable and/or editable on PCD Link or the PCD 100.

The PCD may maintain a list of PCD animations, referred to herein as "robotticons," akin to emojis used in screen-based devices, such as to give life to or enhance the liveliness of messages. Examples may include a cute wink for "hello" or "oO" for "uh-oh". The social robotticons can be elaborate, and certain specialized libraries may be available for purchase on the PCD Skills Store. Some PCD robotticons may be standalone animation expressions. Others may accommodate integration of a user video image/message. The PCD robotticons may include any of the PCD's expressive capabilities (LED, bipity boops, or other sounds or sound effects, animation, etc.)

If a user elects to send a photo, such as captured by a "snap" mode of the PCT, the PCD Jot capabilities may be available to append to the photo.

For example, a family member may always ask the PCD 100 "play me my reminders [from [person]]" and the PCD 100 may respond by beginning playing from the earliest reminders for that person. The PCD's screen may signify that there are reminders waiting. If the PCD sees the intended recipient of a PCD Jot, the PCD 100 may offer to play the Jot if the reminder hadn't been viewed within the last six hours, and the time of the reminder has now arrived. After viewing a message, the recipient may have an option to reply or forward, and then save or delete the message, or "snooze" and have the message replayed after a user defined time interval. Default action may be to save messages. The PCD may maintain an inbox of the PCD Jots for each member of the household that may be scrolled.

In the event there are multiple family members, an incoming PCD Jot may carry with it an identifier of the intended recipient. The PCD 100 may only show messages to the intended recipient or other authorized users. For example, each member of the family may have their own color, and a flashing "message" indicator in that color let's that family member know the message is for them. The paradigm should accommodate instances where there are different messages awaiting different members of the family. Whether a family member is authorized to view another family member's message may be configurable via Administrator.

The PCD 100 may be able to create to-do lists and shopping lists, which may be viewable and editable on the PCD Link. For example, users may be able to say "PCD, I need to sign Jenny up for summer camp" and the PCD 100 may respond "I've added 'sign Jenny up for summer camp' to your to-do list." Or "PCD, add butter to my shopping list." Lists may be able to be created for each family member or for the family at large. Each member of the family may have a list, and there may be a family list.

The PCD Jot may time out after a period of non-use.

The PCD may have a persistent "Be" state that engages in socially and character-based (emotive, persona model-driven behaviors) interactions, decisions, leanings with users. This state may modulate the PCD skills, personalize the PCD behavior and performance of these skills to specific users based on experience and other inputs.

The PCD 100 may have a single, distinct "powered off" pose, as well as some different animation sequences that lead it to that pose when it is turned off. The PCD 100 may have a single, distinct "Asleep" pose when it is plugged in or running on battery power as well as a number of different animation sequences that lead it to that pose after it gets a "sleep" command or if it decides to take a nap while disengaged. The PCD 100 may have several different animations corresponding to "wake up" verbal or tactile commands or other audiovisual events or turning the power on/connecting a power source when it has been asleep or off for <=48 hours. In embodiments there can be distinct sleep modes, such as one where the PCD 100 is waiting but still has active microphones and cameras to wake up when appropriate. In another sleep mode (which may be indicated by some cue, such as an LED indicator), the PCD 100 may have microphones and camera off, so that the PCD 100 does not see or hear when asleep in this mode. In the latter mode, a person may need to touch the robot or use a different modality than speech or visual input to wake up the PCD 100.

The PCD 100 may have several different animations corresponding to verbal or tactile "wake up" commands or other audiovisual events turning the power on/connecting a power source when it has been asleep or off for >=48 hours.

The PCD 100 may have several wake up animations corresponding to verbal or tactile "wake up" commands or turning the power on after more than 3 hours asleep or off between 11 pm and 11 am local time, for example.

The PCD 100 may have several different ways of "dreaming" while it is asleep. These Dreaming States may occur during ~30% of sleep sessions that last longer than 15 minutes. The PCD's dreams can be interrupted so that it goes into a silent sleep state with commands, or by touch screen, in the event people in the room find its dreams distracting.

The PCD 100 may notify users verbally and on-screen when its power level is below 20%, and at each decrement of approximately 5% thereafter, for example.

The PCD 100 may notify users on-screen when its power source is switched between outlet and battery. It should also be able to respond to questions such as "Are you plugged in?" or "Are you using your battery?" The PCD 100 may automatically power on or off when the button on the back of his head is pushed and held. A short button push puts The social robot to sleep.

The PCD 100 may be set to wake up from sleep via (voice or touch) or just touch. If the PCD 100 is on but not engaged in active interaction (i.e., in a base stated referred to herein as the "Be" or "being" state), the PCD 100 may exhibit passive awareness animations when someone enters its line or sight or makes a noise. These animations may lead to idling active awareness if the PCD 100 believes the person wants to engage.

If the PCD 100 is passively aware of someone and believes that person wants to actively engage either because of a verbal command or because that person is deliberately walking toward the PCD 100, it may exhibit "at your service" type active awareness animations.

The PCD 100 may comment if it can't see because a foreign object is covering his eyes if it is asked to do anything that requires sight. If the PCD 100 is tapped on the head independent of any kind of prompt, it may revert to Idling Active Awareness. In other embodiments, if the PCD 100 is stroked or petted, or if it is praised verbally, it may exhibit a "delight" animation, and revert to Idling Active Awareness.

If a recognized member of the PCD's family is in line of sight or identified, such as via a voice ID, the PCD 100 may generally greet that family member in a personal way, though not necessarily verbally (which may depend on the recency of a last sighting of that family member).

If a stranger is in line of sight or detected via voice, the PCD may go into passive awareness mode. If it detects interest from the stranger, it should introduce itself without being repetitive. The PCD 100 may not proactively ask who the other person is since the "known family members" are managed by the PCD's family Administrator.

If a recognized member of the PCD's family is with an unrecognized stranger, the PCD 100 first greet the family member personally. If that family member introduces the PCD 100 to the stranger, the PCD 100 may not proactively ask who the other person is since the "known family members" are managed by the social robot's family Administrator.

If the social robot's family Administrator introduces The social robot to meet a new person and the Administrator proactively says he should remember the new person, The social robot should take up one of the 16 ID slots. If there are no available ID slots, the PCD 100 may ask the Administrator if he or she would like to replace an existing recognized person.

When asked to learn a new person, the PCD 100 collects the necessary visual and audio data, and may also suggest that the Administrator have the new person go through the PCD Link app to more optimally capture visual and audio samples, and learn name pronunciation.

In some embodiments, the PCD 100 may have several forms of greetings based on the time of day. For example, "Good Morning" or "Good evening" or "You're up late." If the PCD 100 knows the person it is greeting, it may frequently, but not always, be personalized with that person's name.

If someone says goodbye to the PCD 100, it may have several ways of bidding farewell. If the PCD 100 knows the person saying goodbye, it may personalize the farewell with that person's name.

The PCD 100 may have some idle chatter capabilities constructed in such a way that they don't encourage unconstrained dialog. These may include utterances that aim for a user response, or simple quips designed to amuse the user but not beckoning a response. These utterances may refer to known "Family Facts" as defined in the Family Facts tab, such as wishing someone in the family "happy birthday". In embodiments, visual hints may be displayed on a screen as to what utterances the PCD 100 is expecting to hear, such as to prompt the user of the PCD 100. Utterances may also be geocentric based on a particular PCD's zip code. Utterances may also be topical as pushed from the PCD Cloud by the design team such as "I can't believe Birdman swept the Academy Awards!". Quips may be humorous, clever, and consistent with the PCD's persona. Chatbot content should also draw from the PCD's memory of what people like and dislike based on what they've told it or what it gleans from facial expression reactions to things like pictures, songs, jokes, etc.

The PCD 100 may periodically ask family members questions designed to entertain.

The PCD 100 may have several elegant ways of expressing incomprehension that encourage users to be forgiving if it is unable to understand a user despite requests to repeat the utterance.

The PCD 100 may have severable likeable idiosyncratic behaviors it expresses from time to time, such as specific preferences, fears, and moods.

The PCD 100 may have a defined multimodal disambiguation paradigm, which may be designed to elicit patience and forgiveness from users.

The PCD 100 may have several elegant ways of expressing it understands an utterance but cannot comply or respond satisfactorily.

The PCD 100 may sometimes amuse itself quietly in ways that exhibit it is happy, occupied and not in need of any assistance.

The PCD 100 may have several ways to exhibit it is thinking during any latency incident, or during a core server update.

The PCD 100 may have several ways of alerting users that its WiFi connectivity is down, and also that WiFi has reconnected. Users can always reactivate WiFi from the settings and by using the QR code from the PCD Link.

The PCD 100 may have a basic multimodal navigation paradigm that allows users to browse through and enter skills and basic settings, as well as to exit active skills. Advanced settings may need to be entered via PCD Link.

The PCD 100 may have the ability to have its Administrator "lock" it out so that it cannot be engaged, beyond an apologetic notification that it is locked, without a password.

The PCD 100 may be able to display available WiFi networks on command. The PCD 100 may display available WiFi networks if the WiFi connection is lost. The PCD 100 may provide a way to enter the WiFi password on his screen.

The PCD 100 may have a visual association with each known member of the family. For example, Jim is always Blue, Jane is always Pink, Mom is always Green, and Dad is always Purple. When the PCD 100 interacts with that member of the family, that visual scheme should be dominant. This visual identifier can be used throughout the PCD's skills to ensure family members know the PCD 100 recognizes them.

The PCD 100 may recognize smiles and respond in a similar manner

The PCD 100 may play pictures from its PCD Snap photo album in slide show mode while it's in Be and if the user is in the picture, The PCD 100 may say "you look particularly good in this one". Sometimes the PCD 100 may look at its "own" photos, like of the first Macintosh, or R2D2, or pinball machines but then pictures of his family are included from time to time also.

The PCD 100 may often exhibit happiness without requiring interaction. For example, it plays pong with itself, draws pictures on its screen like the Mona Lisa with a PCD 100 as the face. Over time, these skills may evolve (e.g., starts with lunar lander ASCII game or stick figures then progresses to more complex games). In some embodiments, the PCD 100 may have a pet, such as a puppy, and its eye may become a ball the dog can fetch. The PCD 100 may have passive back and forth with his dog. It may be browsing though its skills, such as reading cookbooks. It could be dancing to some kind of limited library of music, practicing its moves. Sometimes it is napping. In some embodiments, the PCD 100 may write poems, such as Haikus, based on family facts with gong. In other embodiments, the PCD 100 may be exercising and giving itself encouragement. In other embodiments, the PCD 100 may play instruments, watch funny you tube clips and chuckle in response, execute a color by numbers kids game, move to cause a ball to move through a labyrinth and play Sudoku. The PCD 100 may have its own photo album and collects stamps.

In some embodiments, the PCD 100 may engage in and display a Ping-Pong based game wherein side to side movements control a user's paddle in play against the PCD 100.

If the PCD 100 is running on battery power, there may be an icon on its screen showing remaining battery life.

If people praise the PCD 100 in a social context rather than a task context, it may exhibit "delight/affection" animation.

When in a group, the PCD 100 may engage with one person at a time. It may only turn to engage someone else if they indicate a desire to speak with the PCD 100 AND the person the PCD 100 is currently engaged with remains silent or otherwise disengages. In embodiments the PCD may use various non-verbal and paralinguistic social cues to manage multi-person interactions simultaneously.

The PCD 100 may have a basic timer functionality. For example "PCD, let me know when 15 minutes have passed."

The PCD 100 may be able to create a tone on a phone that is connected to it via PCD Link to assist users in locating a lost phone that is within WiFi range. The ability to control whether someone can create this tone on a PCD Linked phone that is not their own device may be configurable via Administrator settings.

The PCD 100 may have a stopwatch functionality similar to those in current smartphones.

The PCD 100 may have a built in clock and be able to tell the time in any time zone if asked. Sometimes, The PCD 100 may display the time, other times it may not, based, at least in part, on its level of engagement and what it is doing. The PCD 100 may have an alarm clock functionality. For example "The social robot, let me know when its 3:30 pm". There may be a snooze function included. The PCD 100 may have several alarm sounds available and each family member may set their preferred alarm sound. If no preferred alarm sound is set, the PCD 100 may select one.

The PCD 100 may have established multi-party interaction policy, which may vary by skill.

The PCD 100 may have a quick "demo reel" which it can show if asked to "show off" its capabilities.

The PCD 100 may have specified but simple behavior options when it encounters and recognizes another PCD 100 by voice ID if it is introduced to another PCD 100 by a family member. In embodiments, a PCD 100 may have specific, special behaviors designed for interacting with another PCD 100.

In accordance with exemplary and non-limiting embodiments, a given skill or behavior (such as an animation, speech, or the like) may manifest differently based on other attributes associated with a PCD 100. For example, the PCD 100 may be programmed or may adapt, such as through interactions over time with a user or group, to have a certain personality, to undertake a certain persona, to operate in a particular mode, to have a certain mood, to express a level of energy or fatigue, to play a certain role, or the like. The PCD SDK may allow a developer to indicate how a particular skill, or component thereof, should vary based on any of the foregoing, or any combination of the foregoing. For example, a PCD 100 may be imbued with an "outgoing" personality, in which case it may execute longer, louder versions of speech behaviors, as compared to an "introverted" PCD 100 that executes shorter, quieter versions. Similarly, an "active" PCD 100 may undertake large movements, while a "quiet" one might undertake small movements when executing the same skill or behavior. Similarly, a "tired" PCD 100 might display sluggish movements, slow speech, and the like, such as to cue a child subtly that it is time for bed. Thus, provided herein is a social robot platform, including an SDK, that allows development of skills and behaviors, wherein the skills and behaviors may be expressed in accordance with a mode of the PCD 100 that is independent of the skill. In embodiments, the PCD 100 may adapt to interact differently with distinct people, such as speaking to children differently from adults, while still maintaining a distinct, consistent persona.

In accordance with various embodiments, a wide range of skills may be provided. Important skills include meeting skills (including for first and subsequent meetings, such as robot-augmented video calls), monitoring skills (such as monitoring people and/or pets in the home), photographer skills, storytelling skills (and multi-media mashups, such as allowing a user to choose at branch point to influence the adventure plot, multi-media performance-based stories, and the like), game-playing skills, a "magic mirror" skill that allows a user to use the social robot as an intelligent mirror, a weather skill, a sports skill, or sports buddy skill that interacts to enhance a sports program or sports information or activity like fantasy sports, a music skill, a skill for working with recipes, serving as an intelligent interactive teleprompter with background/animation effects, and a coaching skill (such as for medication compliance, personal development, training, or the like).

To facilitate automated speech recognition (or other sound recognition), the methods and systems disclosed herein may undertake beam forming. A challenge is that one may desire to allow a user to call attention of the social robot, such as by using a "hot phrase," such as "Hey, Buddy." If the PCD 100 is present, it may turn (or direct attention), to the voice that uttered the hot phrase. One way to do that is to use beam forming, where there are beams (spatial filters or channels) that point to different locations. Theoretically each spatial filter or channel, corresponding to a beam, take sound from that channel and seeks to disregard the other channels. Typically people do that in, for example, polyphone devices by picking up the beams with the highest volume and assuming that the highest volume beam is the one for the person talking. The methods and systems disclosed herein may undertake improved beam forming and utilization, such as in order to pick up the beam of the person who says the hot phrase. In embodiments, the social robot platform disclosed herein may have a distinct instance of the speech recognizer for each beam, or for a sub-set of beams. Thus, each speech recognizer is listening to a cone of space. If the device is among, for example, a group of four people, and one person says "Hey Buddy," the device will then see that someone is calling attention from the direction of that speaker. To implement that, the systems and methods may have a speech recognizer per channel or subset of channels.

Ideally one may wish to maintain the orientation of the beam based on the PCD's motion/orientation. The system that is running the beam forming may receive information from the motor controllers or may receive location or orientation from an external system, such as a GPS system, a vision system or visual inputs, or a location system in an environment such as a home, such as based on locations of IOT devices. The motor controllers, for example, may know the angle at which the PCD 100 rotates the PCD 100, then the PCD 100 may need to find its coordinates. This may be accomplished by speaking the hot phrase again to re-orient it, or by taking advantage of other location information. Person tracking may be used once a speaker is located, so the PCD 100 may move and turn appropriately to maintain a beam in the direction of the speaker as the speaker moves, and other perceptual modalities may augment this, such as tracking by touch, by heat signature, or the like. In embodiments, integration of the sound localization and the visual cues may be used to figure out which person is trying to speak to the PCD 100, such as by visually determining facial movement. In embodiments, one may also deploy an omnidirectional "low resolution" vision system to detect motion in the room, then direct a higher quality camera to the speaker.

In other exemplary embodiments, the methods and systems disclosed herein may use tiled grammars as part of phrase spotting technology. To do effective phrase spotting, one may preferably have short phrases, but the cost of building phrase spotting is higher depending on how many different phrases one must recognize. To distinguish between, for example, ten contents, the more you have different distinct phrases, the more costly it becomes (geometrically). In embodiments, the methods and systems disclosed herein may break the phrases into different recognizers that run simultaneously in different threads, so each one is small and costs less. Now one may introduce a series of things, since the concept of phrase spotting lets you find content-bearing chunks of speech. For example, take the phrase: "Hey Buddy, I want to take a picture and send it to my sister." Two chunks likely matter in most situations: "take a picture" and "send it to my sister." Depending on one phrase spotting thread, one can trigger another, modified, phrase spotting recognizer. One can build a graph of recognizers (not just a graph of grammars, but actual recognizers), each of which recognizes particular types of phrases. Based on the graph, a recognizer can be triggered by an appropriate parent recognizer that governs its applicability and use. Thus, provided herein is an automated speech recognition system with a plurality of speech recognizers working in parallel, the speech recognizers optionally arranged according to a graph to permit phrase spotting across a wide range of phrases.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be a frequency division multiple access (FDMA) network or a code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

Figure 13:
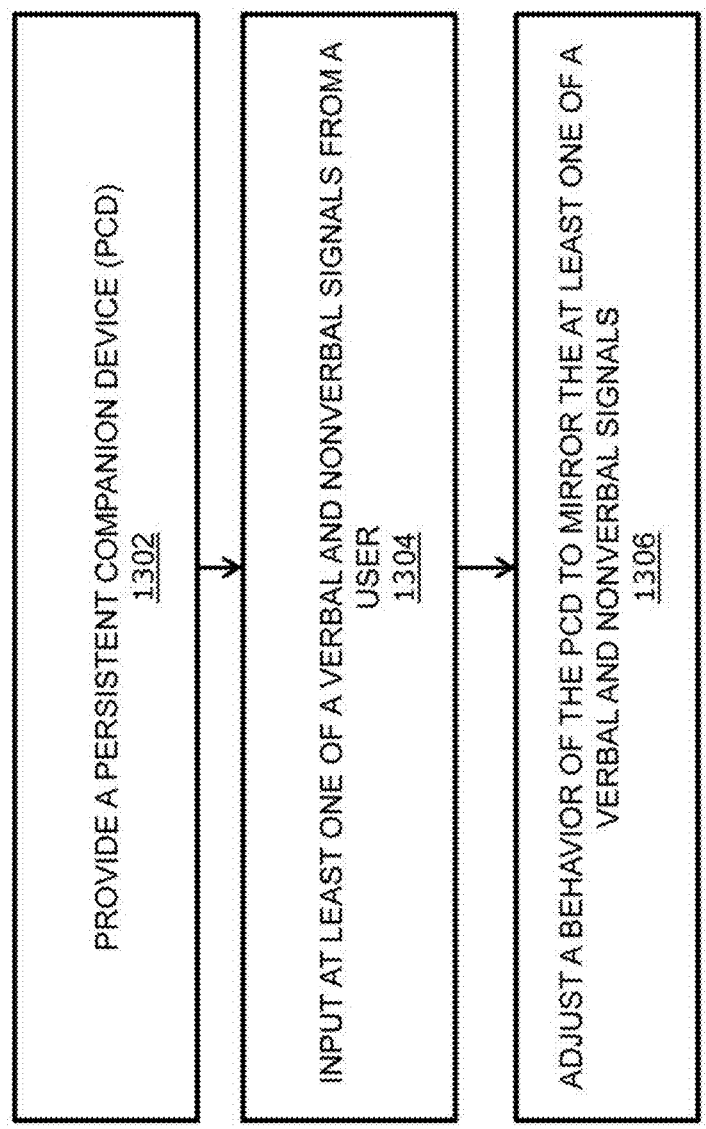
FIG. 13 illustrates a flowchart for a method to adjust behavior of the PCD based on user inputs according to exemplary and non-limiting embodiments.

With reference to FIG. 13, there is illustrated a flowchart and a respective method 1300 of an exemplary and non-limiting embodiment. The method comprises providing a persistent companion device (PCD) at step 1302. The method further comprises inputting at least one of a verbal and nonverbal signals from a user selected from the group consisting of gesture, gaze direction, word choice, vocal prosody, body posture, facial expression, emotional cues and touch, at step 1304. The method further comprises adjusting a behavior of the PCD to mirror the at least one of a verbal and nonverbal signals, at step 1306.

All the above attributes of the development platform, libraries, assets, PCD and the like may be extended to support other languages and cultures (localization).

All documents referenced herein are hereby incorporated by reference.

What is claimed is:

1. A robot comprising:
   a first segment having a generally planar surface facing a second segment;
   the second segment in rotational contact with the first segment about a first axis of rotation; and
   a third segment in rotational contact with the second segment about a second axis of rotation not parallel to the first axis of rotation, the third segment having a display screen adapted to facilitate social interaction with a user, wherein the first segment, the second segment, and the third segment form a 3-ring Zetatype structure of the robot.

2. The robot of claim 1, wherein rotation of at least one of the second and third segments is controlled by a vestibulo-ocular reflex algorithm.

3. The robot of claim 1, wherein the display screen maintains an orientation toward a look-at target independent of rotation of the second segment.

4. The robot of claim 3, wherein the third segment rotates about its axis of rotation to maintain the orientation of the display screen toward the look-at target in response to the robot detecting movement of the look-at target relative to the robot.

5. The robot of claim 1, wherein a look-at target is determined by an attention function of the robot and wherein one or more of the segments perform an orienting response to the determined look-at target.

6. The robot of claim 5, wherein the orienting response comprises rotating the third segment so that the display screen is oriented toward the look-at target.

7. The robot of claim 1, wherein the second and third segments rotate about their mutual axes of motion to achieve a target pose of at least one of the first, second and third segments.

8. The robot of claim 7, wherein the target pose is determined at least in part by using a geometric solver algorithm that is based on a look-at target point defined in three dimensional space.

9. The robot of claim 8, wherein the look-at target point is set by an attention system of the robot.

10. The robot of claim 7, wherein rotation of the second and third segments are coordinated to mimic a human torso and head moving from a first position to the target position.

11. The robot of claim 7, wherein the second and third segments rotate about their mutual axes of rotation using music beat tracking to produce a plurality of dance animation poses.

12. The robot of claim 7, wherein the second and third segments rotate about their mutual axes of motion to mirror a pose of a human.

13. The robot of claim 7, wherein the second and third segments rotate about their mutual axes of rotation to achieve a pose that represents an emotional state defined by data from a plurality of sensors of the robot that detect position and at least one of sound, visual cue, and touch of a human in near-field proximity to the robot.

14. The robot of claim 1, wherein the first axis of rotation is not perpendicular to the generally planar surface.

15. The robot of claim 1, wherein the second segment and the third segment are capable of rotating about the second axis of rotation at an angle greater than 360 degrees.

16. The robot of claim 1, wherein rotation of at least one of the second and third segments is coordinated with activation of the display screen during social interaction with the user.

17. The robot of claim 1, wherein a motor of the robot is mounted in an elastomeric material for absorbing noise produced by armature bearings of the motor.

* * * * *